(12) United States Patent
Hori et al.

(10) Patent No.: US 10,364,664 B2
(45) Date of Patent: Jul. 30, 2019

(54) DOWNHOLE ACOUSTIC MAPPING

(71) Applicant: Schlumberger Technology Corporation, Sugar Land, TX (US)

(72) Inventors: Hiroshi Hori, Sagamihara (JP); Wataru Izuhara, Tokyo (JP); Naoki Sakiyama, Tokyo (JP); Toshimichi Wago, Tokyo (JP); Hiroshi Nakajima, Sagamihara (JP); Shin'ichi Houshuyama, Tokyo (JP); Akane Imamura, Yokohama (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 120 days.

(21) Appl. No.: 15/623,436

(22) Filed: Jun. 15, 2017

(65) Prior Publication Data

US 2018/0003843 A1 Jan. 4, 2018

Related U.S. Application Data

(60) Provisional application No. 62/357,224, filed on Jun. 30, 2016.

(51) Int. Cl.
*G01V 1/46* (2006.01)
*E21B 17/10* (2006.01)
(Continued)

(52) U.S. Cl.
CPC ............ *E21B 47/0005* (2013.01); *G01V 1/44* (2013.01); *G01V 1/52* (2013.01); *G01V 1/159* (2013.01); *G01V 2001/526* (2013.01); *G01V 2210/1299* (2013.01); *G01V 2210/1429* (2013.01); *G01V 2210/622* (2013.01); *G01V 2210/626* (2013.01); *G01V 2210/6242* (2013.01)

(58) Field of Classification Search
CPC ........ E21B 47/0005; G01V 1/44; G01V 1/52; G01V 2210/1299; G01V 2210/1429; G01V 2001/526; G01V 2210/622; G01V 2210/6242; G01V 2210/626; G01V 1/159
USPC .......................................................... 367/28
See application file for complete search history.

(56) References Cited

U.S. PATENT DOCUMENTS

| 3,304,538 A | * | 2/1967 | Zill | .......................... G01V 1/44 327/114 |
| 3,564,914 A | * | 2/1971 | Desai | ...................... G01V 1/52 181/102 |

(Continued)

FOREIGN PATENT DOCUMENTS

WO WO2015163852 A1 10/2015

*Primary Examiner* — Daniel L Murphy
(74) *Attorney, Agent, or Firm* — Michael Dae

(57) ABSTRACT

A downhole tool for operation within a wellbore and including a transmitter array and first and second receiver arrays. The transmitter array includes a plurality of transmitters azimuthally distributed around a longitudinal axis of the downhole tool at a first axial location of the downhole tool. The first receiver array includes a plurality of first receivers azimuthally distributed around the longitudinal axis at a second axial location axially offset from the first axial location. The second receiver array includes a plurality of second receivers azimuthally distributed around the longitudinal axis at a third axial location axially offset from the first and second axial locations.

19 Claims, 32 Drawing Sheets

(51) Int. Cl.
  *E21B 47/00*   (2012.01)
  *G01V 1/44*    (2006.01)
  *G01V 1/52*    (2006.01)
  *E21B 49/00*   (2006.01)
  *G01V 1/02*    (2006.01)

(56) References Cited

U.S. PATENT DOCUMENTS

| | | | | |
|---|---|---|---|---|
| 4,255,798 | A | * | 3/1981 | Havira ................ E21B 47/0005 181/105 |
| 4,524,432 | A | * | 6/1985 | Johnson ................... G01V 1/50 367/25 |
| 4,896,303 | A | * | 1/1990 | Leslie ................. E21B 47/0005 367/30 |
| 5,089,989 | A | | 2/1992 | Schmidt et al. |
| 5,354,956 | A | * | 10/1994 | Orban ................... B06B 1/0681 175/40 |
| 5,377,160 | A | | 12/1994 | Tello et al. |
| 8,861,307 | B2 | * | 10/2014 | Pabon ...................... G01V 1/52 181/104 |
| 2005/0065730 | A1 | * | 3/2005 | Sinha ....................... G01V 1/50 702/7 |
| 2018/0003844 | A1 | | 1/2018 | Sakiyama et al. |
| 2018/0003845 | A1 | | 1/2018 | Sakiyama et al. |

\* cited by examiner

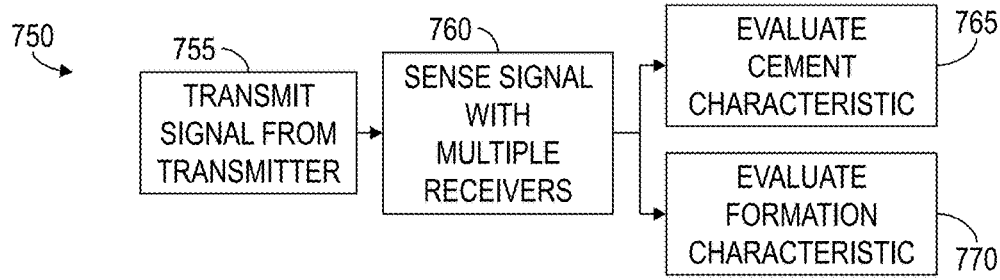
FIG. 24
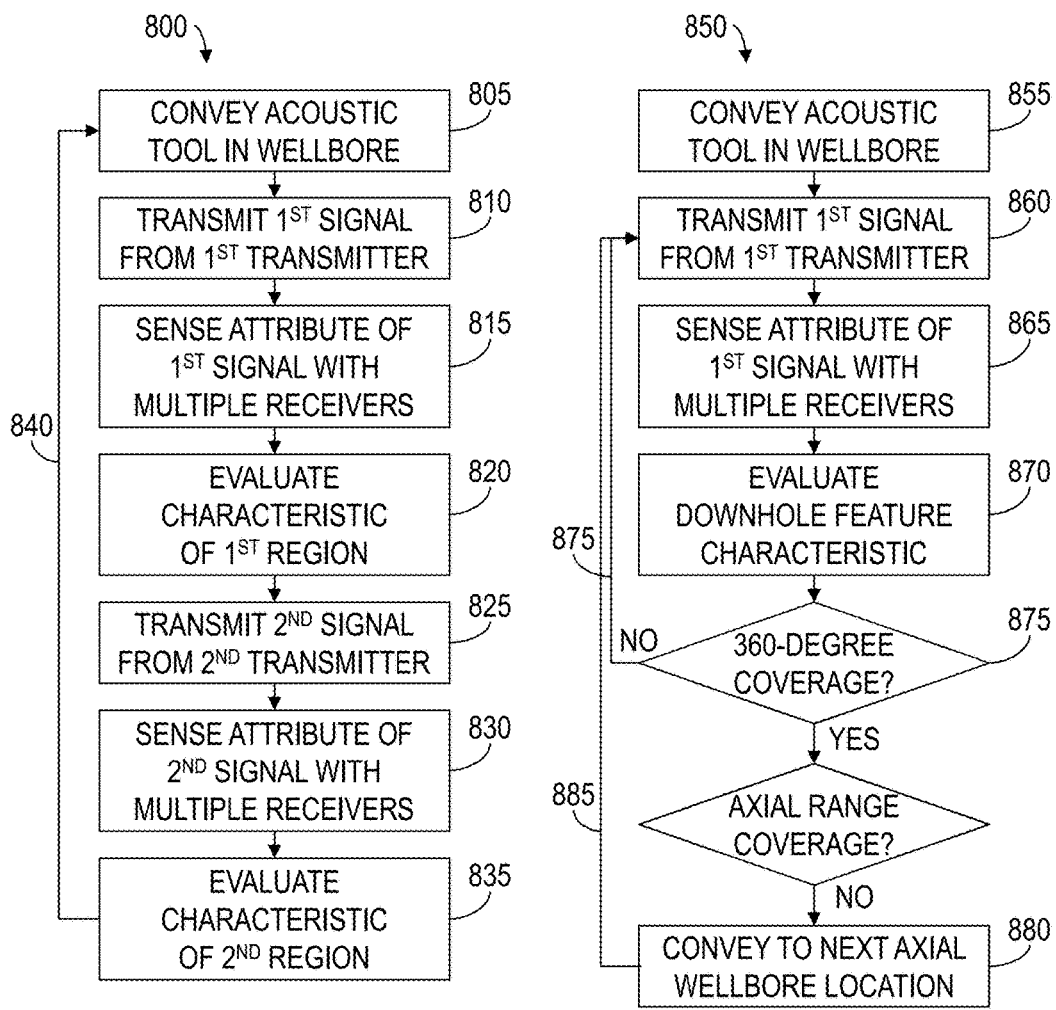
FIG. 25
FIG. 26

DOWNHOLE ACOUSTIC MAPPING

CROSS-REFERENCE TO RELATED APPLICATIONS

This application claims the benefit of and priority to U.S. Provisional Application No. 62/357,224, entitled "Acoustic Sensing with Azimuthally Distributed Transmitters and Receivers," filed on Jun. 30, 2016, the entire disclosure of which is hereby incorporated herein by reference.

BACKGROUND OF THE DISCLOSURE

The formation of an oil and gas well includes securing a metal casing within a wellbore via cement forming an annular structure between the sidewall of the wellbore and the outer diameter of the casing. Downhole acoustic tools may be utilized for cement bond logging (CBL) to evaluate bonding quality between the casing and the cement, such as by evaluating amplitudes of casing arrivals traveling from a transmitter to the casing and refracted to a sensor axially separated from the transmitter. Downhole acoustic tools may also or instead be utilized for radial bond logging (RBL) to evaluate azimuthal variation of the cement bonding, such as by evaluating casing arrivals across sensors at various azimuthal locations around the downhole acoustic tool.

However, CBL and RBL both resort to casing arrival amplitudes, which are sensitive to the position of the downhole acoustic tool within the casing. Consequently, eccentering of the downhole acoustic tool from the axis of the casing perturbs casing arrival amplitudes, which can result in inaccurate interpretation of the cement bonding quality.

Moreover, the measurement frequency range of acoustic logging tools are generally below 30 kilohertz (kHz), including for evaluating formation elastic properties in uncased, open-holes, and for evaluating cement bond quality in cased-holes. This frequency range limits the spatial resolution with which the acoustic logging tools can provide elastic properties of formations/muds in open-holes, and cement bonding quality around the casing in cased-holes.

To evaluate elastic properties of a formation having intrinsic and/or stress-induced anisotropy, open-hole acoustic logging may utilize monopole or multipole (e.g., dipole or quadrupole) logging. However, in azimuthally heterogeneous formations (e.g., bedding intersecting the wellbore in a horizontal well), logging results are less accurate, because averaged elastic properties are measured around the wellbore. Unipole logging may also be utilized, with an azimuthally focused (or localized) transmitter placed on one side of the tool, and with waveforms measured on the same side of the tool. However, because the transmitter and the array receivers are typically placed on just one side of the tool, the tool is rotated to provide azimuthally full coverage around the wellbore, which is possible with logging-while-drilling (LWD) implementations of the acoustic tool but not wireline and other non-LWD conveyance means, because non-LWD conveyance means generally cannot be manipulated at the surface in a manner permitting accurate rotational positioning of the acoustic tool.

To evaluate casing cement in cased-holes, the acoustic logging may utilize a frequency higher than 50 kHz. However, the impact of tool eccentering becomes larger because such logging is based just on amplitudes of measured casing signals. With lower frequencies, and/or in the presence of a second casing or a formation having a compressional slowness less than about 200 microseconds per meter (μs/m), additional inaccuracies may occur due to the acoustic signal wavelength not being sufficiently smaller than the features intended to be detected.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a downhole tool for operation within a wellbore. The downhole tool includes a first transmitter unit located at a first axial location of the downhole tool and operable to transmit a first acoustic signal at a first frequency that is less than 30 kilohertz. A first receiver unit of the downhole tool is located at a second axial location axially offset from the first axial location, and is operable to measure amplitude of the first acoustic signal. A second receiver unit of the downhole tool is located at a third axial location axially offset from the first and second axial locations, and is operable to measure amplitude of the first acoustic signal. A second transmitter unit of the downhole tool includes multiple transmitters azimuthally distributed around a longitudinal axis of the downhole tool at a fourth axial location axially offset from the first, second, and third axial locations. Each transmitter of the second transmitter unit is operable to transmit a second acoustic signal at a second frequency that is greater than 50 kilohertz. A third receiver unit of the downhole tool includes multiple receivers azimuthally distributed around the longitudinal axis and located at a fifth axial location axially offset from the first, second, third, and fourth axial locations. Each receiver of the third receiver unit is operable to measure amplitude of the second acoustic signal. A fourth receiver unit of the downhole tool includes multiple receivers azimuthally distributed around the longitudinal axis and located at a sixth axial location axially offset from the first, second, third, fourth, and fifth axial locations. Each receiver of the fourth receiver unit is operable to measure amplitude of the second acoustic signal.

The present disclosure also introduces a system including the downhole tool and surface equipment disposed at a wellsite surface from which the wellbore extends. One or both of the downhole tool and the surface equipment are individually and/or cooperatively operable to detect an empty space within cement behind a casing installed in the wellbore, based on the amplitude measurements obtained by one or more of the first, second, third, and fourth receiver units at two or more different azimuthal locations.

The present disclosure also introduces an apparatus including a downhole tool for operation within a wellbore, wherein the downhole tool includes a transmitter array having multiple transmitters azimuthally distributed around a longitudinal axis of the downhole tool at a first axial location of the downhole tool, a first receiver array having multiple first receivers azimuthally distributed around the longitudinal axis at a second axial location axially offset from the first axial location, and a second receiver array having multiple second receivers azimuthally distributed around the longitudinal axis at a third axial location axially offset from the first and second axial locations.

The present disclosure also introduces a system including a downhole tool for operation within a wellbore having a metal casing secured within the wellbore by cement. The downhole tool includes a transmitter unit located at a first axial location of the downhole tool and operable to transmit an acoustic signal at a frequency greater than 50 kilohertz, and a receiver unit having multiple receivers azimuthally distributed around the longitudinal axis and located at a second axial location axially offset from the first axial location. Each of the receivers is operable to measure amplitude of the transmitted acoustic signal at different azimuthal locations.

The present disclosure also introduces a method including conveying a downhole tool within a wellbore having a metal casing secured within the wellbore by cement, the downhole tool including a transmitter unit at a first axial location of the downhole tool, and a receiver unit having multiple receivers azimuthally spaced around a longitudinal axis at a second axial location axially offset from the first axial location. The method also includes operating the downhole tool to transmit an acoustic signal from the transmitter unit at a frequency greater than 50 kilohertz, receive the acoustic signal by each of the receivers, and detect amplitude of the acoustic signal received at different azimuthal locations of the downhole tool to detect an empty space within the cement.

The present disclosure also introduces an apparatus including a downhole tool for operation within a wellbore, the downhole tool including a sonde section having a transmitter unit located at a first axial location of the downhole tool and operable to transmit an acoustic signal, and a receiver unit located at a second axial location axially offset from the first axial location. The receiver unit is operable to receive the transmitted acoustic signal. The downhole tool also includes cantilevered masses connected with the sonde section on opposing sides of the sonde section and operable to maintain the sonde section substantially centralized within a deviated or horizontal portion of the wellbore.

The present disclosure also introduces a system including a downhole tool for operation within a wellbore, the downhole tool including a transmitter unit having multiple transmitters azimuthally distributed around a longitudinal axis of the downhole tool at a first axial location of the downhole tool. Each of the transmitters is operable to transmit an acoustic signal. The downhole tool also includes a first receiver unit having multiple first receivers azimuthally distributed around the longitudinal axis at a second axial location axially offset from the first axial location. Each of the first receivers is operable to measure amplitude of the transmitted acoustic signal at different azimuthal locations. The downhole tool also includes a second receiver unit having multiple second receivers azimuthally distributed around the longitudinal axis at a third axial location axially offset from the first and second axial locations. Each of the second receivers is operable to measure the amplitude of the transmitted acoustic signal at different azimuthal locations.

The present disclosure also introduces an apparatus including a downhole tool for operation within a wellbore, the downhole tool including a first transmitter unit located at a first axial location of the downhole tool and operable to transmit an acoustic signal at a first frequency that is less than 30 kilohertz, and a first receiver unit located at a second axial location axially offset from the first axial location and operable to measure amplitude of the acoustic signal transmitted by the first transmitter unit. The downhole tool also includes a second transmitter unit having multiple transmitters azimuthally distributed around a longitudinal axis of the downhole tool at a third axial location axially offset from the first and second axial locations. Each of the transmitters is operable to transmit an acoustic signal at a second frequency that is greater than 50 kilohertz. The downhole tool also includes a second receiver unit having multiple receivers azimuthally distributed around the longitudinal axis and located at a fourth axial location axially offset from the first, second, and third axial locations. Each of the receivers is operable to measure amplitude of the acoustic signal transmitted by the transmitters of the second transmitter unit. The downhole tool also includes a slotted sleeve.

The present disclosure also introduces an apparatus including a downhole tool for operation within a wellbore, the downhole tool including a transmitter unit having multiple transmitters azimuthally distributed around a longitudinal axis of the downhole tool at a first axial location of the downhole tool. Each of the transmitters is operable to transmit an acoustic signal. The transmitter unit also includes multiple arms each carrying a corresponding transmitter and operable to move the corresponding transmitter between a radially retracted position and a radially extended position. The downhole tool also includes a receiver unit at a second axial location axially offset from the first axial location. The receiver unit is operable to measure amplitude of the transmitted acoustic signal.

The present disclosure also introduces an apparatus including a downhole tool for operation within a wellbore, the downhole tool including a transmitter unit having multiple transmitters azimuthally distributed around a longitudinal axis of the downhole tool at a first axial location of the downhole tool. Each of the transmitters is operable to transmit an acoustic signal. The transmitter unit also includes a first end cap disposed on a first side of the transmitters, a second end cap disposed on a second side of the transmitters opposite the first side, a first sheet of flexible material disposed between the transmitters and the first end cap, and a second sheet of flexible material disposed between the transmitters and the second end cap. The downhole tool also includes a receiver unit at a second axial location axially offset from the first axial location and operable to measure amplitude of the transmitted acoustic signal.

The present disclosure also introduces an apparatus including a downhole tool for operation within a wellbore, the downhole tool including a transmitter unit located at a first axial location of the downhole tool and operable to transmit an acoustic signal, and a receiver unit located at a second axial location axially offset from the first axial location. The receiver unit includes multiple receivers each operable to measure amplitude of the transmitted acoustic signal at different azimuthal locations, a frame maintaining the receivers azimuthally distributed around the longitudinal axis at the second axial location, and multiple flexible members each disposed between the frame and a corresponding one of the receivers.

The present disclosure also introduces an apparatus including a downhole tool for operation within a wellbore, the downhole tool including a transmitter unit at a first axial location of the downhole tool operable to transmit an acoustic signal, and a receiver unit having multiple receivers azimuthally distributed around the longitudinal axis at a second axial location axially offset from the first axial location. Each of the receivers is operable to measure amplitude of the transmitted acoustic signal at different azimuthal locations. Each of the receivers includes oppositely polarized surfaces that are substantially perpendicular to a radial line extending from the longitudinal axis to each one of the receivers.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 24 is a flow-chart diagram of at least a portion of an example implementation of a method according to one or more aspects of the present disclosure.

FIG. 25 is a flow-chart diagram of at least a portion of an example implementation of a method according to one or more aspects of the present disclosure.

FIG. 26 is a flow-chart diagram of at least a portion of an example implementation of a method according to one or more aspects of the present disclosure.

DETAILED DESCRIPTION

Figure 1:
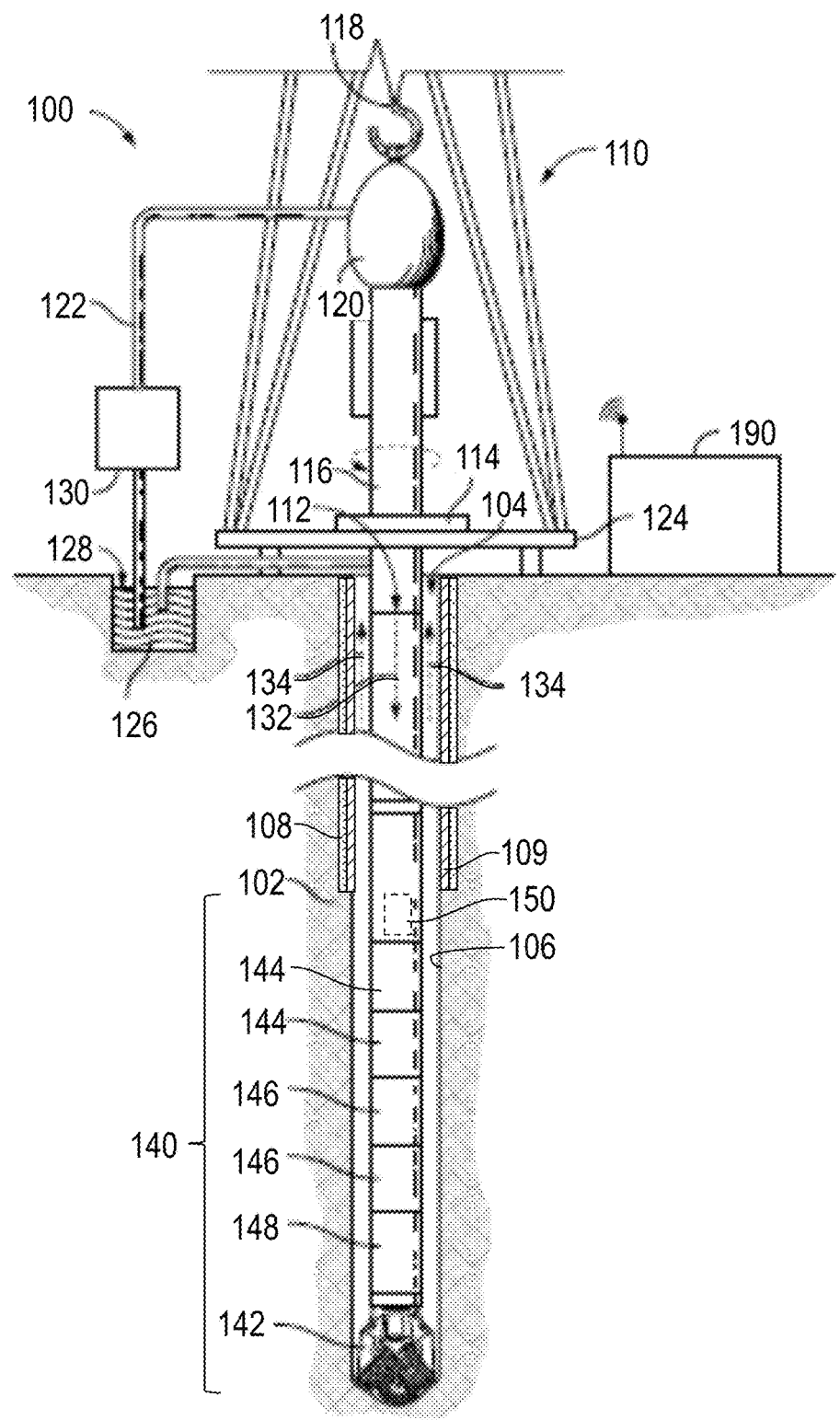
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

The present disclosure introduces one or more aspects that may be utilized to correct acoustic signal perturbation caused by tool eccentering. For example, the correction may be determined by processing travel times of casing amplitudes. If the downhole acoustic tool is eccentered, a sensor at one azimuthal location of the tool that is closer to the casing wall will detect the casing arrivals earlier than another sensor at an opposite azimuthal location of the tool. One or more aspects of the present disclosure pertain to determining a correction factor that varies as a function of the arrival times of the casing arrival amplitudes, and perhaps other environmental variables, to compensate for the error of the casing amplitudes brought about by the tool eccentering.

FIG. 1 is a schematic view of an example wellsite system 100 to which one or more aspects of the present disclosure may be applicable. The wellsite system 100 may be onshore or offshore. In the example wellsite system 100 shown in FIG. 1, a wellbore 104 is formed in one or more subterranean formation 102 by rotary drilling. Other example systems within the scope of the present disclosure may also or instead utilize directional drilling. While some elements of the wellsite system 100 are depicted in FIG. 1 and described below, it is to be understood that the wellsite system 100 may include other components in addition to, or in place of, those presently illustrated and described.

As shown in FIG. 1, a drillstring 112 suspended within the wellbore 104 comprises a bottom hole assembly (BHA) 140 that includes or is coupled with a drill bit 142 at its lower end. The surface system includes a platform and derrick assembly 110 positioned over the wellbore 104. The platform and derrick assembly 110 may comprise a rotary table 114, a kelly 116, a hook 118, and a rotary swivel 120. The drillstring 112 may be suspended from a lifting gear (not shown) via the hook 118, with the lifting gear being coupled to a mast (not shown) rising above the surface. An example lifting gear includes a crown block affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of tubular members, such as drill pipes, threadedly attached one to another, perhaps including wired drilled pipe.

The drillstring 112 may be rotated by the rotary table 114, which engages the kelly 116 at the upper end of the drillstring 112. The drillstring 112 is suspended from the hook 118 in a manner permitting rotation of the drillstring 112 relative to the hook 118. Other example wellsite systems within the scope of the present disclosure may utilize a top drive system to suspend and rotate the drillstring 112, whether in addition to or instead of the illustrated rotary table system.

The surface system may further include drilling fluid or mud 126 stored in a pit or other container 128 formed at the wellsite. As described above, the drilling fluid 126 may be oil-based mud (OBM) or water-based mud (WBM). A pump 130 delivers the drilling fluid 126 to the interior of the drillstring 112 via a hose or other conduit 122 coupled to a port in the rotary swivel 120, causing the drilling fluid to flow downward through the drillstring 112, as indicated in FIG. 1 by directional arrow 132. The drilling fluid exits the drillstring 112 via ports in the drill bit 142, and then circulates upward through the annulus region between the outside of the drillstring 112 and the wall 106 of the wellbore 104, as indicated in FIG. 1 by directional arrows 134. In this manner, the drilling fluid 126 lubricates the drill bit 142 and carries formation cuttings up to the surface as it is returned to the container 128 for recirculation.

The BHA 140 may comprise one or more specially made drill collars near the drill bit 142. Each such drill collar may comprise one or more devices permitting measurement of downhole drilling conditions and/or various characteristic properties of the subterranean formation 102 intersected by the wellbore 104. For example, the BHA 140 may comprise one or more logging-while-drilling (LWD) modules 144, one or more measurement-while-drilling (MWD) modules 146, a rotary-steerable system and motor 148, and perhaps the drill bit 142. Of course, other BHA components, modules, and/or tools are also within the scope of the present disclosure, and such other BHA components, modules, and/or tools may be positioned differently in the BHA 140.

The LWD modules 144 may comprise a downhole acoustic tool for evaluating bonding quality of cement 108 securing a casing 109 that lines at least a portion of the wellbore 104, and/or for evaluating portions of the formation 102 surrounding the wellbore 104. Example aspects of such acoustic tools are described below.

The MWD modules 146 may comprise one or more devices for measuring characteristics of the drillstring 112 and/or the drill bit 142, such as for measuring weight-on-bit, torque, vibration, shock, stick slip, tool face direction, and/or inclination, among others. The MWD modules 156 may further comprise an apparatus (not shown) for generating electrical power to be utilized by the downhole system. This may include a mud turbine generator powered by the flow of the drilling fluid 126. Other power and/or battery systems may also or instead be employed.

The wellsite system 100 also includes a data processing system that can include one or more, or portions thereof, of the following: the surface equipment 190, control devices and electronics in one or more modules of the BHA 140 (such as a downhole controller 150), a remote computer system (not shown), communication equipment, and other equipment. The data processing system may include one or more computer systems or devices and/or may be a distributed computer system. For example, collected data or information may be stored, distributed, communicated to a human operator, and/or processed locally or remotely.

The data processing system may, individually or in combination with other system components, perform the methods and/or processes described below, or portions thereof. For example, such data processing system may include processor capability for collecting data related to the amplitude and travel/arrival times of acoustic signals transmitted and received by an acoustic tool of the LWD modules 144. Methods and/or processes within the scope of the present disclosure may be implemented by one or more computer programs that run in a processor located, for example, in one or more modules of the BHA 140 and/or the surface equipment 190. Such programs may utilize data received from the BHA 140 via mud-pulse telemetry and/or other telemetry means, and/or may transmit control signals to operative elements of the BHA 140. The programs may be stored on a tangible, non-transitory, computer-usable storage medium associated with the one or more processors of the BHA 140 and/or surface equipment 190, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
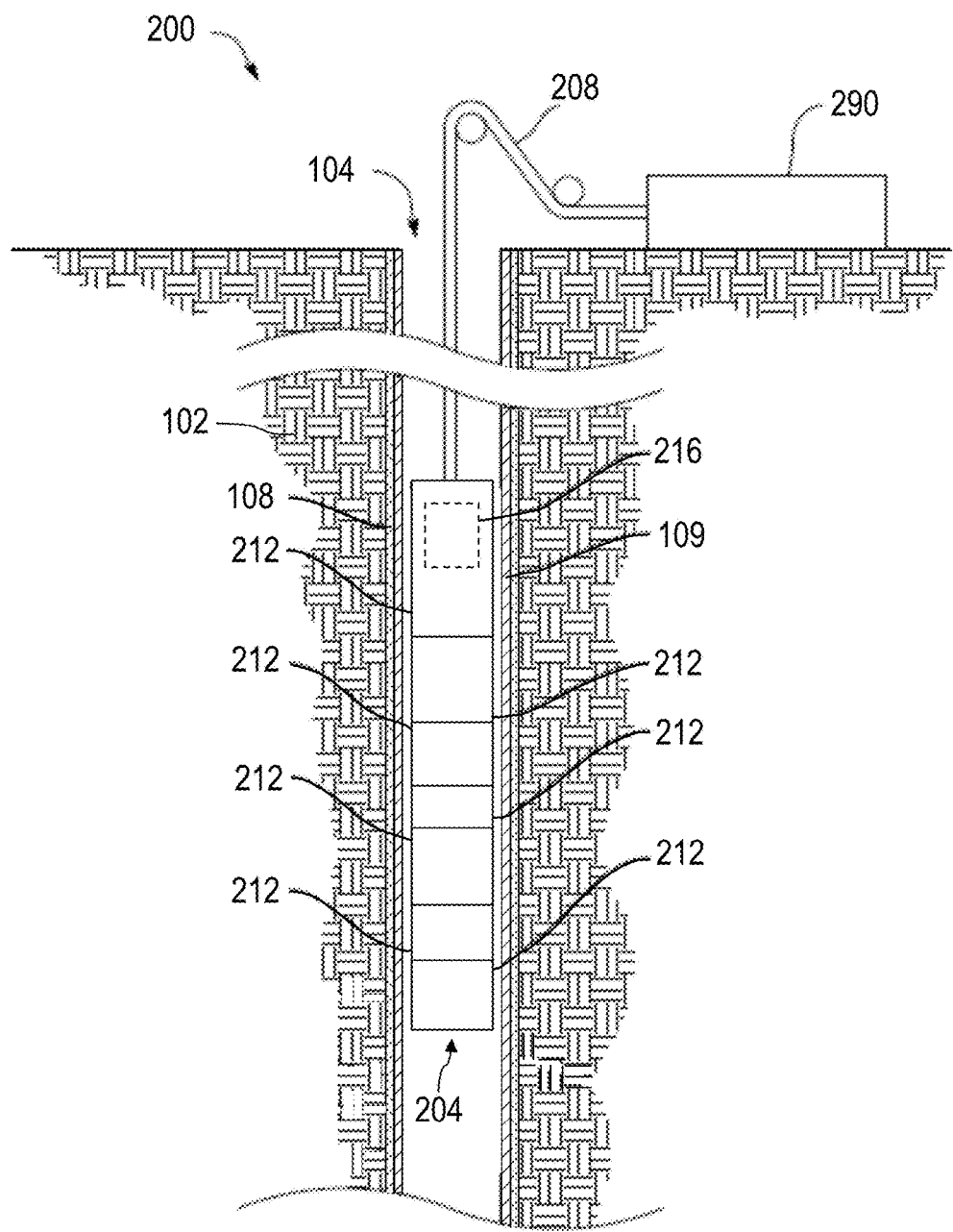
FIG. 2 is a schematic view of at least a portion of an example implementation of apparatus according to one or more aspects of the present disclosure.

FIG. 2 is a schematic view of another example wellsite system 200 to which one or more aspects of the present disclosure may be applicable. The wellsite system 200 may be onshore or offshore. In the example wellsite system 200 shown in FIG. 2, a tool string 204 is conveyed into the wellbore 104 via a wireline and/or other conveyance means 208. As with the wellsite system 100 shown in FIG. 1, the example wellsite system 200 of FIG. 2 may be utilized for evaluation of the wellbore 104, the cement 108 securing the casing 109 within the wellbore 104, and/or the formation 102 penetrated by the wellbore 104.

The tool string 204 is suspended in the wellbore 104 from the lower end of the wireline 208, which may be a multi-conductor logging cable spooled on a winch (not shown). The wireline 208 may include at least one conductor that facilitates data communication between the tool string 204 and surface equipment 290 disposed on the surface. The surface equipment 290 may have one or more aspects in common with the surface equipment 190 shown in FIG. 1.

The tool string 204 and wireline 208 may be structured and arranged with respect to a service vehicle (not shown) at the wellsite. For example, the wireline 208 may be connected to a drum (not shown) at the wellsite surface, permitting rotation of the drum to raise and lower the tool string 204. The drum may be disposed on a service truck or a stationary platform. The service truck or stationary platform may further contain the surface equipment 290.

The tool string 204 comprises one or more elongated housings encasing various electronic components and modules schematically represented in FIG. 2. For example, the illustrated tool string 204 includes several modules 212, at least one of which may be or comprise at least a portion of an acoustic tool as described below. Other implementations of the downhole tool string 204 within the scope of the present disclosure may include additional or fewer components or modules relative to the example implementation depicted in FIG. 2.

The wellsite system 200 also includes a data processing system that can include one or more, or portions thereof, of the following: the surface equipment 290, control devices and electronics in one or more modules of the tool string 204 (such as a downhole controller 216), a remote computer system (not shown), communication equipment, and other equipment. The data processing system may include one or more computer systems or devices and/or may be a distributed computer system. For example, collected data or information may be stored, distributed, communicated to the human operator, and/or processed locally or remotely.

The data processing system may, individually or in combination with other system components, perform the methods and/or processes described below, or portions thereof. For example, such data processing system may include processor capability for collecting data related to the evaluation of the cement 108 and/or the formation 102 according to one or more aspects of the present disclosure. Methods and/or processes within the scope of the present disclosure may be implemented by one or more computer programs that run in a processor located, for example, in one or more modules 212 of the tool string 204 and/or the surface equipment 290. Such programs may utilize data received from the downhole controller 216 and/or other modules 212 via the wireline 208, and may transmit control signals to operative elements of the tool string 204. The programs may be stored on a tangible, non-transitory, computer-usable storage medium associated with the one or more processors of the downhole controller 216, other modules 212 of the tool string 204, and/or the surface equipment 290, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

While FIGS. 1 and 2 illustrate example wellsite systems 100 and 200, respectively, that convey a downhole tool/string into a wellbore, other example implementations consistent with the scope of this disclosure may utilize other conveyance means to convey a tool into a wellbore, including coiled tubing, tough logging conditions (TLC), slickline, and others. Additionally, other downhole tools within the scope of the present disclosure may comprise components in a non-modular construction also consistent with the scope of this disclosure.

Figure 3:
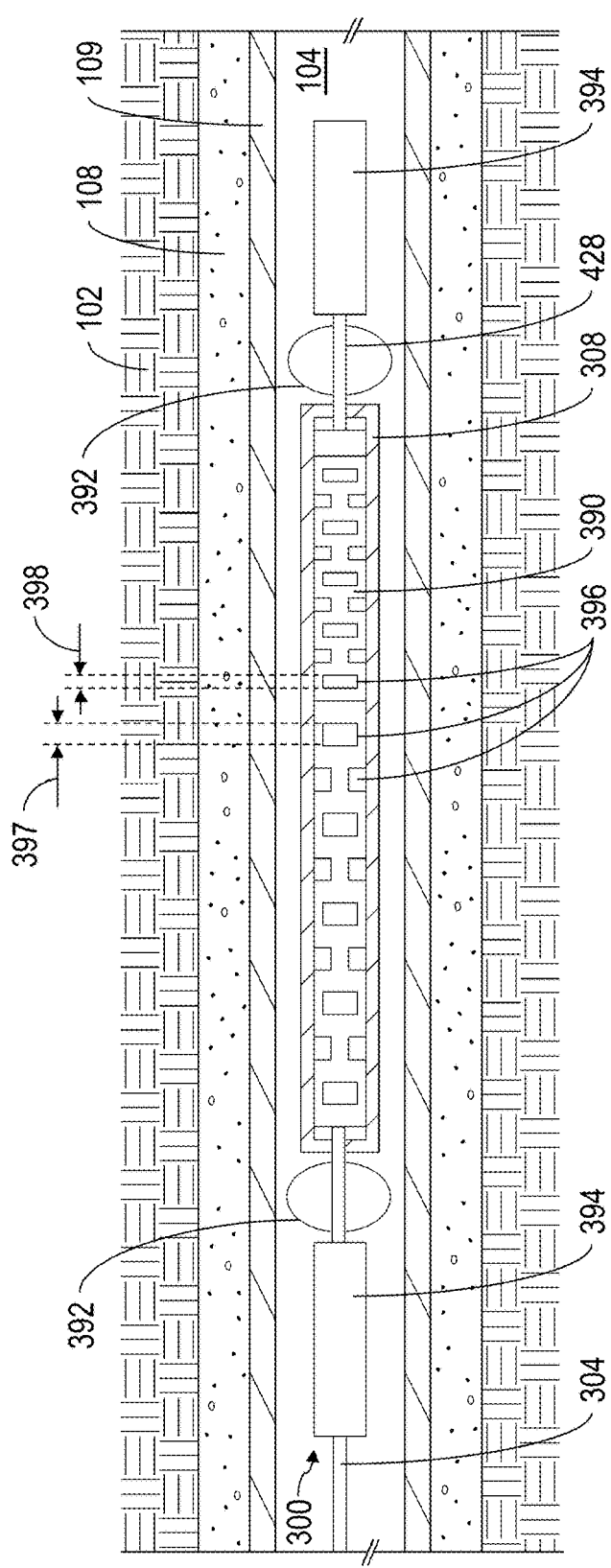
FIG. 3 is a schematic view of a portion of an example implementation of apparatus according to one or more aspects of the present disclosure.

FIG. 3 is a schematic sectional view of at least a portion of an example implementation of an acoustic tool 300 according to one or more aspects of the present disclosure. The acoustic tool 300 may be implemented as one or more of the LWD modules 144 shown in FIG. 1 and/or one or more of the modules 212 shown in FIG. 2, and may thus be conveyed within the wellbore 104 via drill string, wireline, and/or other conveyance means 304 schematically depicted in FIG. 3. The acoustic tool 300 may be utilized to evaluate the cement 108 securing the casing 109 within the wellbore 104, and/or to evaluate portions of the formation 102 surrounding the wellbore 104, according to one or more aspects of the present disclosure. In FIG. 3, the acoustic tool 300 is depicted as being disposed in a substantially horizontal portion of the wellbore 104. However, the acoustic tool 300 may also be utilized in other deviated or vertical portions of a wellbore.

The acoustic tool 300 includes a housing 308 (or multiple housings) and/or a hybrid slotted sleeve 390 encasing operational components described below. The slotted sleeve 390 may be operable to attenuate or reduce arrival times of the acoustic signals transmitted and received by corresponding portions of the acoustic tool 300. The slotted sleeve 390 may comprise a plurality of slots 396 extending radially through the sleeve 390 and distributed axially along the length of the slotted sleeve 390. The slots may be elongated, extending circumferentially around the slotted sleeve 390. The slotted sleeve 390 may comprise slots 396 having different sizes, wherein some of the slots 396 are larger than others. For example, the plurality of slots 396 may comprise slots having a first size 397 (e.g., width) and slots having a second size 398, wherein the first size 397 is larger than the second size 398. Furthermore, the slotted sleeve 390 may comprise slots 396 having different circumferential sizes (e.g., length), wherein some of the slots 396 are longer than others.

The acoustic tool 300 may also include cantilevered masses 394 extending from opposing ends of the housing 308 and downhole centralizers 392 located between the housing 308 and the corresponding cantilevered mass 394. The centralizers 392 may centralize, lift, or otherwise maintain at least a portion of the acoustic tool 300 centralized within the wellbore 104.

Figure 4:
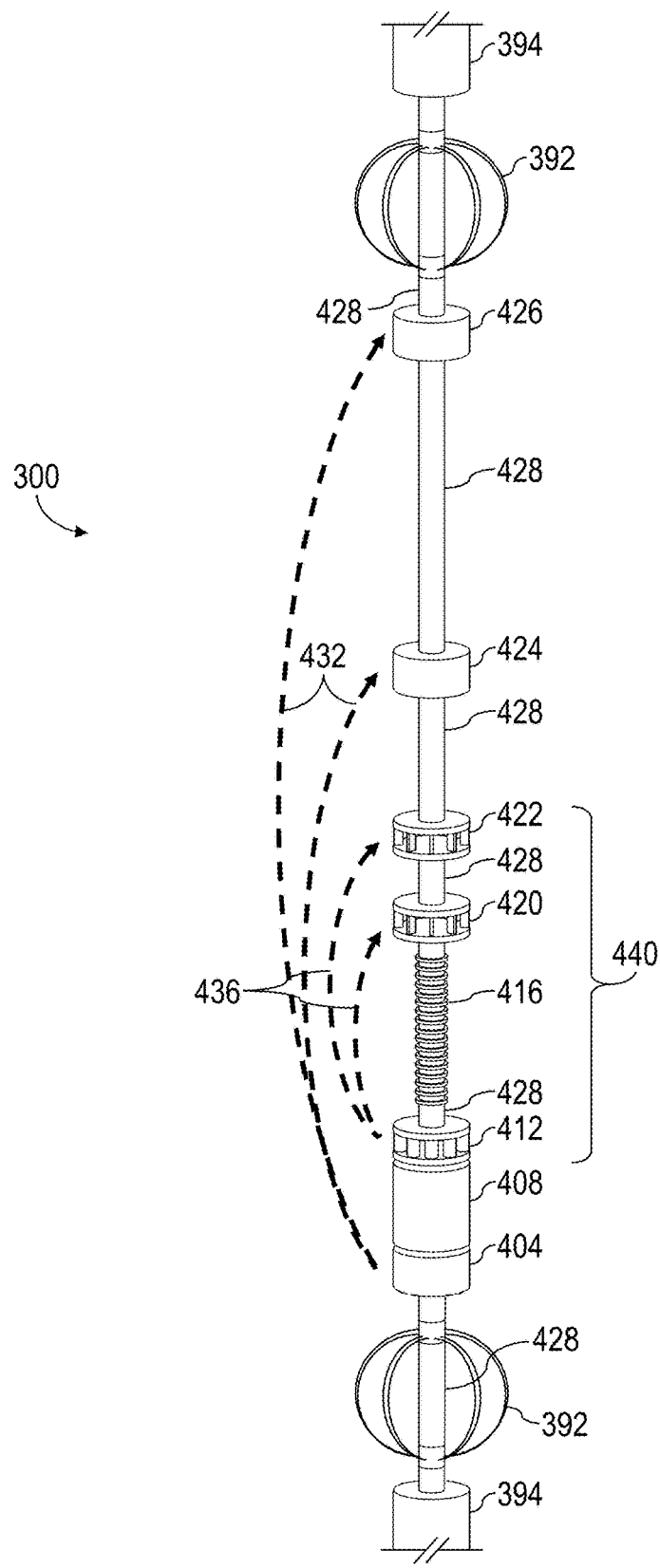
FIG. 4 is a schematic view of a portion of the apparatus shown in FIG. 3.

FIG. 4 is a perspective view of a portion of the acoustic tool 300 having been removed from the wellbore 104, and with the housing 308 and hybrid slotted sleeve 390 removed for clarity. In addition to the cantilevered masses 394 and centralizers 392 shown in FIG. 3, the acoustic tool 300 may also include one or more of a low-frequency transmitter unit 404, electronics 408, a high-frequency transmitter unit 412 (i.e., station or array), a bellows attenuator 416, one or more high-frequency receiver units 420, 422, and one or more low-frequency receiver units 424, 426, as well as various structural members 428 interconnecting such components.

The electronics 408 may be, comprise, or form at least a portion of the downhole controller 150 shown in FIG. 1 or the downhole controller 216 shown in FIG. 2. The electronics 408 are operable to, for example, cause the transmitter units 404, 412 to emit acoustic signals 432, 436 (i.e., waves) and detect the acoustic signals 432, 436 with the corresponding receiver units 420, 422, 424, 426, such as for detecting the travel time of the acoustic signals 432, 436 between the transmitter units 404, 412 and the corresponding receiver units 420, 422, 424, 426, as well as amplitudes of the acoustic signals 432, 436 received at the receiver units 420, 422, 424, 426. To increase clarity and aid with understanding, additional features and components of the acoustic tool 300 not relevant to the following description are omitted in the figures, but it is understood that such features and components may exist in various implementations within the scope of the present disclosure. It is also noted that other implementations of an acoustic tool within the scope of the present disclosure may omit one or more of the components depicted in the figures.

Figure 5:
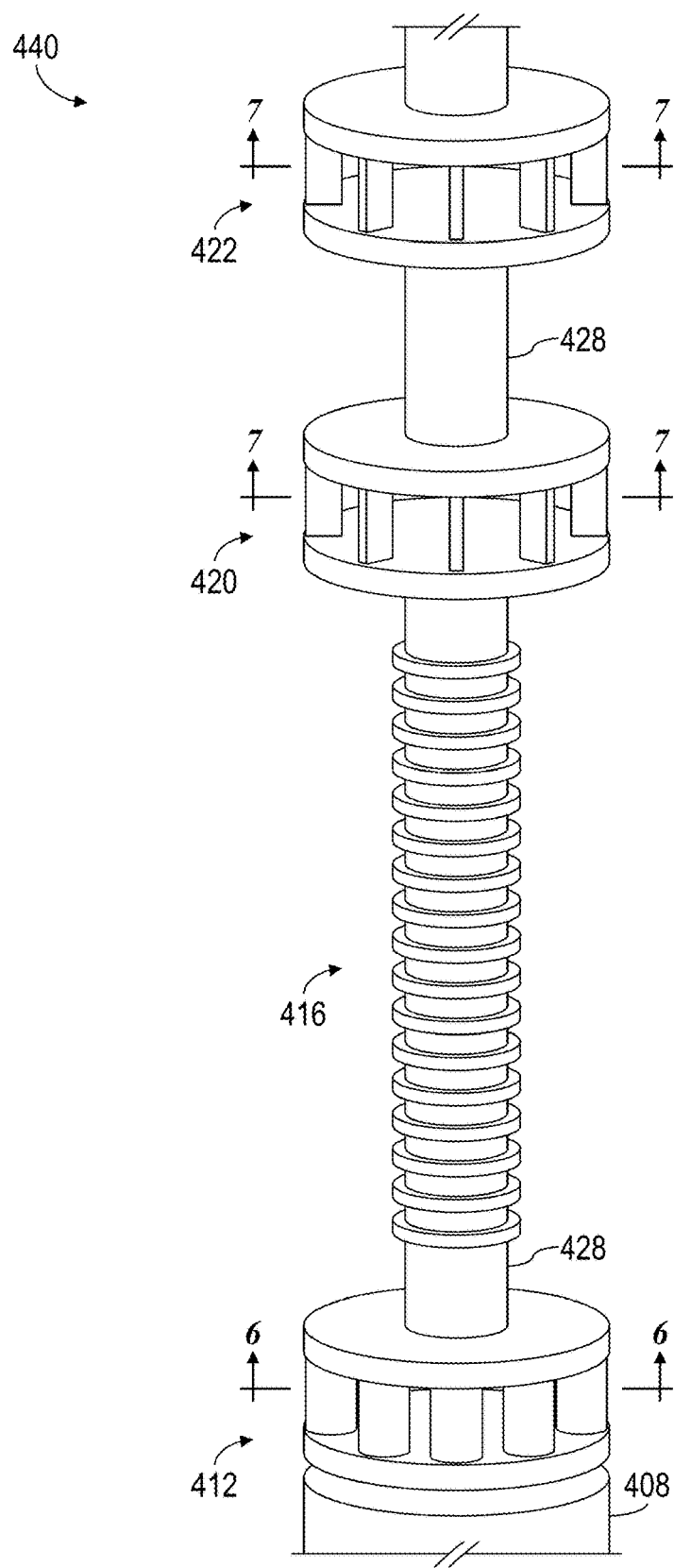
FIG. 5 is a schematic view of a portion of the apparatus shown in FIG. 4.

FIG. 5 is a perspective view of a mapping portion 440 (i.e., a sonde) of the acoustic tool 300 shown in FIG. 4. For example, the mapping portion 440 may comprise the high-frequency transmitter unit 412, the bellows attenuator 416, and one or more high-frequency receiver units 420, 422, as well as various structural members 428.

Figure 6:
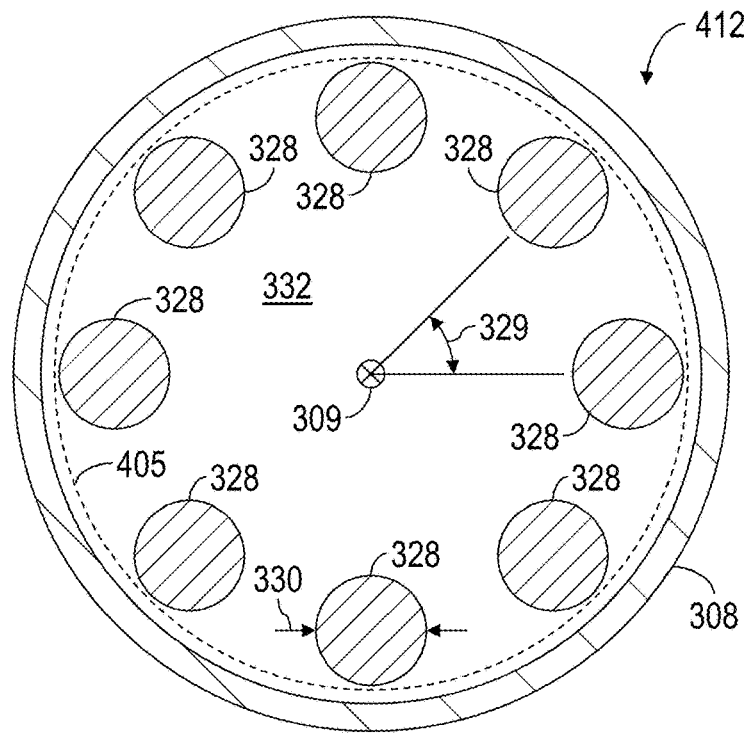
FIGS. 6 and 7 are sectional views of the apparatus shown in FIG. 5.

FIG. 6 is a sectional schematic view of at least a portion of an example implementation of the high-frequency transmitter unit 412. The example high-frequency transmitter unit 412 comprises eight transmitters 328 positionally fixed within the housing 308 via an attachment structure 332. The transmitters 328 are independently and/or collectively operable to excite acoustic energy to induce monopole, dipole, and other higher order azimuthal modes, depending on which transmitters 328 are excited simultaneously and their polarity, to generate acoustic signals 436 as depicted in FIG. 4. In addition, by exciting each transmitter 328 one-by-one, a unipole excitation may also be achieved. Each transmitter 328 may comprise a substantially cylindrical portion of piezoelectric material, such as PZT C-64, and and/or other materials permitting each transmitter 328 to be independently operated or activated as a point source. Each transmitter may comprise other shapes of piezoelectric material. The frequency of the acoustic signals 436 generated by the transmitters 328 may vary within the scope of the present disclosure, such as between about 20 kHz and about 200 kHz, with an example implementation at a frequency of about 100 kHz.

The transmitters 328 are distributed azimuthally around a central axis 309 of the housing 308. The azimuthal spacing 329 between neighboring ones of the transmitters 328 may be about 45 degrees. Each transmitter 328 may have a diameter 330 ranging between about 1.5 centimeters (cm) and about 5 cm, and a length (extending into and out of the page) ranging between about 2.5 cm and about 10 cm. However, other numbers, spacings, and sizes of the transmitters 328 are also within the scope of the present disclosure.

The low-frequency transmitter unit 404 may be substantially similar to the high-frequency transmitter unit 412, but is depicted in FIG. 4 as a conventional monopole source. For example, such implementations may comprise a single transmitter, represented in FIG. 6 by a dashed-line circle 405 encompassing the array of smaller transmitters 328. Similarly, the low-frequency receivers 424, 426 may also be single element receivers, such as may be conventionally utilized with monopole sources. Implementations within the scope of the present disclosure may also comprise other types and arrangements of acoustic transmitters and receivers, whether instead of or in addition to the example implementations depicted in the figures.

Figure 7:
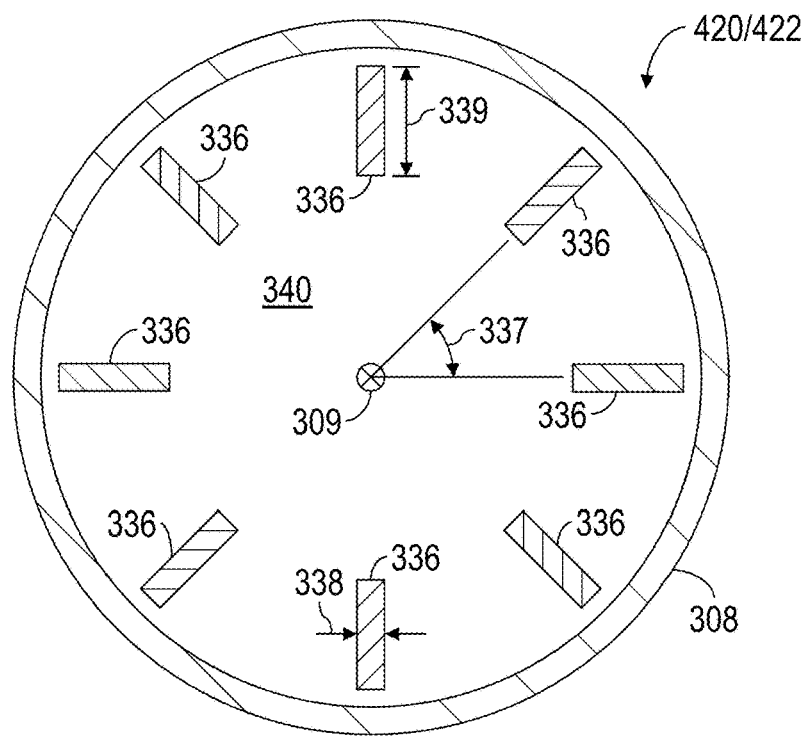

FIG. 7 is a sectional schematic view of at least a portion of an example implementation of the high-frequency receiver units 420, 422. The example high-frequency receiver units 420, 422 each comprise eight receivers 336 positionally fixed within the housing 308 via an attachment structure 340. The receivers 336 are each independently operable to detect acoustic energy excited by the high-frequency transmitter unit 412, whether transmitted as unipole, monopole, dipole, and other higher order azimuthal modes. Thus, the receivers 336 may be used for measuring amplitudes and travel times of the acoustic signals 436.

The receivers 336 are distributed azimuthally around the central axis 309 of the housing 308. The azimuthal spacing 337 between neighboring ones of the receivers 336 may be about 45 degrees, and each receiver 336 may be substantially aligned azimuthally with a corresponding one of the high-frequency transmitters 328, or the array of high-frequency receivers 336 may be azimuthally offset from the array of high-frequency transmitters 328, such as in implementations in which the array of high-frequency receivers 336 is rotated 20-25 degrees around the central axis 309 relative to the array of high-frequency transmitters 328. Each receiver 336 may comprise a substantially rectangular cuboid geometry having rectangular surfaces. For example, each receiver 336 may have a width 338 ranging between about 0.5 cm and about 2 cm, a length 339 ranging between about 1.5 cm and about 5 cm, and a height (extending into and out of the page in FIG. 7) ranging between about 2.5 cm and about 10 cm. However, other numbers, spacings, sizes, and shapes of the receivers 336 are also within the scope of the present disclosure.

Each receiver 336 may be or comprise piezoelectric material, such as PZT C-64, and and/or other materials permitting each receiver 336 to be independently operated or activated as an individual receiver at the operating frequencies described above with respect to the high-frequency transmitter unit 412. Implementations within the scope of the present disclosure may also comprise other types and arrangements of acoustic receivers, whether instead of or in addition to the example implementations depicted in the figures.

The present disclosure introduces one or more aspects related to using data from a receiver at the same azimuth as the firing transmitter, referred to herein as an axial path, as well as data from one or more receivers at different azimuths relative to the firing transmitter, referred to herein as an angle path. Employing both axial and angle paths, such as for azimuthal cement evaluation, can obtain azimuthally distributed measurements for amplitude, attenuation, and/or transmit time with a relatively small number of transmitters. The multiple data points on the same azimuth can be also used for quality control and further enhancement of the cement bond image. In addition, the usage of both axial and angle paths can be also useful for open-hole applications, such as if formation properties are different in azimuth, such as anisotropy and azimuthal heterogeneity. One or more aspects of the present disclosure may also be more effective for relatively high-frequency (e.g., 100 kHz) sonic measurements in which spatial resolution is higher than that of conventional sonic logging (e.g., less than about 30 kHz), so that angle path signals can provide distinguishable information in different azimuths, relative to just axial path operations.

Conventional cement mapping tools with a monopole source and multiple azimuthal receivers that operate at low frequencies (e.g., less than about 30 kHz) can be limited by the lack of an azimuthal receiver array, such that there is just one station in the axial direction, and by the inability to address attenuation, as well as the sonic frequency not being as effective at higher frequencies (e.g., 100 kHz). Other conventional cement mapping tools with pad-mounted azimuthal sources and receivers can be limited by the axial path not being addressed due to a limited number of receivers, as well as tool dimensions. Other conventional cement mapping tools with sectored transmitters and receivers that operate at high frequencies (e.g., about 100 kHz) can be limited by the lack of an azimuthal array, such that there is just one station in the axial direction, and by the inability to address attenuation.

Conventional LWD open hole unipole measurements can be limited by the lack of an azimuthal array, such that just one receiver is at the same azimuth of the unipole source, and by the sonic frequency not being as effective at higher frequencies (e.g., about 100 kHz). Other conventional open-hole tools can be limited in that dipole measurements can provide formation anisotropy, such as intrinsic and/or stress-induced, but not azimuthal heterogeneity in the wellbore. Other conventional open-hole tools can also be limited in that the sonic frequency is not as effective at higher frequencies (e.g., about 100 kHz) for azimuthal amplitude analysis.

The present disclosure introduces using both axial and angle paths with azimuthally distributed receivers, perhaps including with a unipole source. Such implementations may utilize high-frequency sonic measurements, such as about 100 kHz.

One or more aspects of the present disclosure relate to obtaining coverage of a wide range of azimuthal measurements with relatively small number of transmitters for radial cement bond evaluation. For example, for eight azimuthally sectored measurements, eight transmitters may be utilized to cover the azimuthal range if using just axial paths. However, by using angle paths according to one or more aspects of the present disclosure, coverage of the same azimuthal range may be obtained utilizing just four transmitters. One or more aspects of the present disclosure also relate to enhancement of image, quality control, and robust measurements by utilizing multiple data on the same azimuth point for radial cement bond evaluation. One or more aspects of the present disclosure also relate to applicability for open-hole formation evaluations, such as intrinsic/stress anisotropies, azimuthal heterogeneity, and others.

Figure 8:
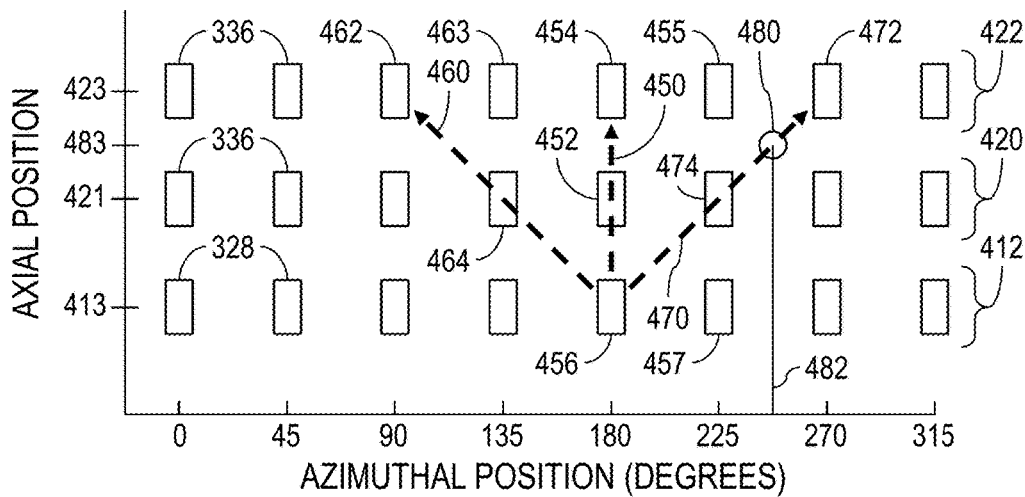
FIG. 8 is a schematic view of a portion of an example implementation of apparatus according to one or more aspects of the present disclosure.

FIG. 8 is a schematic view of an example implementation of the acoustic tool 300 described above, including multiple azimuthal sources and receiver arrays for azimuthal measurements of sonic/ultrasonic pitch catch according to one or more aspects of the present disclosure. The transmitters 328 of the transmitter unit 412 are positioned at an axial position 413, the receivers 336 of the receiver unit 420 are positioned at an axial position 421, and the receivers 336 of the receiver unit 422 are positioned at an axial position 423. When each transmitter 328 is fired independently, it is referred to as unipole measurement. Based on such measurement, one of the transmitters 328 at a side of the casing/formation tends to focus energy on that side of casing/formation. The signal from the casing/formation back to the receivers 336 located at the same side can be used for evaluation of that azimuthal direction.

FIG. 8 depicts a measurement with an axial path 450 in which a receiver 336 of the receiver unit 420 (designated in FIG. 8 by reference number 452) and a receiver 336 of the receiver unit 422 (designated in FIG. 8 by reference number 454) are located at the same azimuth (180 degrees) as the transmitter 328 that is firing (designated in FIG. 8 by reference number 456). With this method, other transmitters 328 in different azimuths are utilized to cover different azimuthal measurement points, unless the acoustic tool 300 is rotated. On the other hand, when multiple, azimuthally-distributed receivers 336 are available, there is additional data available from the multiple receivers while still firing just one of the transmitters 328.

For example, FIG. 8 also depicts an angle path 460 extending from the firing transmitter 456 to a receiver 336 of the receiver unit 422 (designated in FIG. 8 by reference number 462) at an azimuthal position of 90 degrees, thus azimuthally offset from the firing transmitter 456 by 90 degrees. The angle path 460 also extends through a receiver 336 of the receiver unit 420 (designated in FIG. 8 by reference number 464) at an azimuthal position of 135 degrees, thus azimuthally offset from the firing transmitter 456 by 45 degrees. Another angle path 470 similarly extends from the firing transmitter 456 to a receiver 336 of the receiver unit 422 (designated in FIG. 8 by reference number 472) at an azimuthal position of 270 degrees, including through a receiver 336 of the receiver unit 420 (designated in FIG. 8 by reference number 474) at an azimuthal position of 225 degrees. With this method, different azimuthal measurement points can be covered without actual transmitter allocation. Moreover, measurements can also be obtained (or deduced) at azimuthal locations between the azimuthal positions of the receivers 336. For example, this is depicted in FIG. 8 by a measurement 480 at an azimuthal position 482 and axial position 483 interposing the receivers 472, 474.

Figure 9:
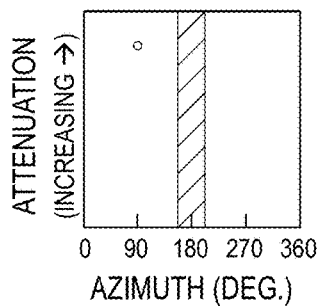
FIGS. 9-14 are graphs each depicting one or more aspects related to the present disclosure.
Figure 10:
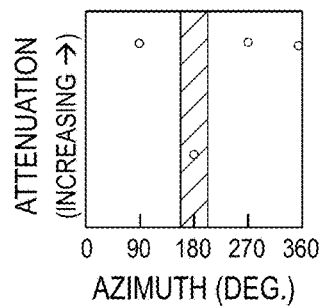
Figure 11:
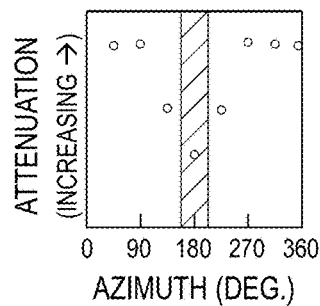
Figure 12:
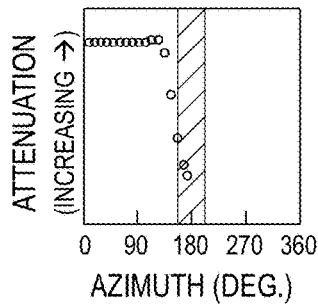
Figure 13:
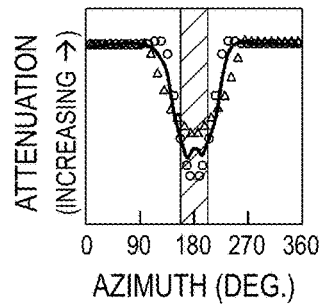
Figure 14:
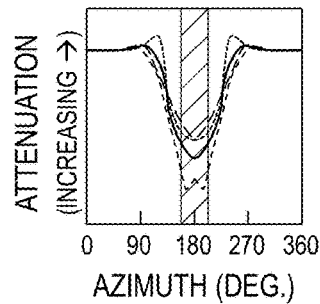

FIGS. 9-14 are graphs depicting an example application of the axial and angle paths for azimuthal cement bond evaluation by using attenuations of casing extensional mode. FIGS. 9-11 represent attenuation of casing extensional mode with just axial paths, and not angle paths, while FIGS. 12-14 represent attenuation of casing extensional mode with axial and angle paths. The stripe centered at 180 degrees represents the presence of a cement channel (e.g., empty gap or space) in that particular azimuth. FIGS. 9 and 12 are the case of firing just one transmitter 328. In such case, for receivers 336 that are not azimuthally aligned along the axial path with the transmitter 328, interpolation of detected casing amplitudes in locations azimuthally between the receivers 336 is applied to calculate attenuation. Employing both axial and angle paths can extend the measurement points to cover a wide range in azimuth, and permits measurements to cover the full azimuthal range with a relatively small number of transmitters, as shown in FIG. 13 depicting an example implementation firing four transmitters 328, and as shown in FIG. 14 depicting an example implementation firing eight transmitters 328.

In addition, there can be multiple data at the same azimuth with different path directions, such as the opposing angle paths 460 and 470 shown in FIG. 8, by considering the number of transmitters and path angles. The multiple data points on the same azimuth can be used for ensuring quality control of the cement bond evaluation, compensation of missing points when transmitters and/or receivers fails, and further enhancement of the image itself. For example, FIGS. 13 and 14 each include a solid line depicting an average of the measurements at each azimuthal location.

FIGS. 9-14 illustrate that a lower number of transmitters 328 can be utilized with angle paths and achieve the same result as with more transmitters utilizing just axial paths. Such implementations may also permit additional data being available for robust interpolation and quality assurance.

Figure 15:
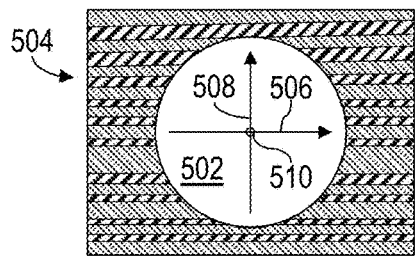
FIG. 15 is a schematic view of a portion of an example subterranean formation pertaining to one or more aspects of the present disclosure.
Figure 16:
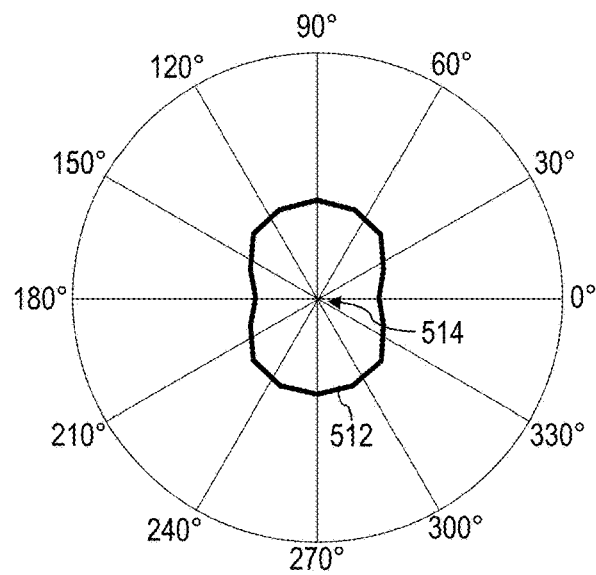
FIG. 16 is a graph depicting one or more aspects of the formation shown in FIG. 15.
Figure 17:
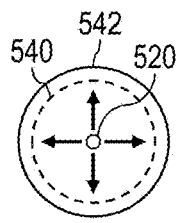
FIGS. 17-21 are schematic views depicting example excitations within the scope of the present disclosure.
Figure 18:
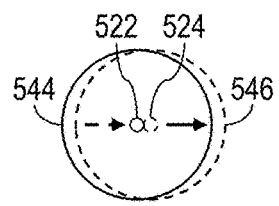
Figure 19:
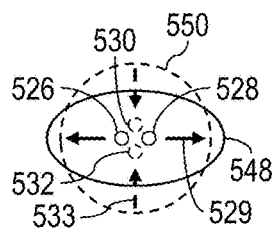
Figure 20:
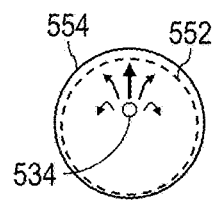
Figure 21:
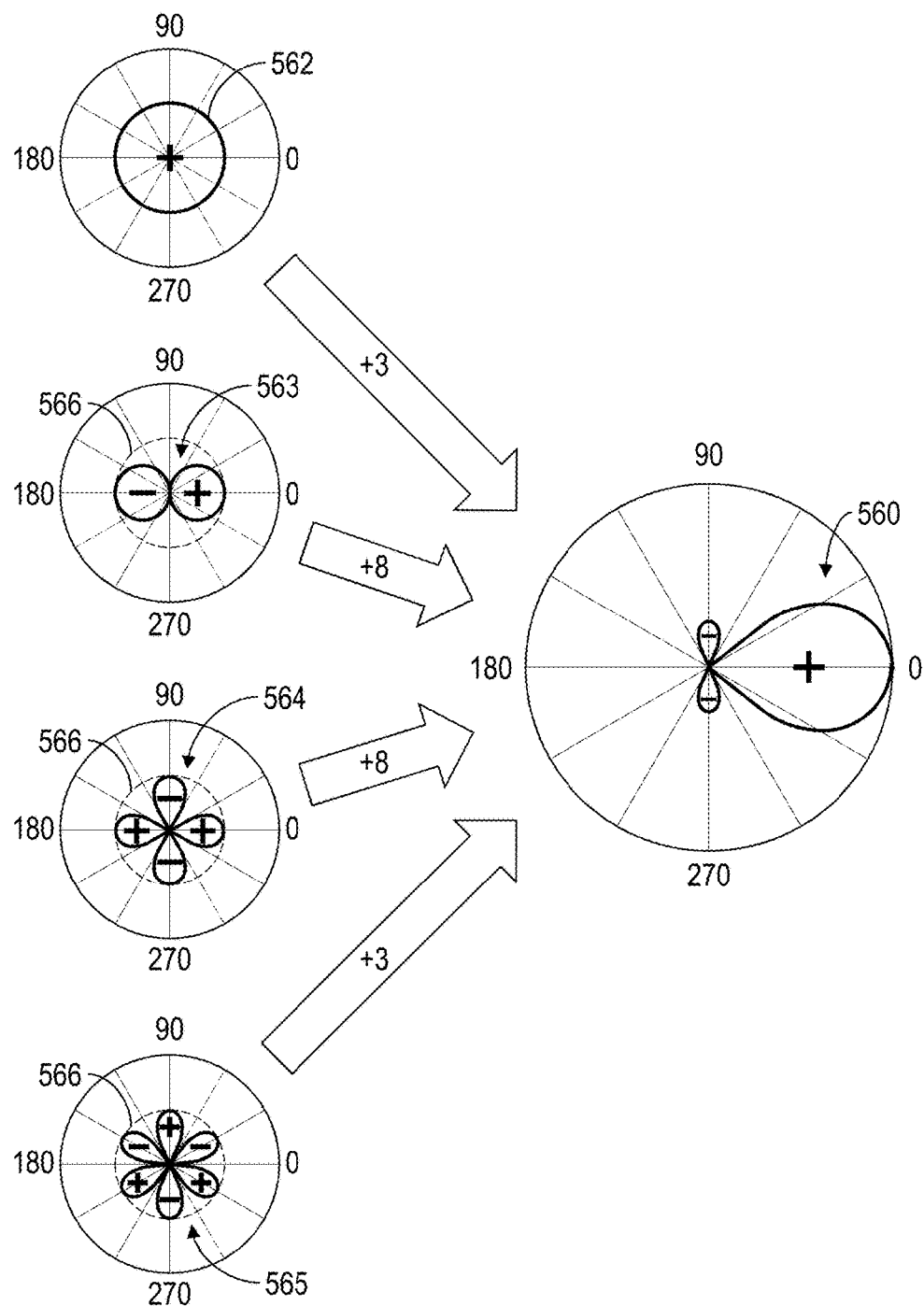

The usage of the angle paths may also be utilized for open-hole unipole measurements, such as when there are azimuthal differences in formation properties. For example, FIG. 15 depicts a horizontal portion 502 of a wellbore (such as the wellbore 104 shown in FIGS. 1-3) extending through a vertical transverse isotropy (VTI) portion 504 of a formation (such as the formation 102 shown in FIGS. 1-3). An arrow 506 indicates the direction perpendicular to both gravity and the central axis 510 of the wellbore portion 502, and an arrow 508 indicates the direction towards the wellsite surface (i.e., opposite the direction of gravity). FIG. 16 depicts example non-uniform relative amplitude distributions 512 of formation compressional wave in the example implementation of FIG. 15, as assessed by unipole firing using just axial path measurements. The zero-degree and ninety-degree azimuth positions in FIG. 16 respectively correspond to the directions 506 and 508 depicted in FIG. 15, and the radial direction represents relative amplitude distributions increasing from zero at the graph center 514. As shown in FIG. 16, the relative amplitude distributions 512 of formation compressional wave are larger above and below the wellbore 502, and smaller to the sides of the wellbore 502. Thus, the use of angle paths in addition to just axial paths may provide more and/or more accurate information in the example implementation depicted in FIGS. 15 and 16 and other open-hole implementations. Moreover, not just amplitude but also other attributes measured by axial and angle paths may be utilized to characterize the azimuthal differences of formation properties according to one or more aspects of the present disclosure.

As described above, the measurement frequency range of conventional sonic logging tools is below 30 kHz, both for evaluating formation elastic properties in open-hole implementations and for evaluating cement bond quality in cased-hole implementations. This frequency range can limit the spatial resolution with which the sonic logging tool can provide formation elastic properties and cement bonding quality. For example, the wavelength of compressional waves propagating through typical fast rocks (e.g., a compressional wave travel time DTc of about 200 µs/m) is approximately 15 cm with a frequency of 30 kHz. If the target media (formation or casing cement) exhibits heterogeneity of similar or shorter wavelength, the sonic logging provides averaged information over the corresponding wavelength. Thus, apparatus according to one or more aspects introduced in the present disclosure may be operated in a manner utilizing a lower measurement frequency (e.g., about 30 kHz or less) for reading information deep inside formations or wide around cemented casings, and utilizing a higher measurement frequency (e.g., about 50 kHz or more) for probing the target media with finer spatial resolution.

FIGS. 17-21 are schematic views of example excitations that may be induced by the acoustic tool 300 depicted in FIGS. 3-7 and other implementations within the scope of the present disclosure. As described above, the signals 436 induced by the transmitters 328 can be measured by the receivers 336 to process monopole, dipole, and other higher order azimuthal modes, as well as unipole, at each azimuthal position of the transmitters and receivers. In the monopole example depicted in FIG. 17, sound pressure varies uniformly (relative to azimuth) between a minimum 540 and a maximum 542 uniformly around the source 520. In the dipole example depicted in FIG. 18, sound pressure varies between a first extreme 544 corresponding to a first source 522 and a second extreme 546 corresponding to a second source 524. In the lateral quadrupole example depicted in FIG. 19, sound pressure varies between a first extreme 548 corresponding to a first pair of sources 526, 528 and a second extreme 550 corresponding to a second pair of sources 530, 532, wherein the axis 529 of the first sources 526, 528 is substantially perpendicular to the axis 533 of the second sources 530, 532. In the unipole example depicted in FIG. 20, sound pressure varies between a minimum 552 and a maximum 554 in an azimuthally non-uniform ("directed") manner relative to the source 534.

Unipole excitation can be also built by algebraic composition of multipole excitations. For example, the unipole implementation 560 schematically depicted in FIG. 21 may be algebraically composed by three monopoles 562, eight dipoles 563, eight lateral quadrupoles 564, and three hexapoles 565, with each algebraic constituent 562-565 having the same maximum pressure level 566.

Figure 22:
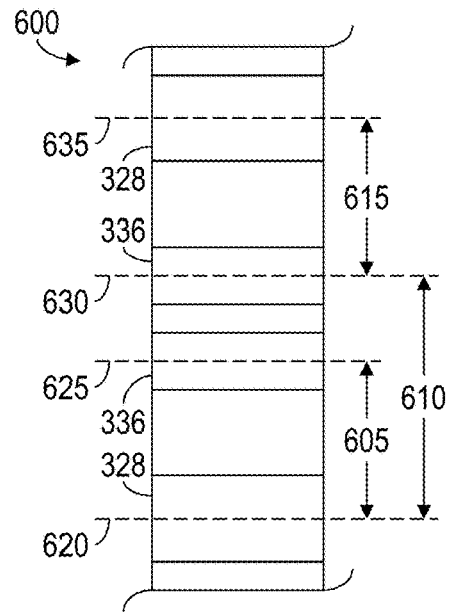
FIG. 22 is a schematic view of at least a portion of an example implementation of apparatus according to one or more aspects of the present disclosure.

FIG. 22 is a schematic view of at least a portion of another implementation of the acoustic tool 300 depicted in FIGS. 3-7, designated in FIG. 22 by reference number 600, in which arrays of azimuthally distributed transmitters 328 are located on opposing sides of the arrays of receivers 336. Such implementations, as well as others within the scope of the present disclosure, may be utilized for achieving compensated measurements in open- and/or cased-hole implementations to evaluate formation elastic properties and/or cement bond quality behind one or more casings.

In open-hole logging according to one or more aspects of the present disclosure, refracted waves and borehole modes may be measured with monopole, dipole, and other higher order azimuthal modes at relatively high frequency (e.g., about 100 kHz). Refracted waves and borehole modes may additionally be measured via unipole (or synthesized unipole) at each source and receiver azimuthal position at the same frequency. The position of the acoustic tool 300/600 relative to the central axis of the wellbore and/or wellbore diameter may also be measured with high-frequency unipole measurements. The high-frequency measurements with shorter transmitter-to-receiver (TR) spacing may also permit finer spatial resolution of elastic properties, such as heterogeneity and/or other properties that may not be seen in the sonic/seismic range.

In cased-hole logging according to one or more aspects of the present disclosure, the axially separated arrays of receivers 336 may also be used for estimating casing arrival arrivals across the receiver arrays. The measured amplitudes, attenuations, and/or transit times at each different azimuth may also be utilized to map the azimuthal heterogeneity of cement bond condition.

Figure 23:
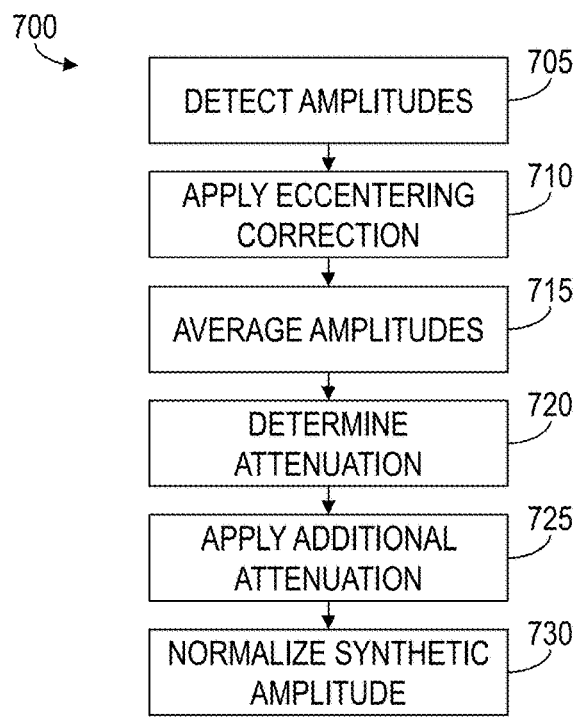
FIG. 23 is a flow-chart diagram of at least a portion of an example implementation of a method according to one or more aspects of the present disclosure.

Synthetized CBL may also be constructed with the azimuthally averaged amplitudes and attenuation data. By knowing the tool position relative to the center axis of the casing, the eccentering effect can be corrected prior to averaging amplitudes and attenuation. For example, FIG. 23 is a flow-chart diagram of at least a portion of an example implementation of a method (700) for synthesized CBL utilizing an implementation of the acoustic tool 300 depicted in FIGS. 3-7, the acoustic tool 600 depicted in FIG. 22, and/or other implementations also within the scope of the present disclosure.

The method (700) includes detecting (705) amplitudes for multiple (e.g., eight) azimuthal sectors and two or more axial regions or sections defined by radial planes each extending through one or more transmitters 328 and/or receivers 336. For example, considering the implementation depicted in FIG. 22, one axial region 605 may extend from a radial plane 620 of the lower array of transmitters 328 to a radial plane 625 of the lower array of receivers 336, and another axial region 610 may extend from the radial plane 620 of the lower array of transmitters 328 to a radial plane 630 of the upper array of receivers 336. The analyzed axial sections may or may not overlap. For example, another analyzed axial section 615 may extend from a radial plane 635 of the upper array of transmitters 328 to the radial plane 630 of the upper array of receivers 336. The amplitude detection (705) in one or more of the axial regions 605, 610, 615 may utilize axial and/or angle path data as described above.

The eccentering correction for amplitude is then applied (710) based on delta travel times and eccentering. The multiple (e.g., eight) amplitudes in azimuth are then averaged (715) for each axial section, and the attenuation rate (dB/cm) for each axial section is determined (720) using the averaged (715) amplitudes. With the calculated attenuation rate, additional attenuation is applied (725) to amplitude data for synthetic transmitter-to-receiver spacing (e.g., 0.6 meters (m) additional path for an axial section length of about 0.3 m). The synthetic amplitude is then normalized (730) at a depth close to free pipe.

FIG. 24 is a flow-chart diagram of at least a portion of another example implementation of a method (750) utilizing an implementation of the acoustic tool 300 depicted in FIGS. 3-8, the acoustic tool 600 depicted in FIG. 22, and/or other implementations also within the scope of the present disclosure. For the sake of clarity, however, the method (750) is described below in the context of the example implementation depicted in FIG. 8. One or more aspects of the method (750) depicted in FIG. 24 may be utilized in combination with one or more aspects of the method (700) depicted in FIG. 23 and/or other methods within the scope of the present disclosure.

The method (750) comprises transmitting (755) an acoustic signal from the transmitter 456 and sensing (760) an attribute of the acoustic signal with each of a plurality of receivers 420, 422. The receivers 336 that sense (760) the acoustic signal attribute include a first receiver 452 axially offset from and azimuthally aligned with the transmitter 456, a second receiver 454 axially offset from and azimuthally aligned with the transmitter 456 and the first receiver 452, a third receiver 464 (or 474) axially and azimuthally offset from the transmitter 456, and a fourth receiver 462 (or 472) axially and azimuthally offset from the transmitter 456, the first receiver 452, and the third receiver 464.

For example, as depicted in FIG. 8: the third receiver 464 may be azimuthally offset from the transmitter 456, the first receiver 452, and the second receiver 454 by about 45 degrees; the fourth receiver 462 may be azimuthally offset from the transmitter 456, the first receiver 452, and the second receiver 454 by about 90 degrees; and the fourth receiver 462 may be azimuthally offset from the third receiver 464 by about 45 degrees. Thus, the first receiver 452 and the second receiver 454 may be substantially aligned with a first acoustic path 450 of the acoustic signal that extends along a substantially axial path along the downhole tool between the transmitter 456 and the second receiver 454, whereas the third receiver 464 and the fourth receiver 462 may be substantially aligned with a second acoustic path 460 of the acoustic signal that extends along a substantially non-axial, angle path along the downhole tool between the transmitter 456 and the fourth receiver 462.

The method (750) may further comprise evaluating (765) a characteristic of cement 108 substantially surrounding casing 109 within the wellbore 104. Such evaluation (765) utilizes the acoustic signal attribute sensed (760) by each of the first receiver 452, the second receiver 454, the third receiver 464, and the fourth receiver 462. For example, the cement characteristic may be bonding quality between the cement 108 and the casing 109. In such implementations, the acoustic signal attribute may be amplitude, attenuation, and/or transit time.

The method (750) may also or instead comprise evaluating (770) a characteristic of a subterranean formation 102 into which the wellbore 104 extends. Such evaluation (770) utilizes the acoustic signal attribute sensed (760) by each of the first receiver 452, the second receiver 454, the third receiver 464, and the fourth receiver 462. For example, the formation characteristic may exhibit azimuthal heterogeneity, such as when the formation characteristic is mechanical stress. In such implementations, the acoustic signal attribute may be amplitude.

FIG. 25 is a flow-chart diagram of at least a portion of another example implementation of a method (800) utilizing an implementation of the acoustic tool 300 depicted in FIGS. 3-8, the acoustic tool 600 depicted in FIG. 22, and/or other implementations also within the scope of the present disclosure. For the sake of clarity, however, the method (800) is described below in the context of the example implementation depicted in FIG. 8. One or more aspects of the method (800) depicted in FIG. 25 may be utilized in combination with one or more aspects of the method (700) depicted in FIG. 23, the method (750) depicted in FIG. 24, and/or other methods within the scope of the present disclosure.

The method (800) comprises conveying (805) the downhole tool 300, 600 within the wellbore 104. The downhole tool 300, 600 comprises a transmitter unit 412 comprising a plurality of transmitters 328, 456 azimuthally distributed around a longitudinal axis of the downhole tool at a first axial location 413 of the downhole tool. The downhole tool 300, 600 also comprises a first receiver array 420 comprising a plurality of first receivers 336, 452, 464, 474 azimuthally distributed around the longitudinal axis at a second axial location 421 axially offset from the first axial location 413. The downhole tool 300, 600 also comprises a second receiver array 422 comprising a plurality of second receivers 336, 454, 462, 472 azimuthally distributed around the longitudinal axis at a third axial location 423 axially offset from the first and second axial locations 413, 421.

The method (800) also comprises transmitting (810) a first acoustic signal from a first one of the transmitter units 412, such as the transmitter 456. The method (800) also comprises sensing (815) an attribute of the first acoustic signal with at least first and second ones of the first receivers 420, such as the receivers 452 and 464, and at least first and second ones of the second receivers 422, such as the receivers 454 and 462. A characteristic of a first region is then evaluated (820) based on first signals generated by the first receivers 452, 464 and the second receivers 454, 462, wherein the first signals are each indicative of the sensed (815) attribute of the first acoustic signal.

The method (800) also comprises transmitting (825) a second acoustic signal from a second one of the transmitter units 412, such as designated in FIG. 8 by reference number 457. The attribute (that was previously sensed (815) from the first acoustic signal) of the second acoustic signal is then sensed (830) with at least third and fourth ones of the first receivers 420, such as the receivers 452 and 474, and at least third and fourth ones of the second receivers 422, such as the receivers designated in FIG. 8 by reference numbers 455 and 463. A characteristic of a second region (perhaps the same characteristic as previously evaluated (820) for the first region) is then evaluated (835) based on second signals generated by the first receivers 452, 474 and the second receivers 455, 463, wherein the second signals are each indicative of the sensed (830) attribute of the second acoustic signal.

The first evaluated (820) region and the second evaluated (835) region may each be regions of cement 108 substantially surrounding casing 109 within the wellbore 104 or regions of the subterranean formation 102 into which the wellbore 104 extends. Each region may extend azimuthally through a portion of the circumference of the wellbore 104, such that iterations (840) of the method (800) may collectively evaluate fully around 360 degrees.

FIG. 26 is a flow-chart diagram of at least a portion of another example implementation of a method (850) utilizing an implementation of the acoustic tool 300 depicted in FIGS. 3-8, the acoustic tool 600 depicted in FIG. 22, and/or other implementations also within the scope of the present disclosure. For the sake of clarity, however, the method (850) is described below in the context of the example implementation depicted in FIG. 8. One or more aspects of the method (850) depicted in FIG. 26 may be utilized in combination with one or more aspects of the method (700) depicted in FIG. 23, the method (750) depicted in FIG. 24, the method (800) depicted in FIG. 25, and/or other methods within the scope of the present disclosure.

The method (850) comprises conveying (855) a downhole tool 300, 600 within a wellbore 104, wherein the downhole tool comprises a transmitter array comprising a plurality of transmitters azimuthally spaced around a longitudinal axis of the downhole tool at a first axial location of the downhole tool, a first receiver array comprising a plurality of first receivers azimuthally spaced around the longitudinal axis at a second axial location axially offset from the first axial location, and a second receiver array comprising a plurality of second receivers azimuthally spaced around the longitudinal axis at a third axial location axially offset from the first and second axial locations. For example, the downhole tool 300, 600 may comprise: the transmitter unit 412 comprising transmitters 328, 456, 457 azimuthally spaced around the longitudinal axis 309 at the axial location 413; the receiver array 420 comprising receivers 336, 452, 464, 474 azimuthally spaced around the longitudinal axis 309 at the axial location 421; and the receiver array 422 comprising receivers 336, 454, 455, 462, 463, 472 azimuthally spaced around the longitudinal axis 309 at the axial location 423.

An acoustic signal is transmitted (860) from an individual one 456 of the transmitters, and an attribute of the acoustic signal is sensed (865) with at least two individual ones 336, 452, 464, 474 of the first receiver array 420 and at least two individual ones 336, 454, 455, 462, 463, 472 of the second receiver array 422. For example, the at least two individual ones of the receivers may include the first receiver 452 azimuthally aligned with the individual transmitter 456, a first receiver 464 and/or 474 azimuthally offset from the individual transmitter 456, the second receiver 454 azimuthally aligned with the individual transmitter 456, and a second receiver 455, 462, 463, and/or 472 azimuthally offset from the individual transmitter 456. In one such implementation, the at least two individual ones of the receivers include: the first receiver 452 azimuthally aligned with the individual transmitter 456; the first receiver 474 azimuthally offset from the transmitter 456 in a first direction (e.g., azimuthally positive); the first receiver 464 azimuthally offset from the transmitter 456 in a second direction opposite the first direction (e.g., azimuthally negative); the second receiver 454 azimuthally aligned with the transmitter 456; the second receiver 472 azimuthally offset from the transmitter 456 in the first direction; and the second receiver 462 azimuthally offset from the transmitter 456 in the second direction. However, these are examples, and other implementations are also within the scope of the present disclosure.

A characteristic of a portion of a downhole feature is then evaluated (870) based on response signals generated by each of the individual ones of the first and second receivers. The downhole feature may be cement 108 substantially surrounding a casing 109 within the wellbore 104, such as in implementations in which the evaluated (870) characteristic is bonding quality between the cement 108 and the casing 109. The downhole feature may also or instead be a subterranean formation 102 penetrated by the wellbore 104, such as in implementations in which the evaluated (870) characteristic is mechanical stress and/or other parameter(s) of the formation 102. Each response signal of the sensing (865) receivers contains or is otherwise indicative of the acoustic signal attribute sensed (865) by the individual ones of the receivers.

The downhole feature portion may azimuthally correspond to two of the individual ones of the sensing (865) receivers having the greatest relative azimuthal offset. For example, if the sensing (865) receivers include the first receivers 452, 464, 474 and the second receivers 454, 455, 462, 463, 472, then the downhole feature portion may azimuthally correspond to the second receivers 462 and 472, which have a greater relative azimuthal offset than the other sensing (865) receivers. In such example, the downhole feature portion may extend between azimuthal positions of about 90 degrees and about 270 degrees, being centered at an azimuthal position of about 180 degrees.

The transmitting (860), sensing (865), and evaluating (870) are then repeated (875) with different individual ones of the transmitters and corresponding first and second receivers until the evaluated portions of the downhole feature collectively extend through about 360 degrees around the longitudinal axis. Thus, continuing with the present example, the repeat (875) may evaluate (870) another portion of the downhole feature centered at an azimuthal position of about 0/360 degrees and extending between azimuthal positions of about 270 degrees and about 90 degrees. By repeating (875) until the evaluated (870) portions of the downhole feature collectively extend through about 360 degrees, the full azimuthal range of the downhole feature can be evaluated (870) without rotating the downhole tool 300, 600 within the wellbore 104. Thus, the method (850) may intentionally exclude physically rotating the downhole tool 300, 600 relative to the wellbore 104. However, the method (850) may also comprise conveying (880) the downhole tool 300, 600 to other axial locations in the wellbore 104 and repeating (885) the transmitting (860), sensing (865), and evaluating (870) with the same or different combinations of individual transmitters and corresponding receivers until the evaluated portions of the downhole feature collectively extend through about 360 degrees at each axial location in the wellbore. Such operation may be periodic, with the downhole tool 300, 600 stopping at each axial location in the wellbore, or substantially continuous as the downhole tool 300, 600 is conveyed substantially continuously through the range of depths being investigated. During such conveyance (880), the downhole tool 300, 600 may rotate within the wellbore 104 due to friction with the sidewalls of the wellbore 104, encountering irregular features or obstructions within the wellbore 104, and/or other forces. Such rotation is unintentional, however, and may be accounted for via data obtained from orientation sensors of the downhole tool 300, 600 and/or other means.

The evaluated portions of the downhole feature during the repeated (875, 885) transmitting (860), sensing (865), and evaluating (870) may also overlap neighboring portions. For example, each evaluated portion may extend through about 180 degrees, and may be centered at azimuthal intervals of about 90 degrees, such that each evaluation portion overlaps each neighboring portion by about 90 degrees. However, other implementations are also within the scope of the present disclosure, including evaluated portions that extend through about 90 degrees and/or other ranges, and that are centered at azimuthal intervals of about 45 degrees and/or other intervals.

During the analysis of each axial and azimuthal region of the downhole feature, the individual transmitter 328, 456, 457 being operated may be operated as a unipole, synthetized unipole (via algebraic composition from multiple excitations, as described above), dipole, quadrupole, or other multiple transmitter. For example, the transmitter may be operated as a multipole transmitter, the downhole feature may be the formation 102 penetrated by the wellbore 104, and the evaluated (870) characteristic may be an elastic property of the formation 102. In other examples, the transmitter may be operated as a unipole transmitter, the downhole feature may be the formation 102, and the characteristic may be an intrinsic anisotropic property, a stress-induced anisotropic property, an azimuthally heterogeneous property, and/or another elastic property of the formation 102.

In other examples, conveying (855, 880) the downhole tool 300, 600 within the wellbore 104 may comprise conveying the downhole tool 300, 600 towards a specific subterranean formation penetrated by the wellbore 104, and the evaluated (870) characteristic may be position of the downhole tool 300, 600 relative to a boundary of the formation, such as to identify when the downhole tool 300, 600 reaches the boundary. In such implementations, the individual transmitter 328, 456, 457 being operated during the analysis of each axial and azimuthal region may be operated as a unipole transmitter.

In other examples, the evaluated (870) characteristic may be diameter of the wellbore 104. In such implementations, the individual transmitter 328, 456, 457 being operated during the analysis of each axial and azimuthal region may be operated as a unipole transmitter.

The examples described above are not intended to be limiting to the scope of the present disclosure. For example, the downhole feature may also be a fracture in the formation 102.

Figure 27:
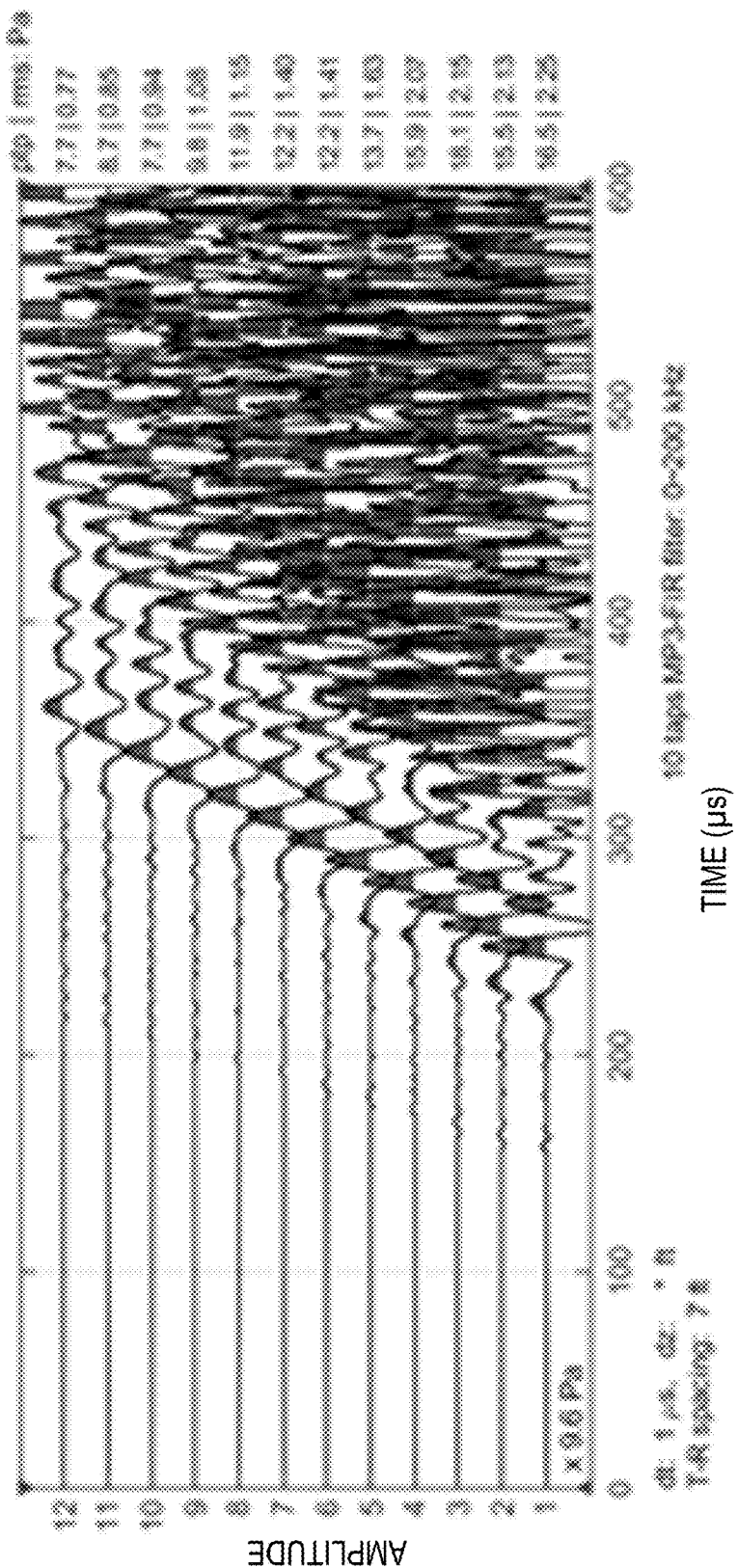
FIGS. 27 and 28 are graphs depicting one or more aspects related to the present disclosure.
Figure 28:
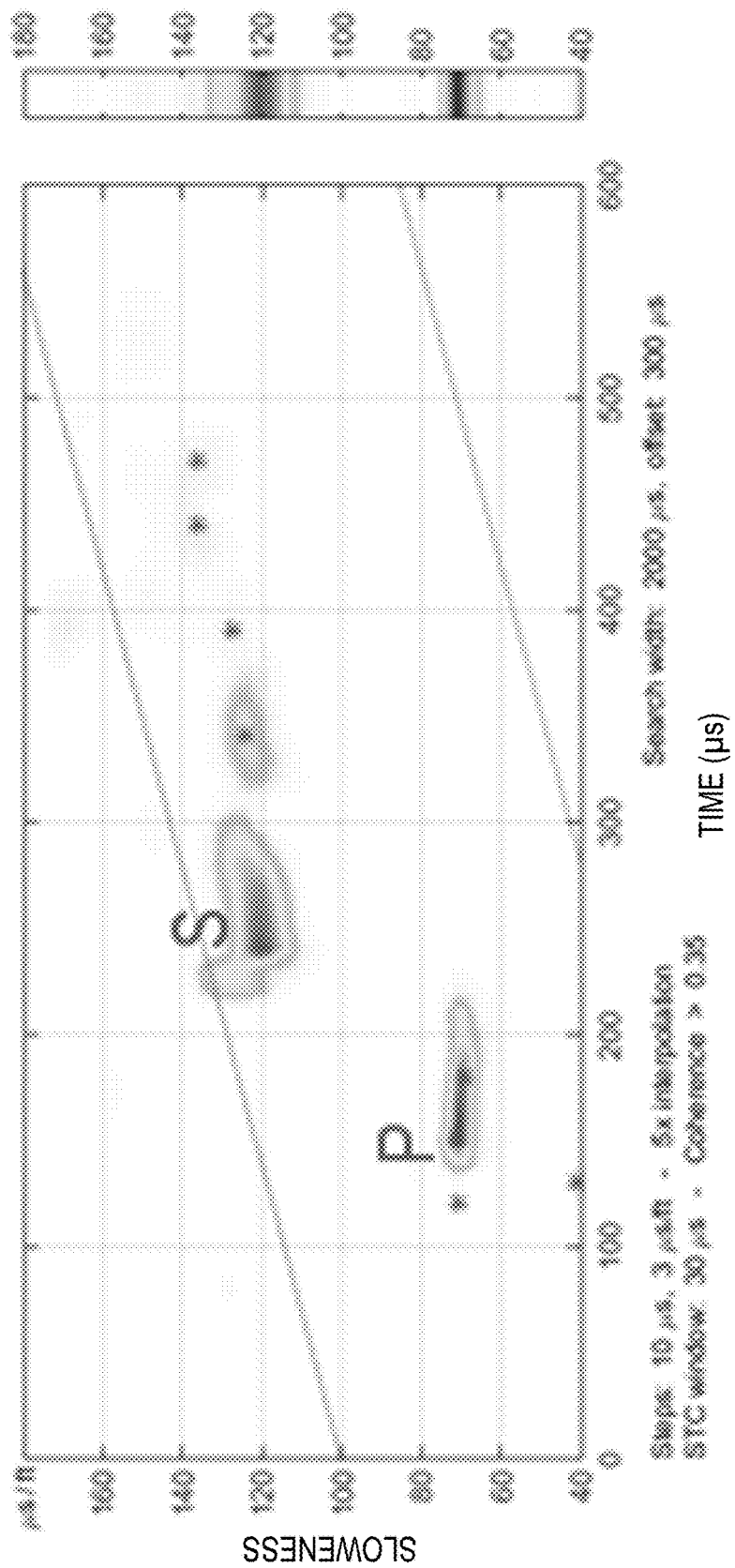

In open-hole logging, refracted waves and borehole modes may be measured with monopole, dipole, and other higher order azimuthal modes at relatively high frequency (e.g., about 100 kHz). Refracted waves and borehole modes may also be measured with unipole at each source and an azimuthally positioned receiver at the same frequency. FIG. 27 is a graph showing example of open-hole unipole measurements performed at 100 kHz, with Rx1 at 16 inches and RR of 1 inch. FIG. 28 is a graph depicting slowness, along the vertical axis, with respect to time, shown along the horizontal axis. The figure shows formation compressional and shear slowness of about 70 microseconds per foot ($\mu s/ft$) and about 120 $\mu s/ft$, respectively.

Figure 29:
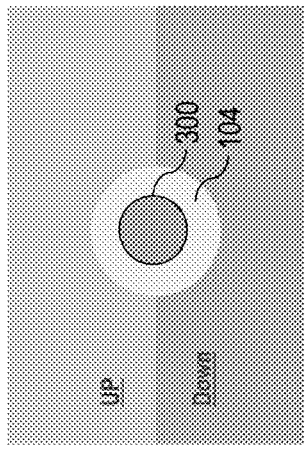
FIG. 29 is a schematic view of a portion of apparatus disposed within a horizontal portion of a wellbore according to one or more aspects of the present disclosure.
Figure 30:
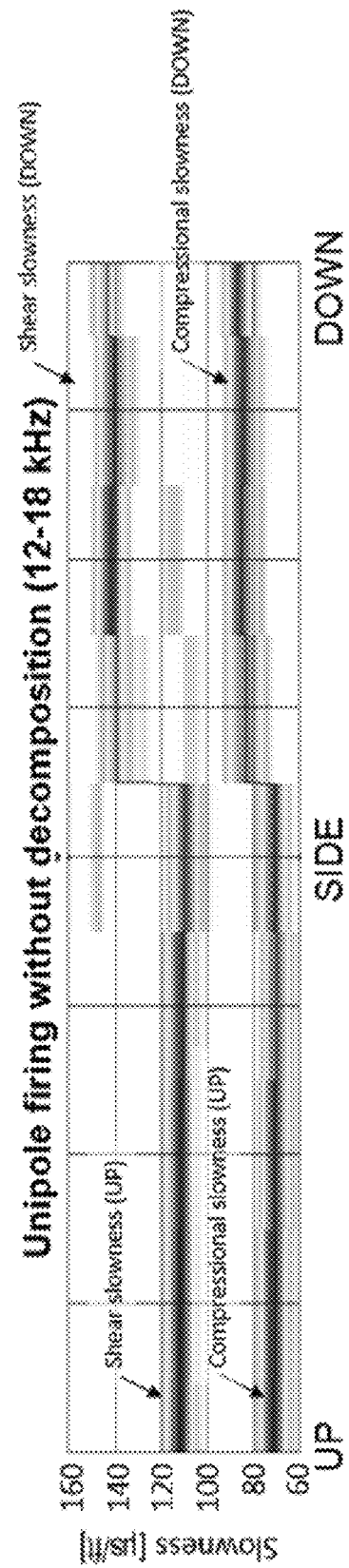
FIGS. 30-41 are graphs depicting one or more aspects related to the present disclosure.

Unipole measurements may be effective for formations that are azimuthally heterogeneous. FIG. 29 is an axial section view of a wellbore 104 extending through a formation having an up side and a down side. The wellbore 104 may contain mud and an acoustic tool 300. FIG. 30 is a graph depicting formation slowness, shown along the vertical axis, with respect to the side of the wellbore 104, shown along the horizontal axis, for a unipole source firing without decomposition at about 12-18 kHz. FIG. 30 shows that the shear and compressional slowness on the down side of the wellbore 104 are greater than on the up side of the wellbore 104.

Position of an acoustic tool relative to center axis of a wellbore and/or wellbore diameter may also be measured with high-frequency unipole measurements. High-frequency measurements with shorter transmitter-to-receiver (TR) spacing may also permit finer spatial resolution of elastic properties, such as heterogeneity, which cannot be seen when operating in sonic or seismic range.

In cased-hole logging, axially placed receiver units (i.e., arrays) can be utilized for estimating casing arrival attenuation across the receiver units. Amplitude and attenuation measured at different azimuthal positions may be utilized to map azimuthal heterogeneity of cement bond condition.

Figure 31:
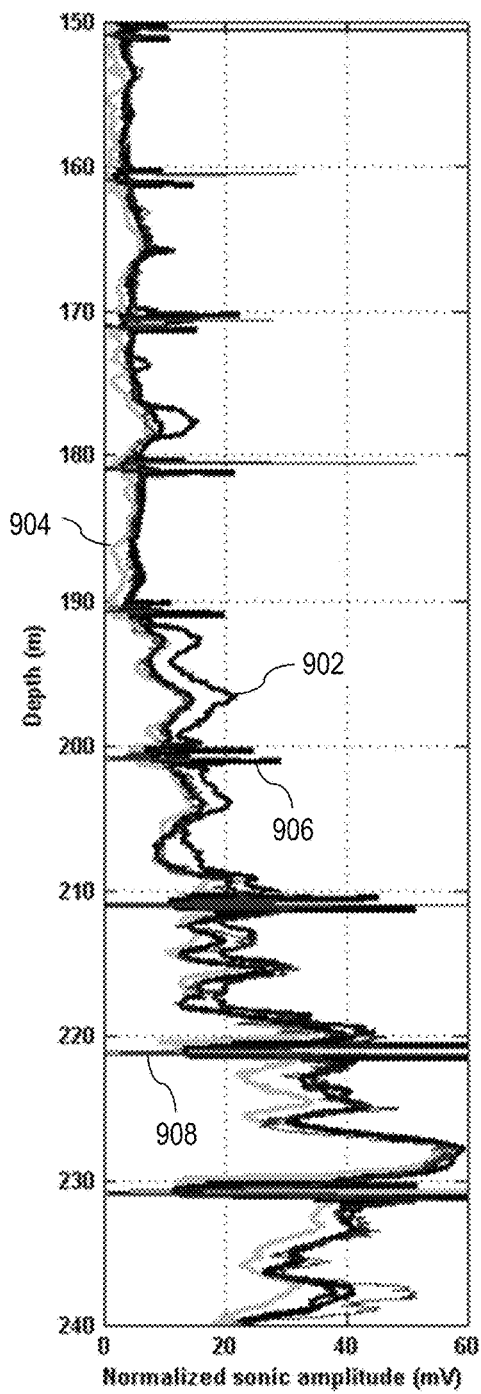
Figure 32:
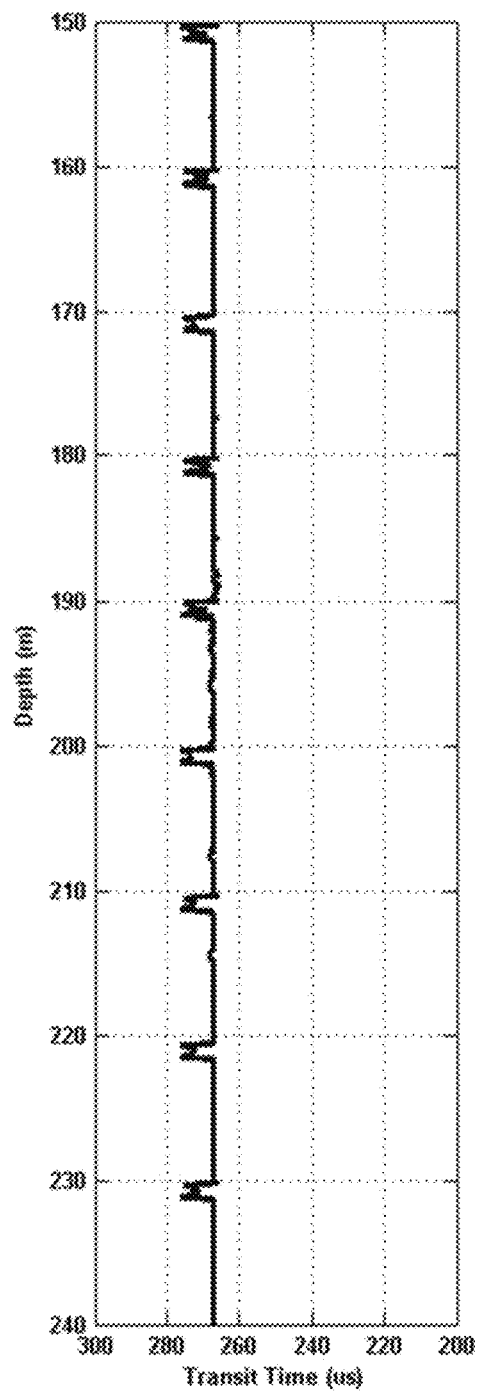
Figure 33:
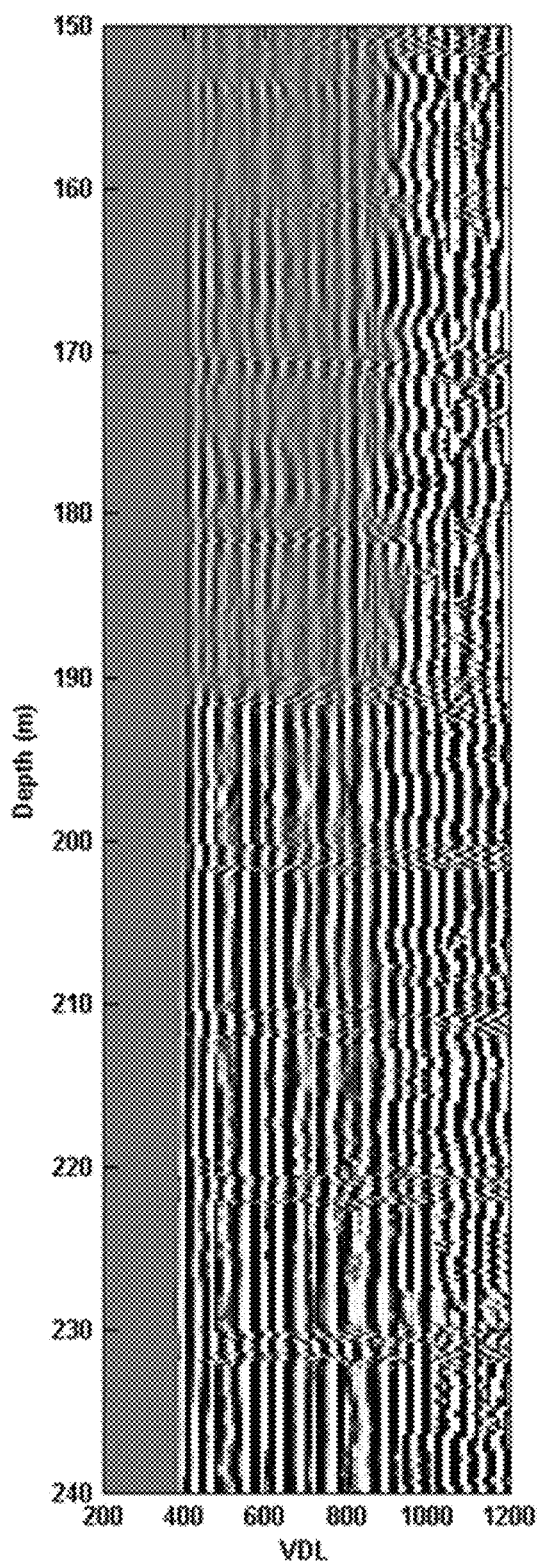

Synthetized CBL may be constructed by utilizing azimuthally averaged amplitudes and attenuation data. FIGS. 31-33 are graphs depicting example of synthesized CBL with 100 kHz unipole, showing depth along the vertical axis and normalized sonic amplitude, transit time, and variable-density log (VDL), respectively, along the horizontal axes. By knowing position of the acoustic tool relative to the center axis of the casing, eccentering effect can be corrected prior to averaging amplitude and attenuation. The information shown in the graphs may be obtained by detecting signal amplitudes for eight azimuthal sectors and two axial sections. Although axial path data was utilized to generate the graphs, it is possible to additionally use other receivers that are not located in the same azimuth as the fired transmitter. The eccentering correction for acoustic signal amplitude may be applied based on delta travel times and eccentering. The eight signal amplitudes in azimuth (both 2 axial sections) are averaged and attenuation rate in decibels per inch (dB/in) for both axial sections may be determined based on the averaged amplitudes. With the calculated attenuation rate, additional attenuation may be applied to the amplitude data for synthetic 3 foot TR (transmitter to receiver) spacing (e.g., 2 feet of additional path for a 12 inch TR section). The synthetic amplitude may be normalized at a depth close to free pipe (i.e., 59 mV at 228 m). The graph in FIG. 31 shows an example synthetic CBL curve 902 showing amplitude based on signal attenuation measured by an existing commercial acoustic tool using a low frequency of about 20 kHz. The graph in FIG. 31 also shows an example CBL curve 904 showing amplitude measured by an existing commercial tool using a low frequency of about 20 kHz. The graph in FIG. 31 also shows an example CBL curve 906 showing amplitude measured by a prototype tool according to one or more aspects of the present disclosure, using a low frequency of about 20 kHz. The graph in FIG. 31 also shows an example synthetic CBL curve 908 showing amplitude measured by a prototype tool according to one or more aspects of the present disclosure, using a frequency higher than 50 kHz.

Figure 34:
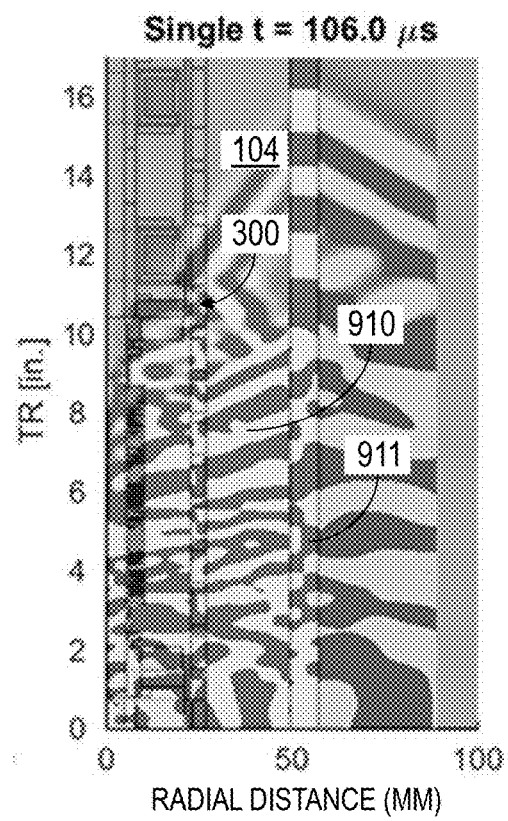
Figure 35:
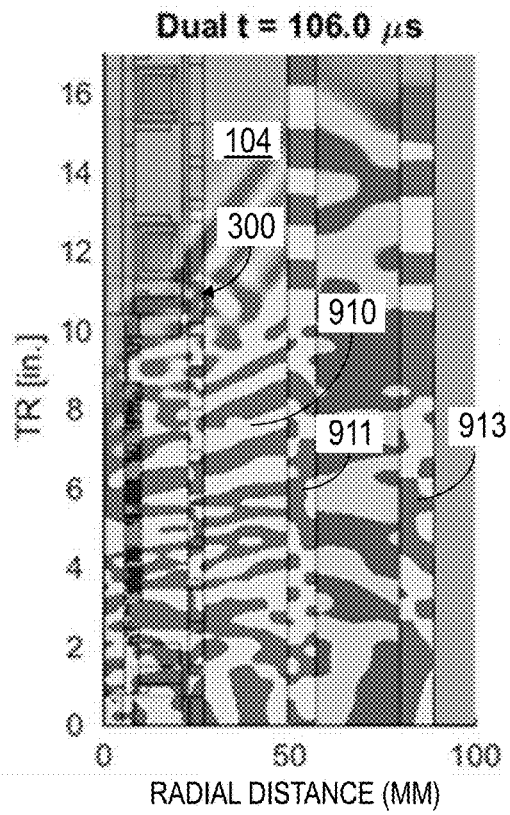
Figure 36:
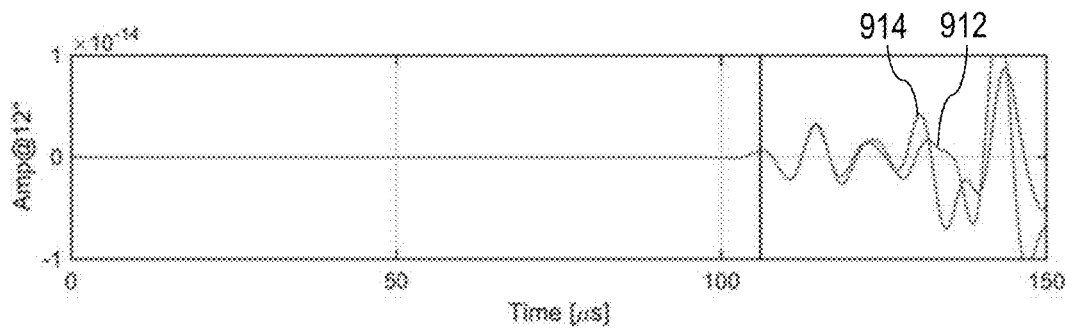

The CBL and RCBL measurements at high frequency (e.g., about 100 kHz) may be effective for evaluating the inner casing in dual casing environments. FIGS. 34-36 show example acoustic signals (i.e., waves) for single and dual casings according to one or more aspects of the present disclosure. FIG. 34 is a graph/sectional schematic view of an acoustic tool 300 disposed within a wellbore 104 transmitting acoustic signals 910 propagating through a single 4.5 inch casing 911 and FIG. 35 is a graph/schematic view of an acoustic tool 300 transmitting acoustic signals 910 propagating through a 4.5 inch and a 7.0 inch casings 911, 913. The TR distance is shown along the vertical axes and the radial distance is shown along the horizontal axes. FIG. 36 shows example modeled waveforms 912, 914 for single and dual casings, respectively, according to one or more aspects of the present disclosure. The figure indicates the amplitude of the acoustic signals, shown along the vertical axis, with respect to time, shown along the horizontal axis.

Figure 37:
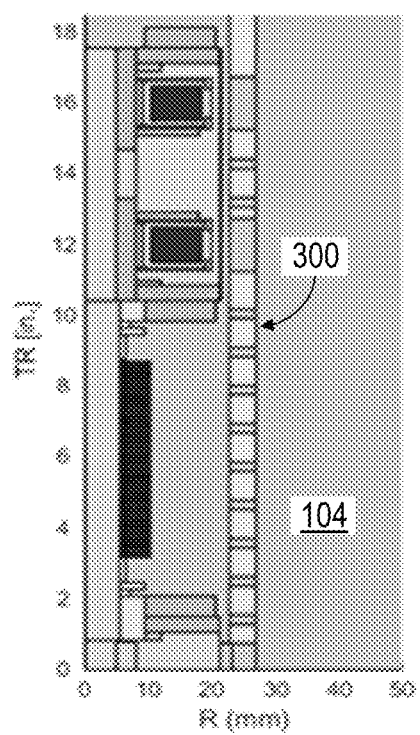
Figure 38:
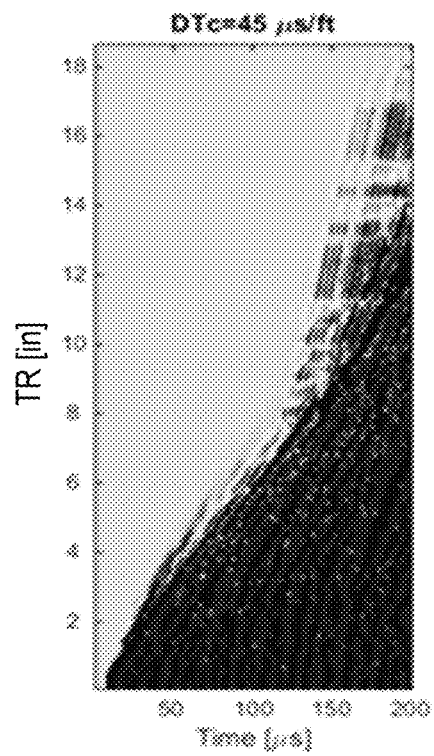
Figure 39:
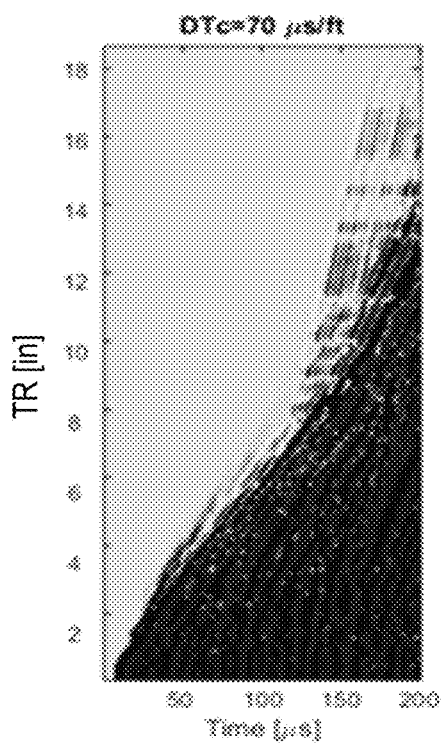
Figure 40:
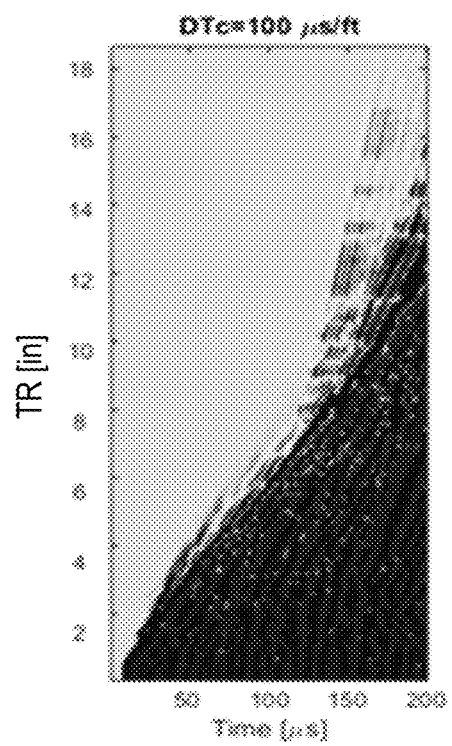
Figure 41:
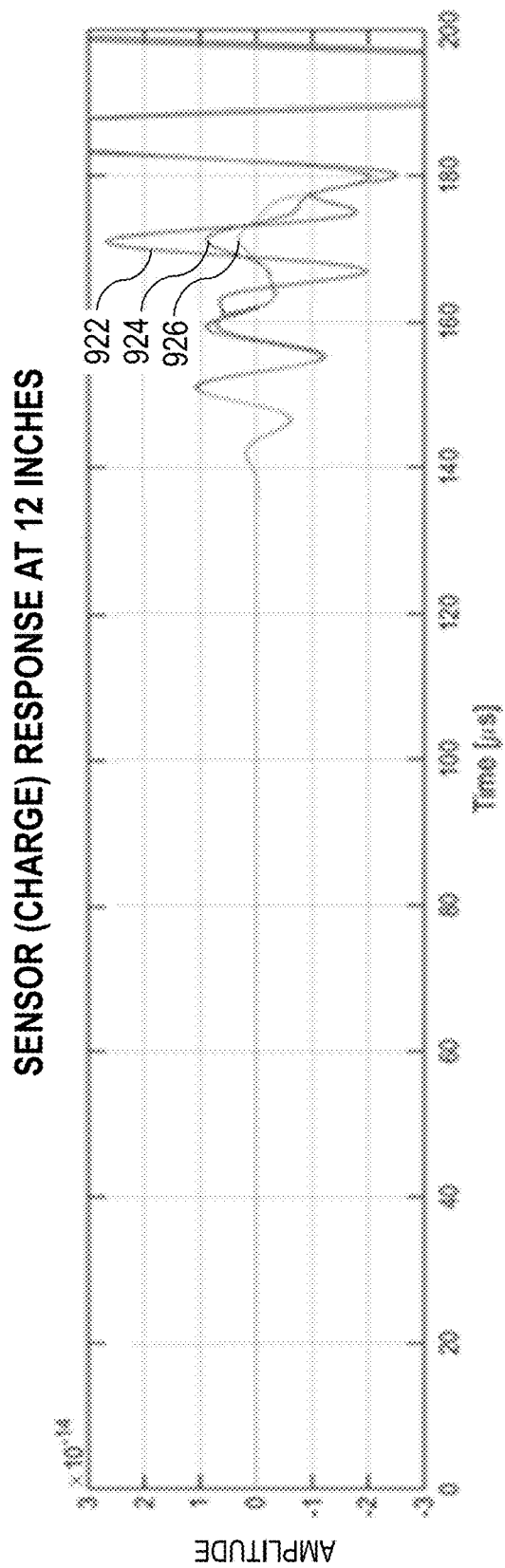

The CBL and RCBL measurements at high frequency (e.g., about 100 kHz) may also be effective for evaluating very fast formations around the cemented casing. FIG. 37 is a schematic sectional view of an acoustic tool 300 disposed within a wellbore 104, with the TR distance shown along the vertical axis and radial distance shown along the horizontal axis. FIGS. 38-40 show example modeled waveforms in different compressional slowness of formations around a cased hole according to one or more aspects of the present disclosure. FIGS. 38-40 are graphs showing modeled acoustic signals transmitted by the acoustic tool 300 trough formation around the wellbore 104 and having a compressional slowness of about 45 µs/f, about 70 µs/ft, and about 100 µs/ft, respectively. The graphs indicate TR distance along the vertical axis and time along the horizontal axis. FIG. 41 is a graph depicting amplitude curves 922, 924, 926 indicating receiver (charge) responses, shown along the vertical axis, for DTc of 45 µs/ft, DTc of 70 µs/ft, and DTc of 100 µs/ft, respectively, with respect to time, shown along the horizontal axis.

Figure 42:
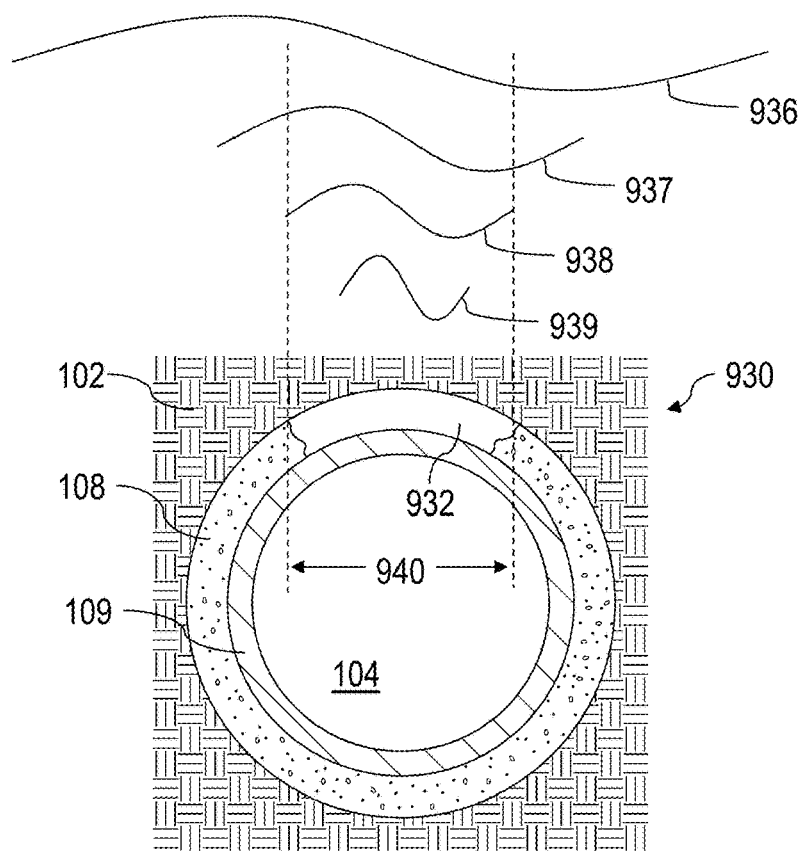
FIG. 42 is a schematic sectional axial view of a portion of an example wellbore related to one or more aspects of the present disclosure.

As described above, conventional slim-sized acoustic logging tools operate in the 20 kHz range, which is too low to detect small defects or channels in the cement. FIG. 42 is a schematic sectional axial view of a well 930 having a defect, such as a channel 932 (e.g., an empty space or air gap) in the cement 108 beneath the casing 109. The figure also depicts several acoustic signals 936-939 (i.e., compressional waves), each having a different frequency and wavelength, with the acoustic signal 936 comprising a frequency of about 20 kHz, the acoustic signal 937 comprising a frequency of about 50 kHz, the acoustic signal 938 comprising a frequency of about 100 kHz, and the acoustic signal 939 comprising a frequency of about 200 kHz. Each acoustic signal 936-939 comprises a corresponding wavelength, which decreases with increasing frequency. The channel 932 comprises a size 940 (e.g., width, length) measured from one end of the channel 932 to an opposing end of the channel 932. As can be observed, acoustic signals 938, 939, having frequencies 100 kHz and 200 kHz, respectively, have wavelengths that are about equal to and lesser than the size 940 of the channel 932 and may be utilized to detect channels 932 having the size 940. Accordingly, channels 932 or other defects may be detected by utilizing acoustic signals 938, 939 having wavelengths that are at least comparable to or smaller than the size 940 of the channel 932. For example, utilizing high frequency acoustic signals, such as frequencies above 100 kHz, may be utilized to detect channels 932 having a size 940 of 50 millimeters or less.

Figure 43:
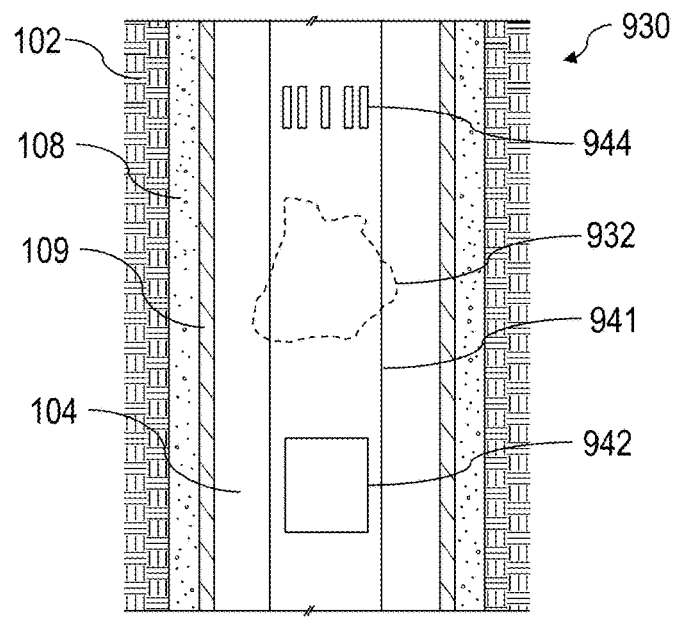
FIG. 43 is a schematic sectional side view of a portion of an example implementation of apparatus according to one or more aspects of the present disclosure disposed within a wellbore.
Figure 44:
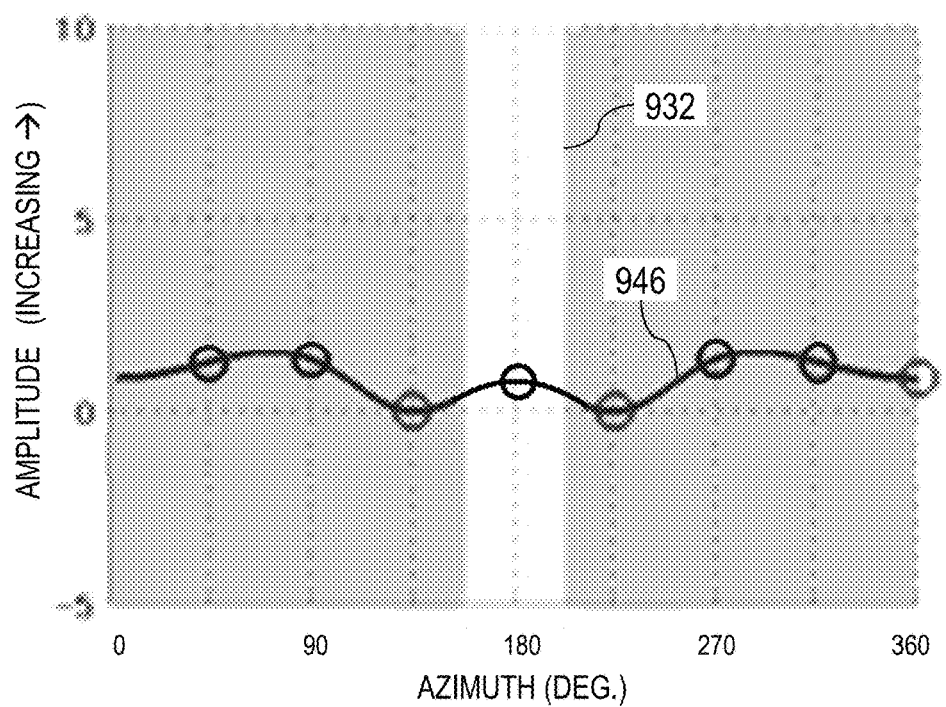
FIGS. 44-47 are graphs depicting one or more aspects related to the present disclosure.
Figure 45:
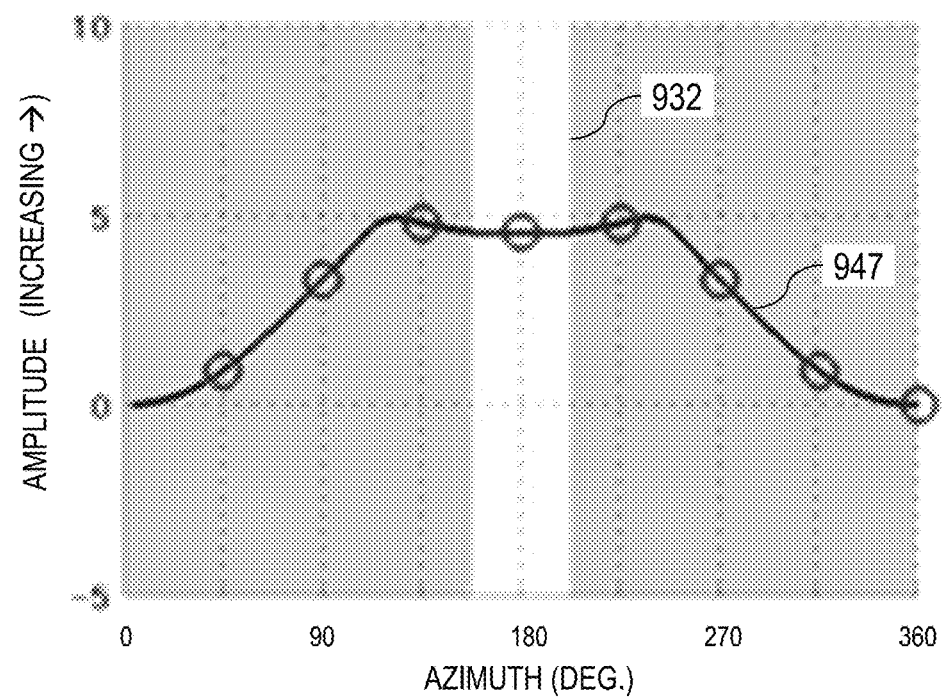
Figure 46:
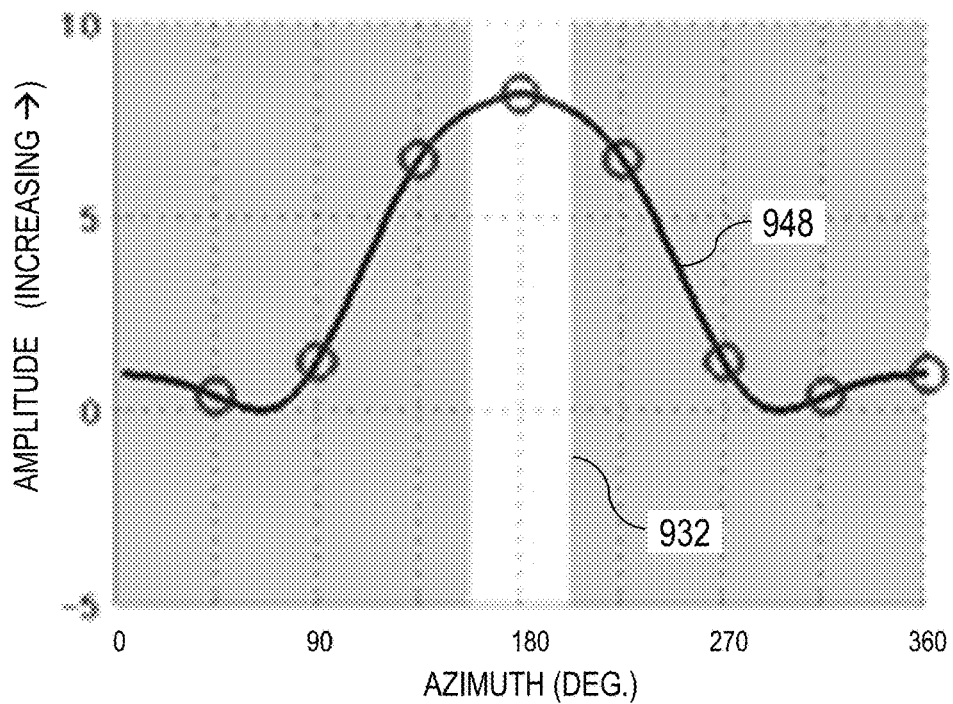
Figure 47:
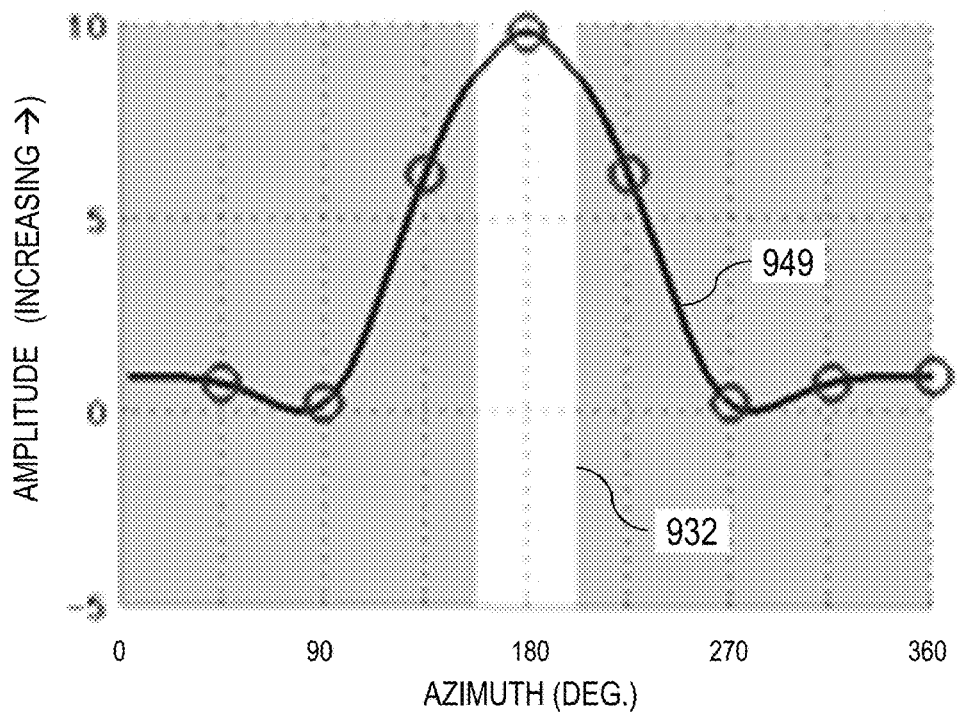

FIG. 43 is a schematic side view of the well 930 having the channel 932 in the cement 108. The figure further shows an acoustic tool 941 within the scope of the present disclosure comprising a transmitter 942 operable to transmit the acoustic signals 936-939 and a plurality receivers 944 operable to receive the acoustic signals 936-939, such as to facilitate detection of the channel 932. FIGS. 44-47 are graphs depicting amplitudes of the acoustic signals 936-939 detected by one or more of the receivers 944, shown along the vertical axes, with respect to azimuthal position within the wellbore 104, shown along the horizontal axes. Each graph also indicates azimuthal position of the channel 932, extending between about 160 degrees and about 200 degrees within the wellbore 104. FIG. 44 shows a curve 946 indicative of amplitude of the acoustic signal 936 transmitted at the 20 kHz frequency that was received by the plurality of receivers 944. As can be observed, the amplitude of the curve 946 between about 160 degrees and about 200 degrees associated with the channel 932 remains between (e.g., does not exceed) minimum and maximum amplitudes of other portions of the curve 946. FIG. 45 shows a curve 947 indicative of amplitudes of the acoustic signal 937 transmitted at the 50 kHz frequency that was received by the plurality of receivers 944. As can be observed, the amplitude of the curve 947 between about 160 degrees and about 200 degrees associated with the channel 932 is greater than (e.g., exceeds) the amplitudes of other portions of the curve 947. However, the peak of the curve 947 is not clearly defined and, thus, does not clearly indicate the location and/or size of the channel 932. FIG. 46 shows a curve 948 indicative of amplitude of the acoustic signal 938 transmitted at the 100 kHz frequency that was received by the plurality of receivers 944. As can be observed, the amplitude of the curve 948 between about 160 degrees and about 200 degrees associated with the channel 932 is greater than the amplitudes of other portions of the curve 948. Furthermore, the peak of the curve 948 is defined within the channel 932, such as may indicate the location and/or size of the channel 932. FIG. 47 shows a curve 949 indicative of amplitude of the acoustic signal 939 transmitted at the 200 kHz frequency that was received by the plurality of receivers 944. As can be observed, the amplitude of the curve 949 between about 160 degrees and about 200 degrees associated with the channel 932 is also greater than the amplitudes of other portions of the curve 949. However, the peak of the curve 949 is even more clearly defined than the peak of curve 948, such as may more clearly indicate the location and/or size of the channel 932.

Figure 48:
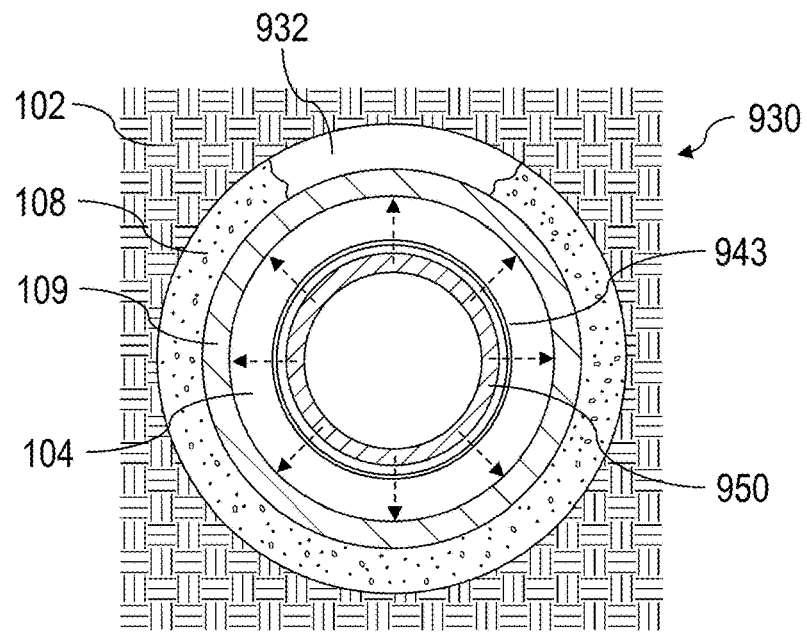
FIG. 48 is a schematic sectional axial view of a portion of an example implementation of apparatus according to one or more aspects of the present disclosure disposed within a wellbore.
Figure 49:
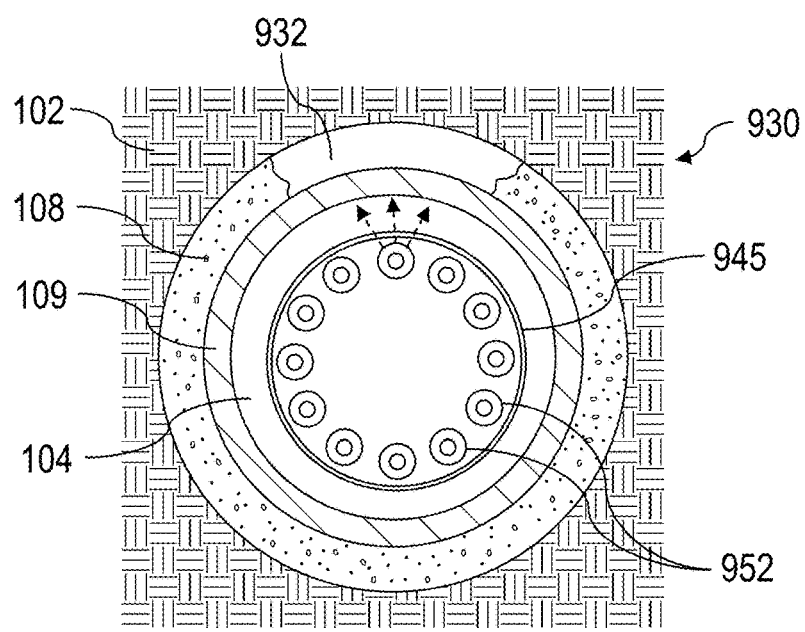
FIG. 49 is a schematic sectional axial view of a portion of an example implementation of apparatus according to one or more aspects of the present disclosure disposed within a wellbore.

As also described above, measurement quality may be enhanced by employing azimuthally distributed "point source" transmitters instead of a conventional omnidirectional source (such as depicted by the dashed circle 405 in FIG. 6). FIG. 48 is a schematic sectional axial view of the well 930 having the channel 932 in the cement 108 beneath the casing 109 and an implementation of an acoustic tool 943 comprising an omnidirectional (e.g., monopole ring) source 950 (i.e., transmitter) disposed within the wellbore 104 adjacent the channel 932. FIG. 49 is a schematic sectional axial view of the well 930 having the channel 932 in the cement 108 beneath the casing 109 and an implementation of an acoustic tool 945 comprising a plurality of individual point sources 952 (i.e., transmitters) disposed within the wellbore 104 adjacent the channel 932. The omnidirectional source 950 excites the entire casing 109 at the same time. However, if the individual point sources 952 are fired sequentially, each individual point source 952 excites just a small section of the casing 109 where the channel 932 may be present.

Figure 50:
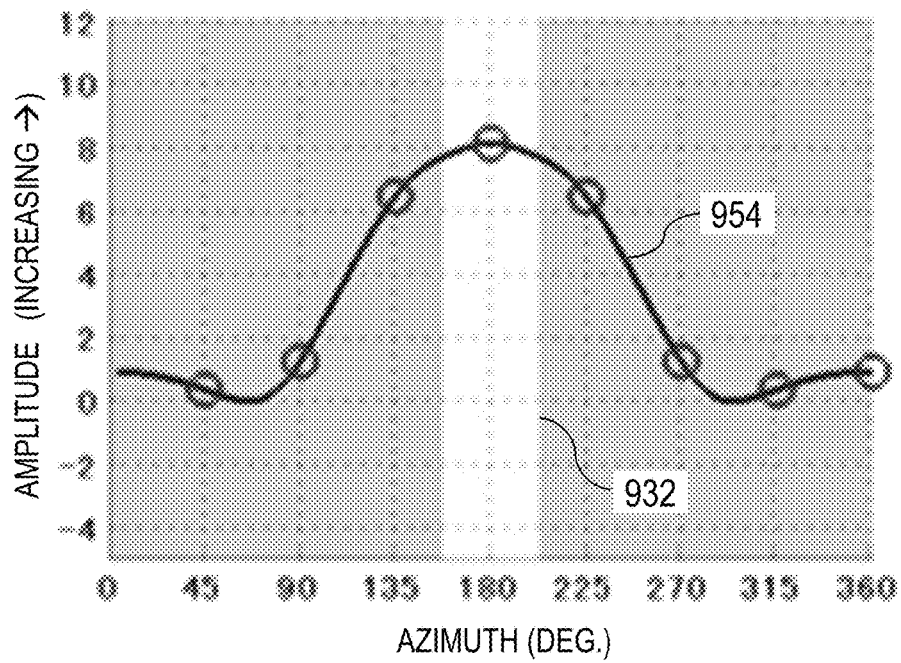
FIGS. 50 and 51 are graphs depicting one or more aspects related to the present disclosure.
Figure 51:
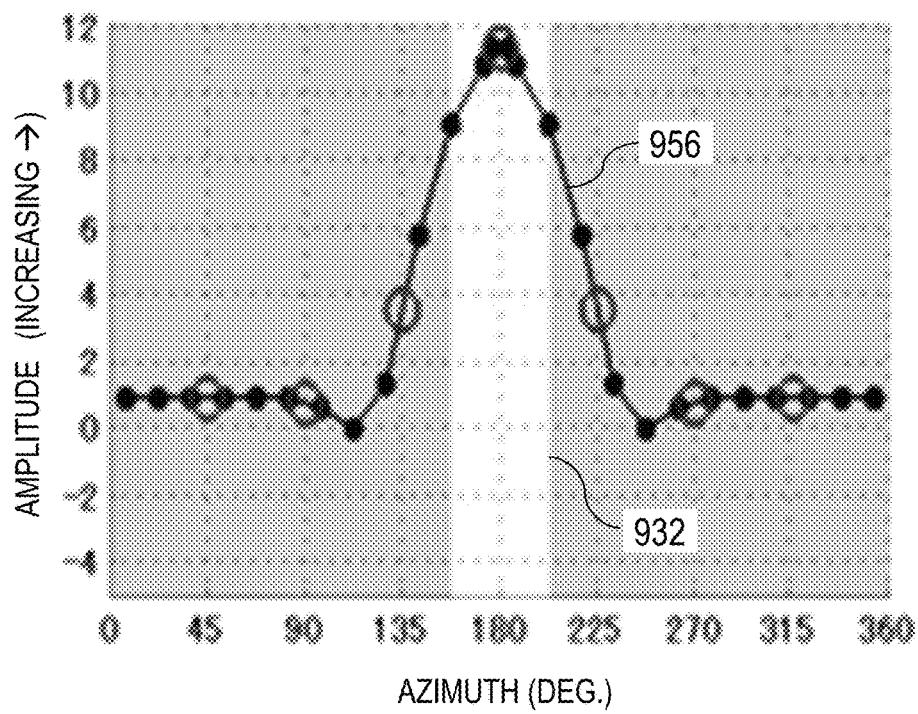

FIGS. 50 and 51 are graphs depicting amplitudes of the acoustic signal detected by one or more receivers of the acoustic tools 943, 945, respectively, shown along the vertical axes, with respect to azimuthal position within the wellbore 104, shown along the horizontal axes. Each graph also indicates azimuthal position of the channel 932, extending between about 160 degrees and about 200 degrees within the wellbore 104. FIG. 50 shows a curve 956 indicative of the amplitude of acoustic signal transmitted at 100 kHz by the omnidirectional source 950. As can be observed, the amplitude of the curve 956 between about 160 degrees and about 200 degrees associated with the channel 932 is greater than amplitudes of other portions of the curve 956. Furthermore, the peak of the curve 954 is located within the channel 932, such as may indicate the location and/or size of the channel 932. FIG. 51 shows a curve 956 indicative of the amplitude of acoustic signal transmitted at 100 kHz by the individual point sources 952. As can be observed, the amplitude of the curve 956 between about 160 degrees and about 200 degrees associated with the channel 932 is also greater than amplitudes of other portions of the curve 956. However, the peak of the curve 956 is more clearly defined than the peak of curve 954, such as may more clearly indicate the location and/or size of the channel 932. Accordingly, for the same firing frequency, azimuthal resolution may be substantially better when utilizing a plurality of point sources 952, relative to a single, omnidirectional source 950. As also described above, by exciting the individual point sources 952 sequentially, the logging operation may obtain full azimuthal coverage of the well 930 without rotating the acoustic tool 945.

Figure 52:
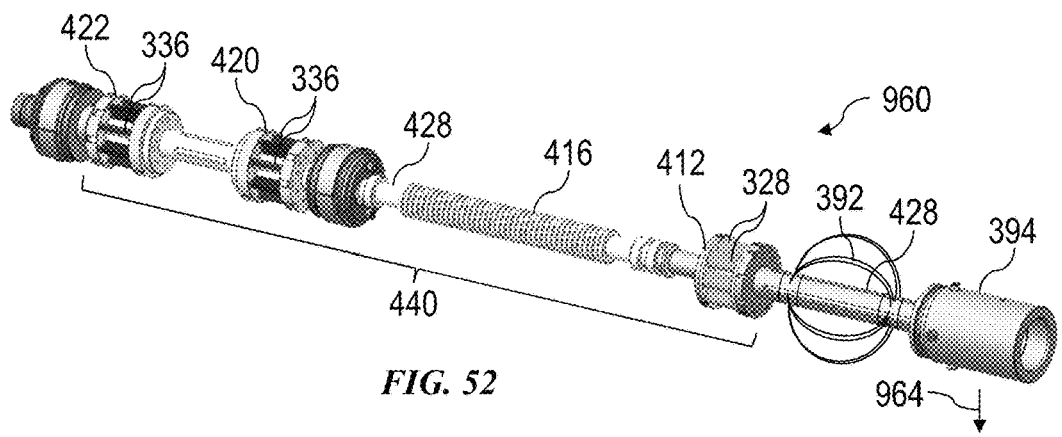
FIG. 52 is a perspective view of a portion of an example implementation of apparatus according to one or more aspects of the present disclosure.

Aspects of the present disclosure also relate to managing inaccuracies related to eccentering of an acoustic tool within a wellbore. For example, cement bond condition measurement can be sensitive to acoustic tool eccentering. Furthermore, slim size acoustic tools are often utilized in wellbores that are highly deviated or horizontal, which can exacerbate eccentering of the acoustic tool. However, the present disclosure introduces acoustic logging tools having multiple receiver stations for attenuation-based measurement. That is, instead of simply measuring amplitude of the first peak of the acoustic signal sensed by the receivers, which highly depends on tool centering, data from multiple, axially spaced receivers may be utilized for measuring signal attenuation to minimize effect of tool eccentering. FIG. 52 is a perspective view of an example implementation of an acoustic tool 960 comprising a mapping transmitter unit 412 (i.e., transmitter array or station) comprising a plurality of point sources 328 and two receiver units 420, 422 (i.e., mapping receiver arrays or stations), each comprising a plurality of receivers 336. The acoustic tool 960 may comprise one or more similar features of the acoustic tool 300 shown in FIGS. 3-7, including where indicated by like reference numbers. As described above, each set of receivers 336 of the receiver units 420, 422 is operable to measure the amplitude of the transmitted acoustic signals at different azimuthal locations. One or both of the acoustic tool 960 and/or the surface equipment 190, 290 may be individually and/or cooperatively operable to determine differences between the amplitudes of the acoustic signals measured by the receiver units 420, 422 to determine acoustic signal attenuation. The determined differences in amplitudes may be utilized to offset or compensate for error in each measured amplitude resulting from eccentering of the acoustic tool 960 within the wellbore.

Additional aspects introduced in the present disclosure and related to managing acoustic tool eccentering pertain to utilizing a cantilever effect to maintain a mapping portion 440 (i.e., sonde section) of the acoustic tool 960, comprising the transmitter units 412 and receiver units 420, 422, substantially centralized within the wellbore. As shown in FIG. 52, as well as in FIGS. 3 and 4 described above, cantilevered masses 394 (i.e., members comprising a predetermined mass) may connected with the acoustic tool 960 on opposing sides of the mapping portion 440 and may be utilized to maintain the mapping portion 440 substantially centralized within the wellbore. The acoustic tool 960 may further comprise downhole centralizers 392, each located between the mapping portion 440 and a corresponding cantilevered mass 394. The centralizers 392 may centralize, lift, or otherwise maintain the cantilevered masses 394 above a bottom sidewall of the wellbore.

The centralizers 392 may operate as fulcrums between the mapping portion 440 and the cantilevered masses 394, causing a cantilever effect that may permit the cantilevered masses 394 to sag in the downward direction (i.e., direction of gravity), as indicated by arrow 964 while flexing, bending, or otherwise urging the mapping section 440 in an upward direction counteracting the natural tendency of the mapping portion 440 to sag in the downward direction to maintain the mapping section 440 substantially centralized within the wellbore.

Figure 53:
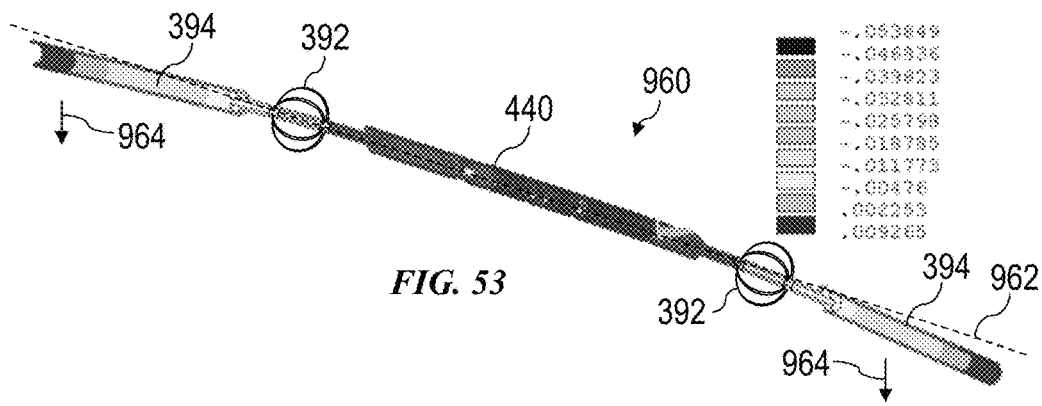
FIG. 53 is a schematic perspective view of at least a portion of an example implementation of apparatus according to one or more aspects of the present disclosure.
Figure 54:
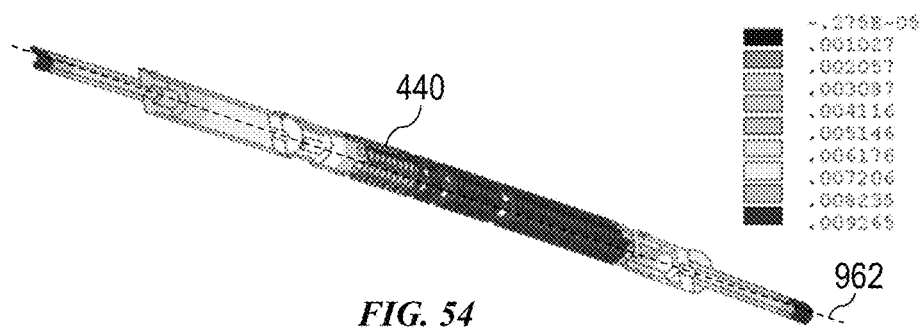
FIGS. 54 and 55 are enlarged views of a portion the apparatus shown in FIG. 53 according to one or more aspects of the present disclosure.
Figure 55:
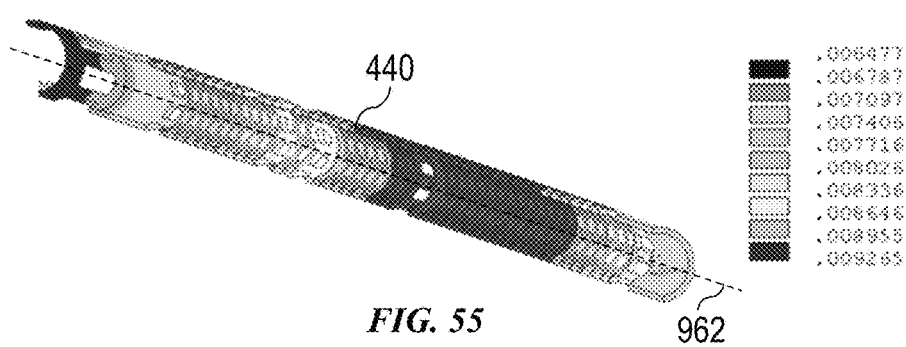

FIGS. 53-55 depict an example finite element analysis of this concept, showing vertical displacement of different portions of the acoustic tool 960 with respect to a reference axis 962 (e.g., central axis of a wellbore, central axis of the acoustic tool 960 when deployed within a vertical wellbore). FIG. 53 shows the cantilever masses 394 sagging downwards or otherwise being urged in the direction of gravity on one side of the centralizers 392, as indicated by arrows 964, causing the mapping portion 440 to flex or bend upwards to counteract the tendency of the mapping portion 440 to sag downwards to maintain the mapping portion 440 substantially centered along the reference axis 962. The legend of FIG. 53 indicate a vertical displacement of the cantilever masses 394 with respect to the reference axis 962 and a vertical displacement of the mapping portion 440 with respect to the reference axis 962. The negative legend values indicate that the cantilever masses 394 are displaced below the reference axis 962 and the positive legend values indicate that the mapping portion 440 is displaced slightly above, but very close to the reference axis 962. Thus, utilizing cantilever masses 394 substantially minimizes downward sagging of the mapping portion 440. FIGS. 54 and 55 show enlarged views of the mapping portion 440 of the acoustic tool 960 along with vertical displacements of different areas of the mapping portion 440.

Figure 56:
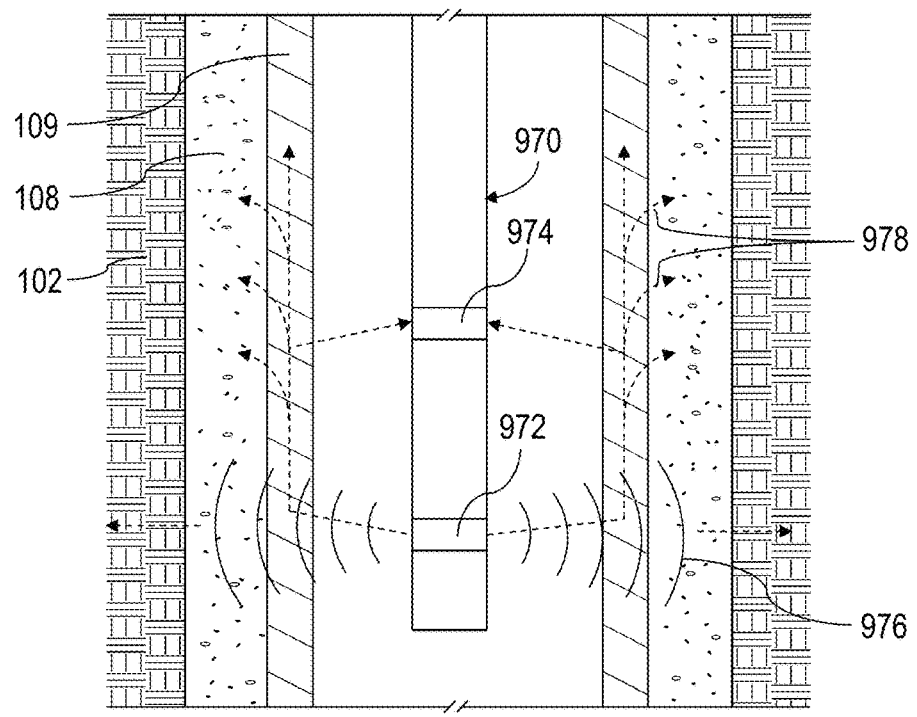
FIG. 56 is a schematic side view of at least a portion of an example implementation of apparatus according to one or more aspects of the present disclosure disposed within a wellbore.

As also described above, one or more aspects of the present disclosure also relate to analysis of cement coupling condition. Amplitudes evaluated by conventional CBL measurements depend on the amount of coupling attenuation and propagation attenuation. FIG. 56 is a schematic view of an example implementation of an acoustic tool 970 comprising an acoustic transmitter 972 and an acoustic receiver 974 disposed within a wellbore 104. The figure also shows coupling attenuation 976, such as may be related to the acoustic energy leakage from the casing 109 in front of the transmitter 972, and propagation attenuation 978, such as may be related to energy loss attributed to the casing extensional mode during propagation along the casing 109. Because acoustic signal attenuation measurements are just for the propagation attenuation 978, a combination of amplitudes and attenuation measurements may permit assessment of the coupling attenuation 976. Such method may be utilized when a micro-annulus is present around the cemented casing 109, and apparent CBL amplitudes are high, as if there is no cement 108 behind the casing 109.

Figure 57:
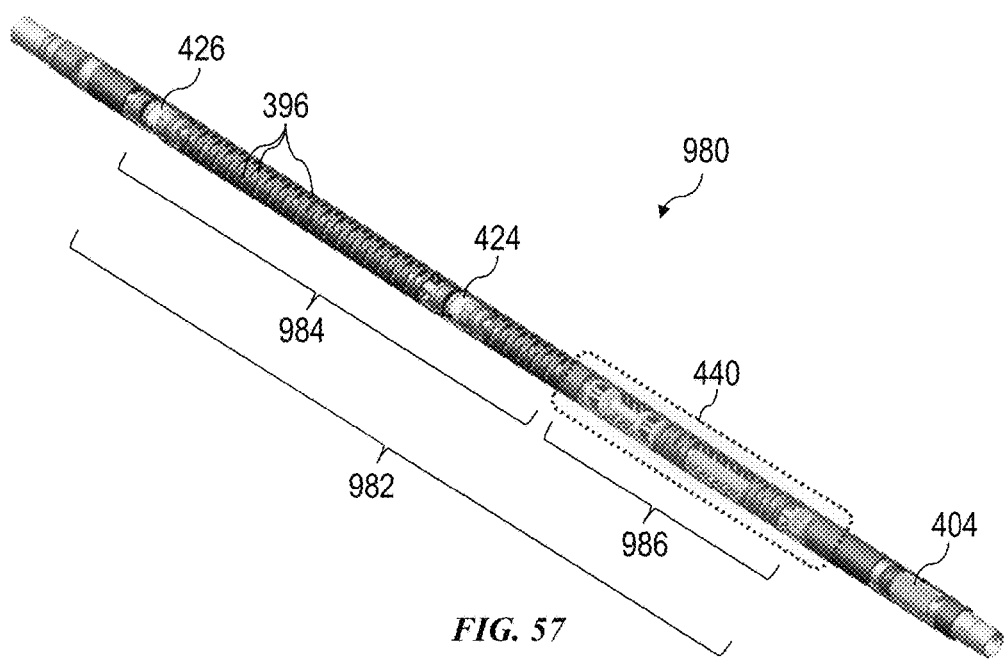
FIG. 57 is a perspective view of at least a portion of an example implementation of apparatus according to one or more aspects of the present disclosure.

Some conventional acoustic tools may include a slotted sleeve to aid with acoustic signal attenuation. Such slotted sleeves may be optimized for a single frequency. FIG. 57 is a partial sectional view of an example implementation of an acoustic tool 980 according to one or more aspects of the present disclosure. The acoustic tool 980 may comprise one or more similar features of the acoustic tool 300 shown in FIGS. 3-7, including where indicated by like reference numbers, except as described below. The acoustic tool 980 comprises receivers 424, 426, a transmitter 404, and a mapping portion 440. The acoustic tool 980 may further include a hybrid slotted sleeve 982 having a plurality of slots 396 extending radially through the sleeve 982. The slots 396 may be elongated extending circumferentially partially around the sleeve 982. The slots 396 may be distributed axially along the length of the sleeve 982. The slotted sleeve 982 may extend between and/or about one or more portions of the acoustic tool 980, such as the receivers 424, 426 and the mapping portion 440. The slotted sleeve 982 may be tuned to substantially decrease or eliminate the tool arrivals for both high and low frequencies.

The acoustic tool 980 according to one or more aspects of the present disclosure may utilize a high-frequency (e.g., greater than about 50 kHz) measurement with short TR spacing for mapping, and a lower frequency (e.g., less than about 30 kHz) CBL/VDL measurement. For example, the mapping portion 440 may be a high-frequency mapping portion of the acoustic tool 980, such as may be tuned for the higher operating frequency, while the receivers 424, 426 may be low-frequency CBL/VDL portion of the acoustic tool 980, such as may be tuned for the lower operating frequency. Such tuning may be via the size, spacing, and/or numbers of slots of the slotted sleeve 982 encompassing different portions of the acoustic tool 980. For example, some of the slots 396 may comprise a first size while other slots 396 may comprise a second size that is different from the first size. Referring also to FIG. 3, the slots 396 may comprise a first set of slots 984 each having a larger size (e.g., width 397, length) and a second set of slots 986 each having a smaller size (e.g., width 398, length). The slotted sleeve 982 comprising the first set of slots 984 may extend around and/or between the receivers 424, 426, while the slotted sleeve 982 comprising the second set of slots 986 may extend around and/or between the transmitter 412 and the receivers 420, 422 of the mapping portion 440. Accordingly, the slots 984 comprising the larger size may attenuate the acoustic signals having the lower frequency, while the slots 986 comprising the smaller size may attenuate the acoustic signals having the higher frequency. The size of the slots 396 may be configured to be smaller (e.g., lesser, shorter) than the wavelengths of the corresponding acoustic signals. Tuning may also be via selection of different materials for the slotted sleeve 982 and/or other characteristics of the slotted sleeve 982.

Figure 58:
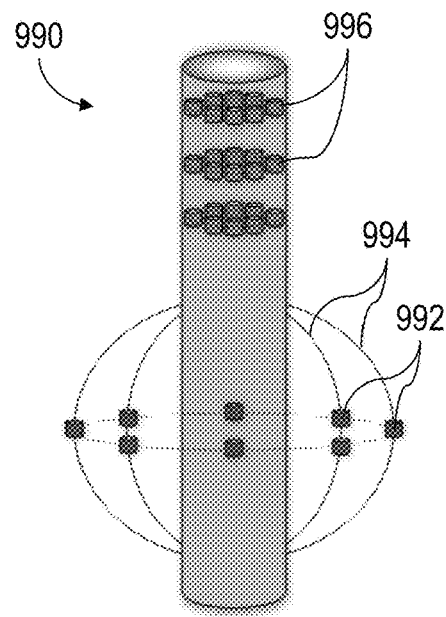
FIG. 58 is a schematic perspective view of at least a portion of an example implementation of apparatus according to one or more aspects of the present disclosure.

The present disclosure also introduces an implementation of an acoustic tool having a transmitter configuration in which the transmitter elements are mounted on expandable arms. FIG. 58 is a schematic view of an example implementation of an acoustic tool 990 according to one or more aspects of the present disclosure, comprising a plurality of acoustic transmitters 992 mounted on or otherwise carried by corresponding expandable arms 994 operable to move the acoustic transmitters 992 between a radially retracted position and a radially extended position. Such implementation of the acoustic tool 990 may permit the transmitters 992 to be positioned right next to a casing and, thus, substantially eliminate eccentralization of the transmitters 992. The acoustic tool 990 may further comprise one or more sets of acoustic receivers 996 disposed at an axial distance from the transmitters 992. In such implementations, the acoustic signal travel path through the mud may also be reduced, thus permitting shorter TR spacing for even high-resolution and signal-to-noise ratio (SNR).

Figure 59:
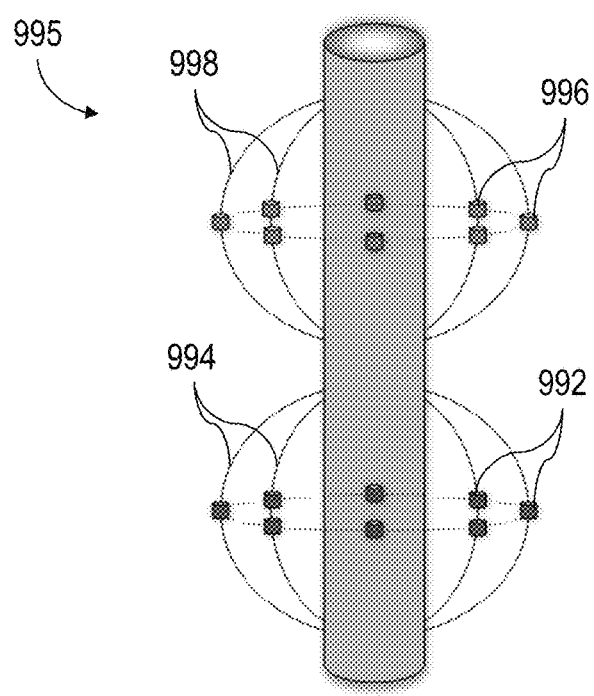
FIG. 59 is a schematic perspective view of at least a portion of an example implementation of apparatus according to one or more aspects of the present disclosure.

The present disclosure also introduces an implementation of an acoustic tool in which both the transmitter elements and the receiver elements are mounted on expandable arms. FIG. 59 is a schematic view of an example implementation of an acoustic tool 995 according to one or more aspects of the present disclosure, comprising a plurality of acoustic transmitters 992 mounted on or otherwise carried by corresponding expandable arms 994 and a plurality of acoustic receivers 996 mounted on or otherwise carried by expandable arms 998 operable to move the acoustic receivers 996 between a radially retracted position and a radially extended position. In such implementations, the robustness to eccentralization may be further enhanced because the transmitters 992 and the receivers 996 may be moved radially into contact with the casing or formation. Consequently, the TR spacing may be reduced even further than in the acoustic tool 990.

Figure 60:
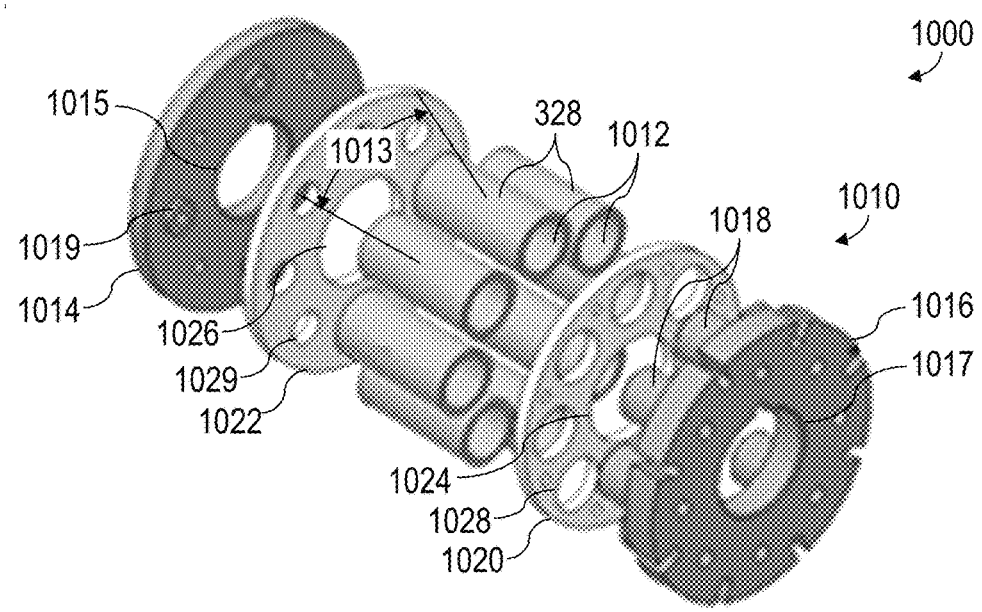
FIG. 60 is an exploded perspective view of a portion of an example implementation of apparatus according to one or more aspects of the present disclosure.

The present disclosure also introduces one or more aspects related to mounting of the acoustic transmitters as part of an acoustic tool within the scope of the present disclosure. FIG. 60 is an exploded view of an example implementation of an acoustic transmitter unit 1010 (i.e., station or array) according to one or more aspects of the present disclosure. The acoustic transmitter unit 1010 may be or form a portion of an acoustic tool 1000, which may comprise one or more similar features of the acoustic tool 300 shown in FIGS. 3-7, the acoustic tool 960 shown in FIG. 52, or another acoustic tool within the scope of the present disclosure. Accordingly, the acoustic transmitter unit 1010 may comprise one or more similar features of the transmitter unit 412 of the acoustic tools 300, 960, including where indicated by like reference numbers, except as described below. The following description refers to FIGS. 3-7, 52, and 60 collectively.

Mounting structure or means for mounting the transmitter 328 may provide improved matching between each transmitter response, which can affect quality, repeatability, and reliability of mapping measurements. The structure utilized to mount the transmitters 328 can affect the matching, such as pre-stress and stress change on the transmitters 328 caused by environmental conditions and manufacturing tolerances. The transmitter unit 1010 may comprise a plurality (e.g., eight) of cylindrical transmitters 328, each having an axial opening 1012 extending therethrough. The transmitters 328 may be maintained in predetermined position between opposing retaining rings or caps 1014, 1016. Each cap 1014, 1016 comprises an axial opening 1015, 1017, such as may permit the caps 1014, 1016 and, thus, the transmitters 328 to be positioned about the structural member 428 of the acoustic tool 1000. One or both of the caps 1014, 1016 may comprise protrusions 1018 distributed circumferentially along a face of the caps 1014, 1016 and configured to extend into corresponding openings 1012 of the transmitters 328, such as to maintain the transmitters 328 distributed circumferentially at predetermined intervals 1013 (e.g., 45 degrees) about the structural member 428. One or both of the caps 1014, 1016 may be fixedly connected with the structural member 428, such as via a flange (not shown) extending from and/or around the structural member 428 to connect the transmitter unit 1010 to the structural member 428. The transmitter unit 1010 may further comprise flexible material (e.g., rubber, silicone, or another flexible elastomeric) sheets 1020, 1022 disposed between the transmitters 328 and the caps 1014, 1016, respectively. The transmitters 328 may be mounted on or against the sheets 1020, 1022 perhaps without pre-load, which may substantially reduce or eliminate stresses that may be generated by or otherwise imparted on each transmitter 328, such as caused by environmental changes. Each sheet 1020, 1022 comprises an axial opening 1024, 1026, such as may accommodate the structural member 428 therethrough. The sheet 1020 may further comprise a plurality of axial openings 1028 configured to accommodate therein the alignment projections 1018. The sheet 1022 may comprise a plurality of axial openings 1029 configured to accommodate therein alignment projections 1019 of the cap 1014, which may be operable to maintain the sheet 1022 aligned with the cap 1014.

Piezoelectric response of acoustic receivers within the scope of the present disclosure may change when stress is applied to the receivers. Conventional acoustic tools secure piezoelectric receivers via O-rings at opposing ends, which may apply pre-stress to the receivers. The O-rings can impart additional stress to the receivers due to environmental changes. Accordingly, the present disclosure also introduces one or more aspects related to mounting of the acoustic receivers as part of an acoustic tool within the scope of the present disclosure, such as may be operable to reduce or eliminate stresses that may be applied to the receivers.

Figure 61:
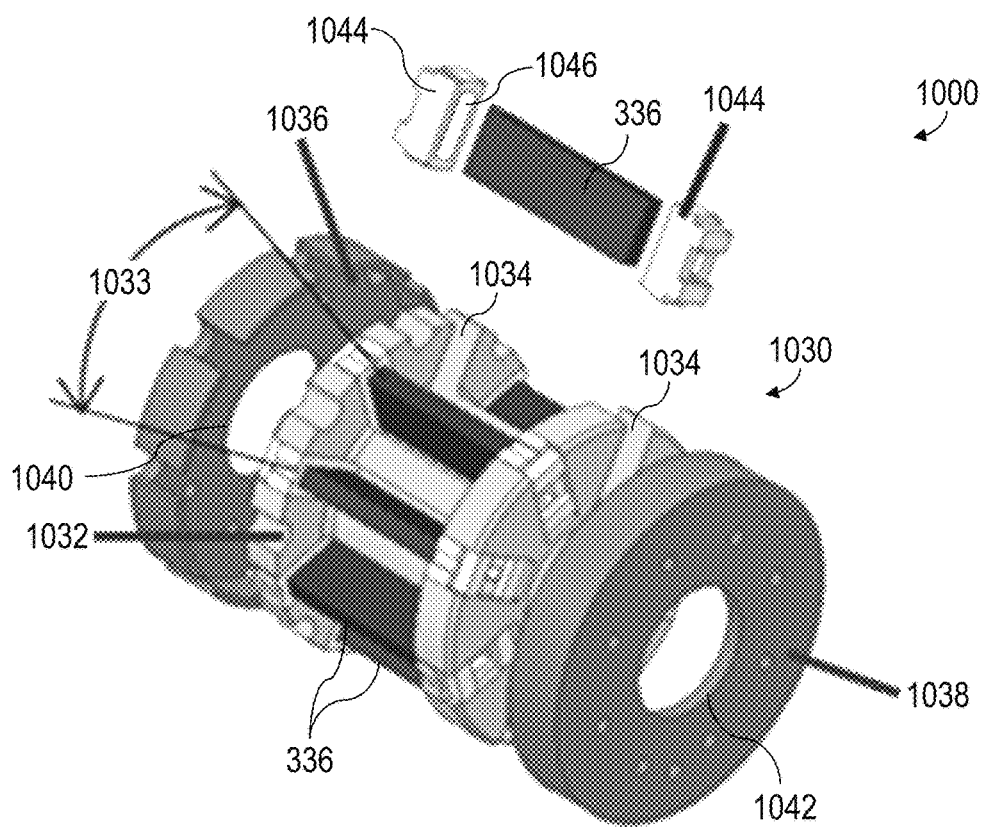
FIG. 61 is an exploded perspective view of a portion of an example implementation of apparatus according to one or more aspects of the present disclosure.
Figure 62:
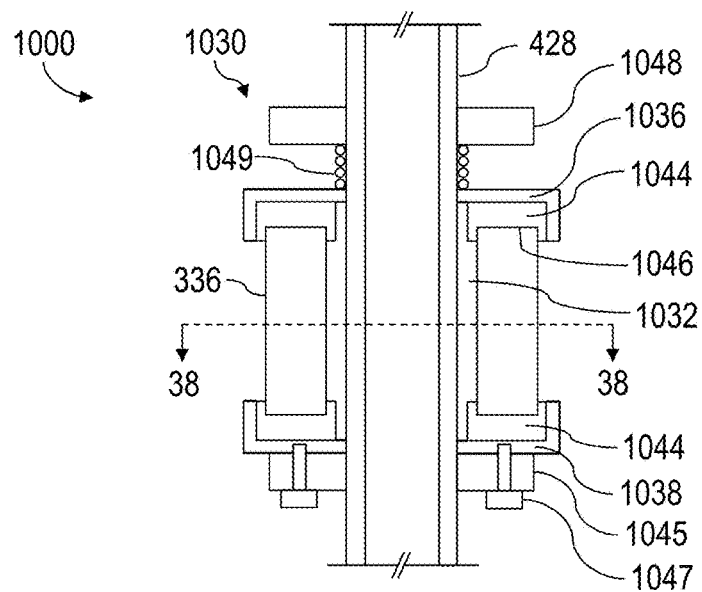
FIG. 62 is a side sectional view of the apparatus shown in FIG. 61 according to one or more aspects of the present disclosure.

FIG. 61 is an exploded view of an example implementation of an acoustic receiver unit 1030 (i.e., station or array) of the acoustic tool 1000 according to one or more aspects of the present disclosure. FIG. 62 is a side sectional view of the acoustic receiver unit 1030 of the acoustic tool 1000 shown in FIG. 61. As described above, the acoustic tool 1000 may comprise one or more similar features of the acoustic tool 300 shown in FIGS. 3-7, the acoustic tool 960 shown in FIG. 52, or another acoustic tool within the scope of the present disclosure. Accordingly, the receiver unit 1030 may comprise one or more similar features of the receiver units 420, 422 of the acoustic tools 300, 960, including where indicated by like reference numbers, except as described below. The following description refers to FIGS. 3-7, 52, 61, and 62, collectively.

The receiver unit 1030 may comprise a plurality (e.g., eight) of receivers 336, maintained in predetermined position by a cylindrical support guide or frame 1032. The frame 1032 comprises an axial opening (obstructed from view), such as may permit the frame 1032 to be positioned about the structural member 428 of the acoustic tool 1000. The frame 1032 may comprise a plurality of axially extending cavities or channels 1034 distributed circumferentially at predetermined intervals 1033 (e.g., 45 degrees) along the frame 1032. The channels 1034 may be configured to accept therein and hold the receivers 336, such as to maintain the receivers 336 distributed circumferentially about the structural member 428. The frame 1032 may be positioned between opposing retaining rings or caps 1036, 1038. Each retaining cap 1036, 1038 may comprise a corresponding axial opening 1040, 1042, such as may permit the caps 1036, 1038 and, thus, the receivers 336 to be positioned about the structural member 428 of the acoustic tool 1000. The receiver unit 1030 may further comprise flexible (e.g., rubber, silicone, or another flexible elastomeric) clips, brackets, or other retaining members 1044 configured to hold or otherwise retain the receivers 336 within corresponding channels 1034 and substantially reduce or eliminate the pre-stress and additional stress that may be generated by or otherwise imparted on each transmitter 328, such as caused by environmental changes. Each retaining member 1044 may comprise a cavity 1046 operable to accommodate and retain therein an end of a corresponding receiver 336. Once a retaining member 1044 is disposed about each end of a corresponding receiver 336, the retaining members 1044 and the receiver 336 may be inserted into one of the channels 1034 such that outer surfaces of the retaining members 1044 abut inner surfaces of the channels 1034 of the frame 1032. The retaining members 1044 may hold the receivers 336 within the cavities 1046 by applying light compression against the ends of the receivers 336 or without applying compression, thereby eliminating or substantially eliminating pre-load, which may substantially reduce or eliminate stress imparted into the transmitters 336.

Furthermore, outer portions of the caps 1036, 1038 may extend at least partially about or around the retaining members 1044 to retain the retaining members 1044 and the receivers 336 within the channels 1034. One or more of the caps 1036, 1038 may be fixedly connected with the structural member 428 to maintain the receiver unit 1030 in a predetermined position along or about the structural member 428. For example, the cap 1038 may be connected with the structural member 428 via a flange 1045 fixedly connected with and extending from the structural member 428. A plurality of bolts 1047 may extend through the flange 1045 to threadedly engage the endcap 1038 and, thus, connect the endcap 1038 with the flange 1045. The receiver unit 1030 may further comprise another flange 1048 or another member fixedly connected with the structural member 428 at an axial distance from the flange 1045 on opposing side of the end cap 1036. A biasing member 1049 (e.g., a spring) may be compressed between the flange 1048 and the end cap 1036, such as may bias the end cap 1036 against the frame 1032, the retaining members 1044, and the receivers 336, to maintain the frame 1032, the retaining members 1044, and the receivers 336 together in the predetermined position along or about the structural member 428. One or both of the flanges 1045, 1048 may be threadedly or otherwise detachably connected with the structural member 428.

Figure 63:
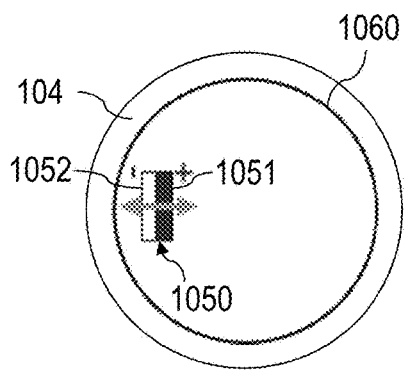
FIG. 63 is a schematic axial view of a portion of apparatuses related to the present disclosure disposed within a wellbore.
Figure 64:
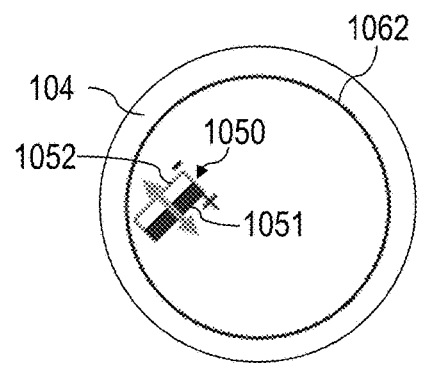
FIG. 64 is a schematic axial view of a portion of apparatuses related to the present disclosure disposed within a wellbore.
Figure 65:
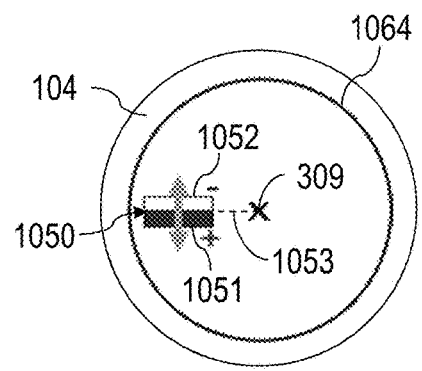
FIG. 65 is a schematic axial view of a portion of an example implementation of apparatus according to one or more aspects of the present disclosure disposed within a wellbore.
Figure 66:
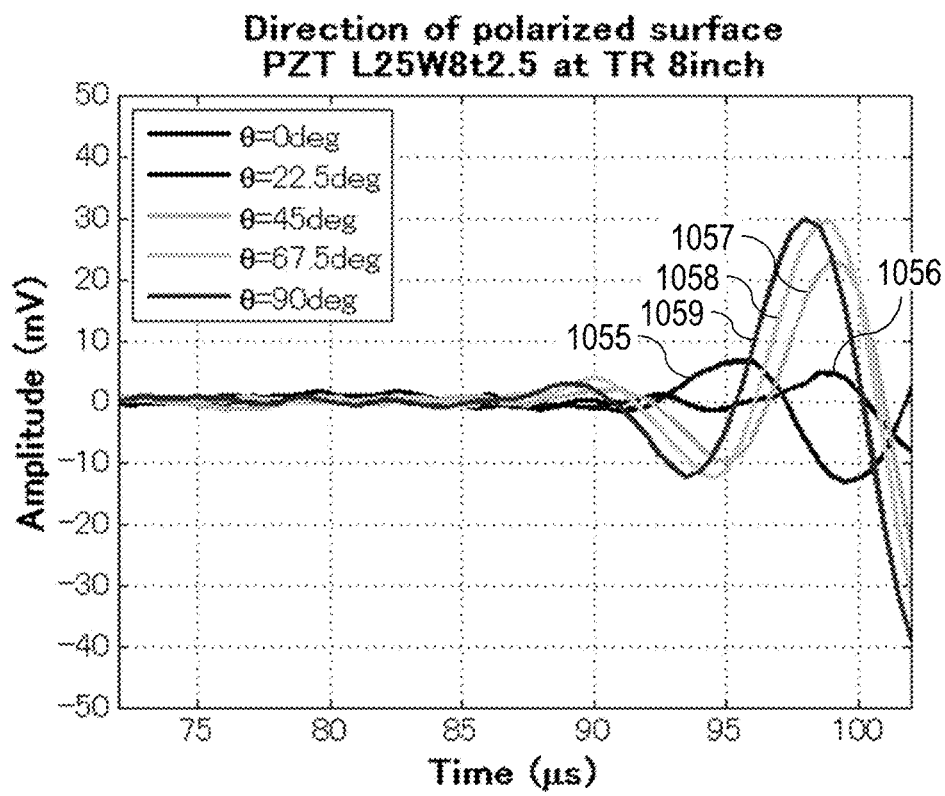
FIGS. 66 and 67 are graphs depicting one or more aspects related to the present disclosure.
Figure 67:
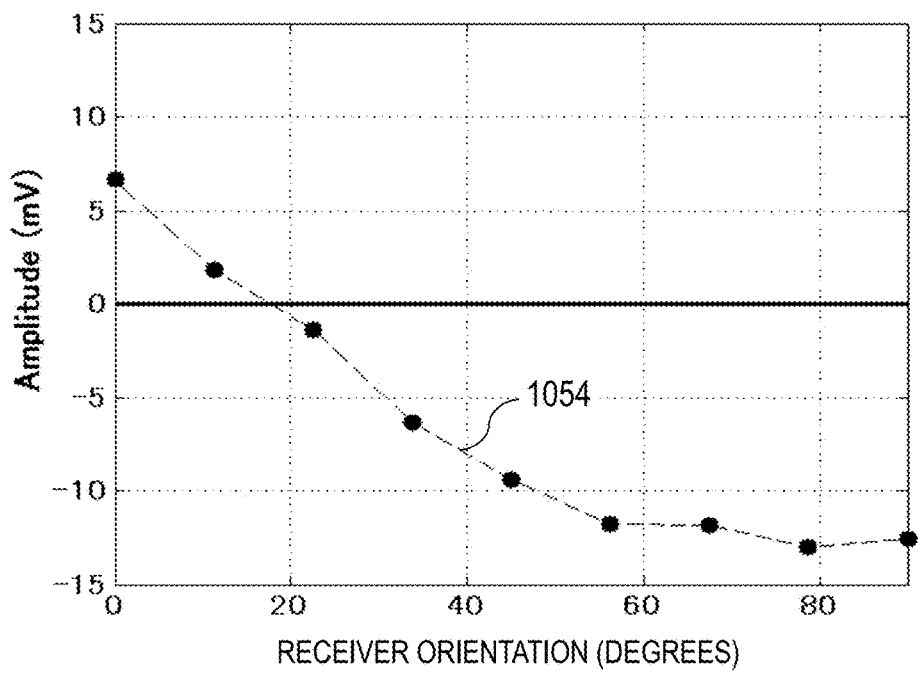

The present disclosure also introduces one or more aspects related to orientation of piezoelectric receivers within the scope of the present disclosure. FIGS. 63-65 are schematic views of example acoustic tools 1060, 1062, 1064, each having a piezoelectric receiver 1050 with different orientation with respect to the corresponding acoustic tool 1060, 1062, 1064 and, thus, with respect to the wellbore 104. The receiver 1050 may comprise one or more similar features of the receiver 336 described above. FIG. 66 is a graph showing acoustic signal amplitude sensitivity of the receiver 1050, shown along the vertical axis, with respect to time, shown along the horizontal axis, for different receiver orientations. FIG. 67 is a graph showing acoustic signal amplitude sensitivity of the receiver 1050, shown along the vertical axis, with respect to receiver orientation, shown along the horizontal axis.

The receiver 1050 may comprise oppositely polarized faces or surfaces 1051, 1052. In conventional acoustic tools, such as the acoustic tool 1060 shown in FIG. 63, the direction of the polarized surfaces 1051, 1052 of the piezoelectric receivers 1050 is in line with the radial direction of the acoustic tool, referred to as a 0 degree orientation. FIGS. 64 and 65 show the acoustic tools 1060, 1062 with the receivers 1050 in 45 and 90 degree orientations, respectively. The graph in FIG. 66 shows curves 1055-1059 associated with 0, 22.5, 45, 67.5, and 90 degree orientations, respectively. The amplitude of the curves 1055-1059 show that receiver sensitivity increases as the receiver 1050 is oriented closer to the 90 degree orientation. Furthermore, the slope of curve 1054 shown in FIG. 67 indicates that signal amplitude is very sensitive to sensor orientation variations between about 0 and 56 degree orientations and that the signal amplitude is substantially stable or otherwise less sensitive to orientation variations between about 56 and 90 degree orientations. Such behavior indicates that the signal amplitude can be largely affected by errors of the sensor orientation in an acoustic tool. The signal amplitude can be also be affected by eccentering of the acoustic tool, since receiver orientation relative to casing signal changes. Accordingly, an acoustic tool within the scope of the present disclosure, such as the acoustic tools 300, 960, 1000 described above, may comprise a plurality of receivers 1050 comprising oppositely polarized surfaces 1051, 1052 that are substantially perpendicular to a radial line 1053 extending from the central axis 309 of the acoustic tool to each one of the receivers 1050.

Figure 68:
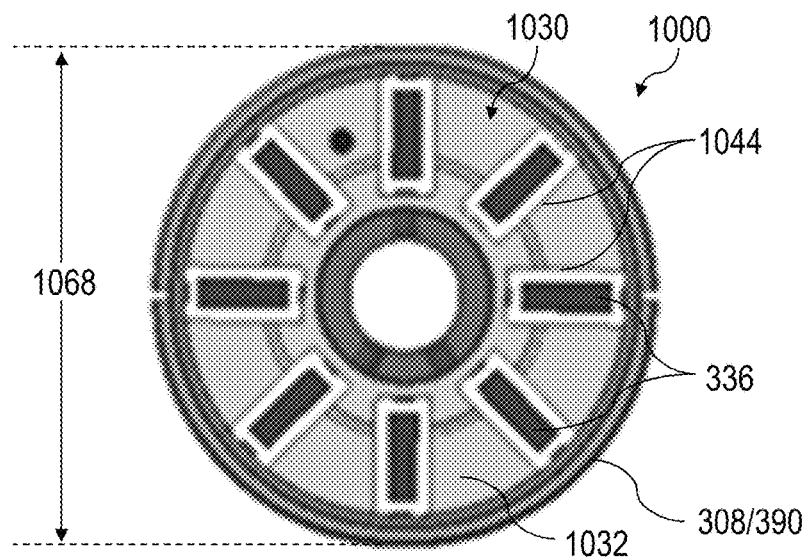
FIG. 68 is an axial sectional view of a portion of an example implementation of apparatus according to one or more aspects of the present disclosure.

Accordingly, the present disclosure introduces orienting the piezoelectric receivers 336 at 90 degree orientation, as shown in FIGS. 5 and 7. FIG. 68 is an axial view of the receiver unit 1030 of the acoustic tool 1000 shown in FIG. 62 according to one or more aspects of the present disclosure, comprising a plurality (e.g., eight) of acoustic receivers 336 mounted at 90 degree orientation. Such implementations may enhance azimuthal measurement quality, wherein the 90 degree orientation may increase signal level and substantially minimize the effect of the orientation error compared to that of the 0 degree orientation and other orientations shown in FIGS. 63 and 64 or otherwise described above.

An acoustic tool within the scope of the present disclosure, including the acoustic tools 300, 960, 1000, 1064 described herein, may comprise an outer housing 308 and/or a slotted sleeve 390 encasing various operational components (e.g., transmitter units 412, 430, 422, receiver units 408, 424, 426) described herein. The outer housing 308 and/or the slotted sleeve 390 and, thus, outer diameter of the acoustic tool within the scope of the present disclosure may comprise an outer diameter 1068 that is less than or equal to about 7.62 centimeters (3.0 inches). For example, the outer diameter 1068 of the downhole tool within the scope of the present disclosure may be about 5.3975 centimeters (2.125 inches).

The present disclosure also introduces additional attenuator structure. Acoustic signals (i.e., waves) propagate through internal structures as noise, which can affect acoustic measurements if the acoustic signals overlap casing signals in time and amplitude. Accordingly, the present disclosure introduces a bellows attenuator that can substantially reduce or eliminate the internal structure arrival for high acoustic signal frequencies (e.g., greater than about 100 kHz). The bellows attenuator may comprise, for example, a series of spaced apart rings, unequal sized washers, a coiled member, and/or other features substantially surrounding one or more structural members (i.e., internal structures) extending between the transmitter and receiver units. A TEFLON tube or sleeve may also or instead be utilized, such as in implementations the TR spacing is short, such as less than about 0.5 m. Such bellows attenuator may comprise one or more similar features of the bellows attenuator 416 surrounding the internal structure 428 described above and shown in FIGS. 4 and 5.

Figure 69:
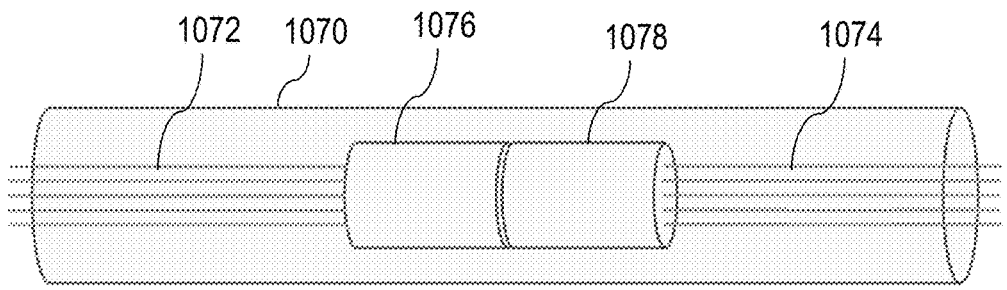
FIG. 69 is a perspective schematic view of a portion of an example implementation of apparatus according to one or more aspects of the present disclosure.

Wire arrivals may also cause inaccurate cement evaluations. That is, acoustic signals can propagate through internal wires of acoustic logging tools as microphonic noise, which can affect measurement quality. Acoustic signal amplitude can substantially change depending on wiring process (e.g., bundling and/or looping), which can make assembly and testing processes more difficult and complex. Accordingly, the present disclosure introduces electrical connectors along (e.g., in the middle) communication wires extending between transmitter and receiver units, such as may substantially reduce or eliminate wire arrivals. FIG. 69 is a schematic view of an example implementation of an attenuator 1070 extending between one or more transmitter units (such as transmitter units 412 shown in FIGS. 4 and 6) and one or more receiver units (such as receiver units 420, 422 shown in FIGS. 4 and 7). The attenuator 1070 may house therein electrical through wires 1072, 1074 electrically connected together via corresponding electrical connectors 1076, 1078. The acoustic signals transmitted through the electrical wires 1072, 1074 may thus be attenuated at the connectors 1076, 1078, because the acoustic coupling of the connectors 1076, 1078 is weaker than that of a continuous set of wires, which are connected without shear coupling at the connectors 1076, 1078. Structural masses (not shown) may also or instead be disposed around the wires 1072, 1074 at predetermined intervals, such as may introduce a mass-spring system. Wire arrivals may be attenuated in one or more frequency stop bands by selecting a mass-spring structure based on, for example, periodicity of mass and non-mass parts, size of mass, and/or other characteristics.

Figure 70:
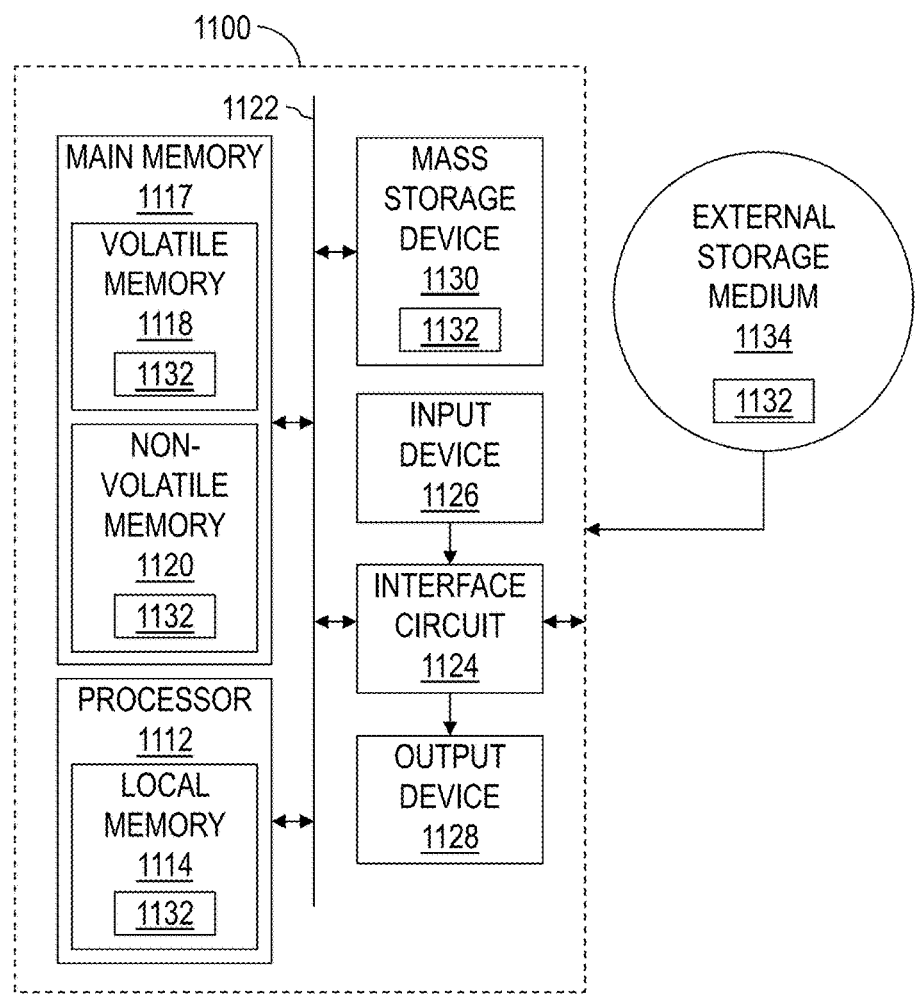
FIG. 70 is a schematic view of at least a portion of an example implementation of apparatus according to one or more aspects of the present disclosure.

FIG. 70 is a schematic view of at least a portion of an example implementation of a processing system 1100 according to one or more aspects of the present disclosure. The processing system 1100 may execute example machine-readable instructions to implement at least a portion of one or more of the methods and/or processes described herein, and/or to implement a portion of one or more of the example downhole tools described herein. The processing system 1100 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the processing system 1100 shown in FIG. 70 is implemented within downhole apparatus described above, one or more components or functions of the processing system 1100 may also or instead be implemented in wellsite surface equipment, perhaps including the surface equipment 190 depicted in FIG. 1, the surface equipment 290 depicted in FIG. 2, and/or other surface equipment.

The processing system 1100 may comprise a processor 1112, such as a general-purpose programmable processor, for example. The processor 1112 may comprise a local memory 1114, and may execute program code instructions 1132 present in the local memory 1114 and/or another memory device. The processor 1112 may execute, among other things, machine-readable instructions or programs to implement the methods and/or processes described herein. The programs stored in the local memory 1114 may include program instructions or computer program code that, when executed by an associated processor, cause a controller and/or control system implemented in surface equipment and/or a downhole tool to perform tasks as described herein. The processor 1112 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 1112 may be in communication with a main memory 1117, such as via a bus 1122 and/or other communication means. The main memory 1117 may comprise a volatile memory 1118 and a non-volatile memory 1120. The volatile memory 1118 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 1120 may be, comprise, or be implemented by read-only memory, flash memory, and/or other types of memory devices. One or more memory controllers (not shown) may control access to the volatile memory 1118 and/or the non-volatile memory 1120.

The processing system 1100 may also comprise an interface circuit 1124. The interface circuit 1124 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 1124 may also comprise a graphics driver card. The interface circuit 1124 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 1126 may be connected to the interface circuit 1124. One or more of the input devices 1126 may permit a user to enter data and/or commands for utilization by the processor 1112. Each input device 1126 may be, comprise, or be implemented by a keyboard, a mouse, a touchscreen, a track-pad, a trackball, an image/code scanner, and/or a voice recognition system, among other examples.

One or more output devices 1128 may also be connected to the interface circuit 1124. One or more of the output devices 1128 may be, comprise, or be implemented by a display device, such as a liquid crystal display (LCD), a light-emitting diode (LED) display, and/or a cathode ray tube (CRT) display, among other examples. One or more of the output devices 1128 may also or instead be, comprise, or be implemented by a printer, speaker, and/or other examples.

The processing system 1100 may also comprise a mass storage device 1130 for storing machine-readable instructions and data. The mass storage device 1130 may be connected to the interface circuit 1124, such as via the bus 1122. The mass storage device 1130 may be or comprise a floppy disk drive, a hard disk drive, a compact disk (CD) drive, and/or digital versatile disk (DVD) drive, among other examples. The program code instructions 1132 may be stored in the mass storage device 1130, the volatile memory 1118, the non-volatile memory 1120, the local memory 1114, and/or on a removable storage medium 1134, such as a CD or DVD.

The mass storage device 1130, the volatile memory 1118, the non-volatile memory 1120, the local memory 1114, and/or the removable storage medium 1134 may each be a tangible, non-transitory storage medium. The modules and/or other components of the processing system 1100 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces an apparatus comprising a downhole tool for operation within a wellbore, wherein the downhole tool comprises: a first transmitter unit located at a first axial location of the downhole tool and operable to transmit a first acoustic signal at a first frequency that is less than 30 kilohertz; a first receiver unit located at a second axial location axially offset from the first axial location and operable to measure amplitude of the first acoustic signal; a second receiver unit located at a third axial location axially offset from the first and second axial locations and operable to measure amplitude of the first acoustic signal; a second transmitter unit comprising a plurality of transmitters azimuthally distributed around a longitudinal axis of the downhole tool at a fourth axial location axially offset from the first, second, and third axial locations, wherein each transmitter of the second transmitter unit is operable to transmit a second acoustic signal at a second frequency that is greater than 50 kilohertz; a third receiver unit comprising a plurality of receivers azimuthally distributed around the longitudinal axis and located at a fifth axial location axially offset from the first, second, third, and fourth axial locations, wherein each receiver of the third receiver unit is operable to measure amplitude of the second acoustic signal; and a fourth receiver unit comprising a plurality of receivers azimuthally distributed around the longitudinal axis and located at a sixth axial location axially offset from the first, second, third, fourth, and fifth axial locations, wherein each receiver of the fourth receiver unit is operable to measure amplitude of the second acoustic signal. The downhole tool may have an outer diameter of 7.6 centimeters, 5.4 centimeters, or less.

The fourth, fifth, and sixth axial locations may each be between the first and third axial locations.

The downhole tool may further comprise: a sonde section comprising the first and second transmitter units and the first, second, third, and fourth receiver units; and first and second cantilevered masses connected with corresponding first and second opposing ends of the sonde section and collectively operable to maintain the sonde section substantially centralized within a non-vertical portion of the wellbore. The first and second cantilevered masses may each comprise: a mass member; and a centralizer located between the mass member and the sonde section.

The amplitude obtained from the fourth receiver unit may be used for determining attenuation of the first or second acoustic signal between the third and fourth receiver locations.

The downhole tool may be operable for performing a CBL and/or VDL operation utilizing at least one of the first and second transmitter units and at least one of the first, second, third, and fourth receiver units at the first frequency.

The downhole tool may be operable for performing a cement mapping operation utilizing at least one of the first and second transmitter units and at least one of the first, second, third, and fourth receiver units at the second frequency.

The downhole tool may further comprise means for attenuating and/or slowing propagation speed of the first and/or second acoustic signals propagating along structure of the downhole tool at the first and second frequencies. The means may comprise a slotted sleeve and/or a bellows.

The transmitters of the second transmitter unit and the receivers of the third and fourth receiver units may each be mechanically isolated from structure of the downhole tool by elastomeric material.

The downhole tool may comprise: a plurality of first elastomeric members each having a cavity containing at least a portion of a corresponding one of the transmitters of the second transmitter unit; a plurality of second elastomeric members each having a cavity containing at least a portion of a corresponding one of the receivers of the third transmitter unit; and a plurality of third elastomeric members each having a cavity containing at least a portion of a corresponding one of the receivers of the fourth transmitter unit. The first, second, and third elastomeric members may each mechanically isolate the corresponding transmitter or receiver from structure of the downhole tool. The structure may positionally fix axial and radial positions of the first transmitter unit, the first and second receiver units, the transmitters of the second transmitter unit, and the receivers of the third and fourth receiver units within the downhole tool.

Each transmitter of the second transmitter unit, each receiver of the third receiver unit, and/or each receiver of the fourth receiver unit may comprise a piezoelectric member having polarized surfaces that are substantially perpendicular to a radial direction that extends from the longitudinal axis to the corresponding transmitter/receiver. Each polarized surface may comprise a rectangular geometry.

The present disclosure also introduces a system comprising a downhole tool for operation within a wellbore, wherein the downhole tool comprises: a first transmitter unit located at a first axial location of the downhole tool and operable to transmit a first acoustic signal at a first frequency that is less than 30 kilohertz; a first receiver unit located at a second axial location axially offset from the first axial location and operable to measure amplitude of the first acoustic signal; a second receiver unit located at a third axial location axially offset from the first and second axial locations and operable to measure amplitude of the first acoustic signal; a second transmitter unit comprising a plurality of transmitters azimuthally distributed around a longitudinal axis of the downhole tool at a fourth axial location axially offset from the first, second, and third axial locations, wherein each transmitter of the second transmitter unit is operable to transmit a second acoustic signal at a second frequency that is greater than 50 kilohertz; a third receiver unit comprising a plurality of receivers azimuthally distributed around the longitudinal axis and located at a fifth axial location axially offset from the first, second, third, and fourth axial locations, wherein each receiver of the third receiver unit is operable to measure amplitude of the second acoustic signal; and a fourth receiver unit comprising a plurality of receivers azimuthally distributed around the longitudinal axis and located at a sixth axial location axially offset from the first, second, third, fourth, and fifth axial locations, wherein each receiver of the fourth receiver unit is operable to measure amplitude of the second acoustic signal. The downhole tool may have an outer diameter of 7.6 centimeters, 5.4 centimeters, or less. The system also comprises surface equipment disposed at a wellsite surface from which the wellbore extends, wherein one or both of the downhole tool and the surface equipment are individually and/or cooperatively operable to detect an empty space within cement behind a casing installed in the wellbore, based on the amplitude measurements obtained by one or more of the first, second, third, and fourth receiver units at two or more different azimuthal locations.

The amplitude measurements obtained by the fourth receiver unit may be used for determining attenuation of the first or second signal between the third and fourth receiver locations.

The fourth, fifth, and sixth axial locations may each be between the first and third axial locations.

The wavelength of the second acoustic signal through metal casing installed in the wellbore may be smaller than a defect in: cement behind the casing; and/or a variation in bonding between the casing and the cement.

The downhole tool may be operable for performing a CBL and/or VDL operation utilizing at least one of the first and second transmitter units and at least one of the first, second, third, and fourth receiver units at the first frequency.

The downhole tool may be operable for performing a cement mapping operation utilizing at least one of the first and second transmitter units and at least one of the first, second, third, and fourth receiver units at the second frequency.

The present disclosure also introduces an apparatus comprising a downhole tool for operation within a wellbore, wherein the downhole tool comprises: a transmitter array comprising a plurality of transmitters azimuthally distributed around a longitudinal axis of the downhole tool at a first axial location of the downhole tool; a first receiver array comprising a plurality of first receivers azimuthally distributed around the longitudinal axis at a second axial location axially offset from the first axial location; and a second receiver array comprising a plurality of second receivers azimuthally distributed around the longitudinal axis at a third axial location axially offset from the first and second axial locations. The downhole tool may have an outer diameter of 7.6 centimeters, 5.4 centimeters, or less.

The downhole tool may further comprise: a sonde section comprising the transmitter array and the first and second receiver arrays; and cantilevered masses extending from opposing ends of the sonde section.

The downhole tool may be operable for performing a mapping operation utilizing the transmitter array and the first and second receiver arrays at a first frequency not less than about 50 kHz. The downhole tool may be further operable for performing a CBL/VDL operation utilizing at least one additional transmitter and at least one additional receiver at a second frequency not greater than about 30 kHz. The downhole tool may comprise a hybrid slotted sleeve tuned to the first and second frequencies.

The downhole tool may comprise one or more arms for extending one or more of the transmitters and/or the first and/or second receivers away from a housing of the downhole tool to substantially adjacent a casing of the wellbore.

The first and second receivers may each be oriented with a polarity that is perpendicular to a radial line extending from a central axis of the downhole tool to the respective first or second receiver.

The downhole tool may comprise means for attenuating acoustic signals propagating along internal structure and/or wiring of the downhole tool.

The transmitters and the first and second receivers may each be mechanically isolated from a housing of the downhole tool by an elastomeric material.

The present disclosure also introduces a system comprising a downhole tool for operation within a wellbore having a metal casing secured within the wellbore by cement, wherein the downhole tool comprises: a transmitter unit located at a first axial location of the downhole tool and operable to transmit an acoustic signal at a frequency greater than 50 kilohertz; and a receiver unit comprising a plurality of receivers azimuthally distributed around the longitudinal axis and located at a second axial location axially offset from the first axial location, wherein each of the receivers is operable to measure amplitude of the transmitted acoustic signal at different azimuthal locations. The downhole tool may have an outer diameter of 7.6 centimeters, 5.4 centimeters, or less. The system also comprises surface equipment disposed at a wellsite surface from which the wellbore extends, wherein one or both of the downhole tool and the surface equipment are individually and/or cooperatively operable to detect an empty space within the cement based on the measured amplitude of the transmitted acoustic signal at different azimuthal locations.

Wavelength of the acoustic signal transmitted by the transmitter unit may be less than the size of an empty space within the cement.

The transmitter unit may comprise a plurality of transmitters azimuthally distributed around the longitudinal axis of the downhole tool and located at the first axial location of the downhole tool, and each transmitter may be operable to transmit the acoustic signal at the frequency greater than 50 kilohertz.

The downhole tool may comprise an attenuator extending between the transmitter unit and the receiver unit. The downhole tool may comprise electrical communication wires extending through the attenuator, the electrical communication wires may be connected together via two or more electrical connectors, and the two or more electrical connectors may attenuate the acoustic signal transmitted through the electrical communication wires.

The present disclosure also introduces a method comprising: (A) conveying a downhole tool within a wellbore having a metal casing secured within the wellbore by cement, wherein the downhole tool comprises: (1) a transmitter unit at a first axial location of the downhole tool; and (2) a receiver unit comprising a plurality of receivers azimuthally spaced around a longitudinal axis at a second axial location axially offset from the first axial location; and (B) operating the downhole tool to: (1) transmit an acoustic signal from the transmitter unit at a frequency greater than 50 kilohertz; (2) receive the acoustic signal by each of the plurality of receivers; and (3) detect amplitude of the acoustic signal received at different azimuthal locations of the downhole tool to detect an empty space within the cement.

The downhole tool may have an outer diameter of 7.6 centimeters, 5.4 centimeters, or less.

The transmitter unit may comprise a plurality of transmitters azimuthally spaced around the longitudinal axis of the downhole tool, and transmitting the acoustic signal may comprise transmitting the acoustic signal by each of the plurality of transmitters at a frequency greater than 50 kilohertz to detect the empty space within the cement. The wavelength of the acoustic signal transmitted by the transmitter unit may be less than a size of the empty space within the cement. The size of the empty space within the cement may be less than 50 millimeters.

The present disclosure also introduces an apparatus comprising a downhole tool for operation within a wellbore, wherein the downhole tool comprises: (A) a sonde section comprising: (1) a transmitter unit located at a first axial location of the downhole tool and operable to transmit an acoustic signal; and (2) a receiver unit located at a second axial location axially offset from the first axial location, wherein the receiver unit is operable to receive the transmitted acoustic signal; and (B) cantilevered masses connected with the sonde section on opposing sides of the sonde section and operable to maintain the sonde section substantially centralized within a deviated or horizontal portion of the wellbore. The downhole tool may have an outer diameter of 7.6 centimeters, 5.4 centimeters, or less.

Each cantilevered mass may comprise: a mass member; and a centralizer located between the mass member and the sonde section. The cantilevered masses may be operable to reduce sagging of the sonde section in a downward direction due to gravity in a non-vertical portion of the wellbore, such as by flexing of the sonde section.

The present disclosure also introduces a system comprising a downhole tool for operation within a wellbore, wherein the downhole tool comprises: a transmitter unit comprising a plurality of transmitters azimuthally distributed around a longitudinal axis of the downhole tool at a first axial location of the downhole tool, wherein each of the transmitters is operable to transmit an acoustic signal; a first receiver unit comprising a plurality of first receivers azimuthally distributed around the longitudinal axis at a second axial location axially offset from the first axial location, wherein each of the first receivers is operable to measure amplitude of the transmitted acoustic signal at different azimuthal locations; and a second receiver unit comprising a plurality of second receivers azimuthally distributed around the longitudinal axis at a third axial location axially offset from the first and second axial locations, wherein each of the second receivers is operable to measure the amplitude of the transmitted acoustic signal at different azimuthal locations. The downhole tool may have an outer diameter of 7.6 centimeters, 5.4 centimeters, or less. The system also comprises surface equipment disposed at a wellsite surface from which the wellbore extends, wherein one or both of the downhole tool and the surface equipment are individually and/or cooperatively operable to determine difference between amplitude of the acoustic signal measured by the first receiver unit and the amplitude of the acoustic signal measured by the second receiver unit to determine acoustic signal attenuation to compensate for error in each measured amplitude resulting from eccentering of the downhole tool within the wellbore. Each transmitter of the transmitter unit may be operable to transmit the acoustic signal at the frequency greater than 50 kilohertz.

The present disclosure also introduces an apparatus comprising a downhole tool for operation within a wellbore, wherein the downhole tool comprises: a first transmitter unit located at a first axial location of the downhole tool and operable to transmit an acoustic signal at a first frequency that is less than 30 kilohertz; a first receiver unit located at a second axial location axially offset from the first axial location and operable to measure amplitude of the acoustic signal transmitted by the first transmitter unit; a second transmitter unit comprising a plurality of transmitters azimuthally distributed around a longitudinal axis of the downhole tool at a third axial location axially offset from the first and second axial locations, wherein each of the transmitters is operable to transmit an acoustic signal at a second frequency that is greater than 50 kilohertz; a second receiver unit comprising a plurality of receivers azimuthally distributed around the longitudinal axis and located at a fourth axial location axially offset from the first, second, and third axial locations, wherein each of the receivers is operable to measure amplitude of the acoustic signal transmitted by the transmitters of the second transmitter unit; and a slotted sleeve. The downhole tool may have an outer diameter of 7.6 centimeters, 5.4 centimeters, or less.

The slotted sleeve may comprise a plurality of slots extending radially through the sleeve and distributed axially along the slotted sleeve. Some of the slots may be larger than others of the plurality of slots. The slots may comprise a first plurality of slots each having a first size, and a second plurality of slots each having a second size, wherein the first and second sizes are different. The slotted sleeve portion comprising the first slots may extend between the first and second receivers, and the slotted sleeve portion comprising the second slots may extend between the second transmitter and the second receiver. For example, the first slots may be larger than the second slots.

The present disclosure also introduces an apparatus comprising a downhole tool for operation within a wellbore, wherein the downhole tool comprises: (A) a transmitter unit comprising: (1) a plurality of transmitters azimuthally distributed around a longitudinal axis of the downhole tool at a first axial location of the downhole tool, wherein each of the transmitters is operable to transmit an acoustic signal; and (2) a plurality of arms each carrying a corresponding transmitter and operable to move the corresponding transmitter between a radially retracted position and a radially extended position; and (B) a receiver unit at a second axial location axially offset from the first axial location, wherein the receiver unit is operable to measure amplitude of the transmitted acoustic signal. The downhole tool may have an outer diameter of 7.6 centimeters, 5.4 centimeters, or less.

The receiver unit may comprise: a plurality of receivers azimuthally distributed around the longitudinal axis, wherein each of the receivers is operable to measure the amplitude of the transmitted acoustic signal at different azimuthal locations; and a plurality of arms each carrying a corresponding receiver and operable to move the corresponding receiver between a radially retracted position and a radially extended position.

The present disclosure also introduces an apparatus comprising a downhole tool for operation within a wellbore, wherein the downhole tool comprises: (A) a transmitter unit comprising: (1) a plurality of transmitters azimuthally distributed around a longitudinal axis of the downhole tool at a first axial location of the downhole tool, wherein each of the transmitters is operable to transmit an acoustic signal; (2) a first end cap disposed on a first side of the plurality of transmitters; (3) a second end cap disposed on a second side of the plurality of transmitters opposite the first side; (4) a first sheet of flexible material disposed between the plurality of transmitters and the first end cap; and (5) a second sheet of flexible material disposed between the plurality of transmitters and the second end cap; and (B) a receiver unit at a second axial location axially offset from the first axial location operable to measure amplitude of the transmitted acoustic signal. The downhole tool may have an outer diameter of 7.6 centimeters, 5.4 centimeters, or less.

Each of the transmitters may comprise piezoelectric material, and/or may have a cylindrical geometry. The first and second sheets of flexible material may comprise rubber. The receiver unit may comprise: a plurality of receivers each operable to measure amplitude of the transmitted acoustic signal at different azimuthal locations; a frame maintaining the plurality of receivers azimuthally distributed around the longitudinal axis at the second axial location; and a plurality of flexible members each disposed between the frame and a corresponding one of the plurality of receivers, wherein each of the plurality of flexible members comprises flexible material. Each of the flexible members may comprise a cavity containing therein a portion of a corresponding one of the plurality of receivers.

The present disclosure also introduces an apparatus comprising a downhole tool for operation within a wellbore, wherein the downhole tool comprises: (A) a transmitter unit located at a first axial location of the downhole tool and operable to transmit an acoustic signal; and (B) a receiver unit located at a second axial location axially offset from the first axial location, wherein the receiver unit comprises: (1) a plurality of receivers each operable to measure amplitude of the transmitted acoustic signal at different azimuthal locations; (2) a frame maintaining the plurality of receivers azimuthally distributed around the longitudinal axis at the second axial location; and (3) a plurality of flexible members each disposed between the frame and a corresponding one of the plurality of receivers, wherein each of the plurality of flexible members comprises flexible material. The downhole tool may have an outer diameter of 7.6 centimeters, 5.4 centimeters, or less.

The frame may comprise a plurality of channels, and the plurality of flexible members may retain the plurality of receivers within corresponding ones of the plurality of channels. Each of the flexible members may comprise a cavity retaining therein a portion of a corresponding one of the plurality of receivers. The flexible material may comprise rubber.

Each of the receivers may comprise piezoelectric material, and/or may have a rectangular geometry.

The transmitter unit may comprise: a plurality of transmitters azimuthally distributed around a longitudinal axis of the downhole tool at a first axial location of the downhole tool, wherein each of the transmitters is operable to transmit the acoustic signal; a first end cap disposed on a first side of the plurality of transmitters; a second end cap disposed on a second side of the plurality of transmitters opposite the first side; a first sheet of flexible material disposed between the plurality of transmitters and the first end cap; and a second sheet of flexible material disposed between the plurality of transmitters and the second end cap.

The present disclosure also introduces an apparatus comprising a downhole tool for operation within a wellbore, wherein the downhole tool comprises: a transmitter unit at a first axial location of the downhole tool operable to transmit an acoustic signal; and a receiver unit comprising a plurality of receivers azimuthally distributed around the longitudinal axis at a second axial location axially offset from the first axial location, wherein each of the receivers is operable to measure amplitude of the transmitted acoustic signal at different azimuthal locations, and wherein each of the receivers comprises oppositely polarized surfaces that are substantially perpendicular to a radial line extending from the longitudinal axis to each one of the receivers. The downhole tool may have an outer diameter of 7.6 centimeters, 5.4 centimeters, or less.

Each oppositely polarized surface may have a rectangular geometry. Each of the receivers may comprise piezoelectric material.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
   a downhole tool for operation within a wellbore, wherein the downhole tool comprises:
      a first transmitter unit located at a first axial location of the downhole tool and operable to transmit a first acoustic signal at a first frequency that is less than 30 kilohertz;
      a first receiver unit located at a second axial location axially offset from the first axial location and operable to measure amplitude of the first acoustic signal;
      a second receiver unit located at a third axial location axially offset from the first and second axial locations and operable to measure amplitude of the first acoustic signal;
      a second transmitter unit comprising a plurality of transmitters azimuthally distributed around a longitudinal axis of the downhole tool at a fourth axial location axially offset from the first, second, and third axial locations, wherein each transmitter of the second transmitter unit is operable to transmit a second acoustic signal at a second frequency that is greater than 50 kilohertz;
      a third receiver unit comprising a plurality of receivers azimuthally distributed around the longitudinal axis and located at a fifth axial location axially offset from the first, second, third, and fourth axial locations, wherein each receiver of the third receiver unit is operable to measure amplitude of the second acoustic signal; and
      a fourth receiver unit comprising a plurality of receivers azimuthally distributed around the longitudinal axis and located at a sixth axial location axially offset from the first, second, third, fourth, and fifth axial locations, wherein each receiver of the fourth receiver unit is operable to measure amplitude of the second acoustic signal,
   wherein the downhole tool further comprises:
      a sonde section comprising the first and second transmitter units and the first, second, third, and fourth receiver units; and
      first and second cantilevered masses connected with corresponding first and second opposing ends of the sonde section and collectively operable to maintain the sonde section substantially centralized within a non-vertical portion of the wellbore.

2. The apparatus of claim 1 wherein the fourth, fifth, and sixth axial locations are each between the first and third axial locations.

3. The apparatus of claim 1 wherein the first and second cantilevered masses each comprise:
   a mass member; and
   a centralizer located between the mass member and the sonde section.

4. The apparatus of claim 1 wherein the amplitude obtained from the fourth receiver unit is used for determining attenuation of the first or second acoustic signal between the third and fourth axial locations.

5. The apparatus of claim 1 wherein the downhole tool is operable for performing a cement bond logging (CBL) and/or variable-density logging (VDL) operation utilizing at least one of the first and second transmitter units and at least one of the first, second, third, and fourth receiver units at the first frequency.

6. The apparatus of claim 1 wherein the downhole tool is operable for performing a cement mapping operation utilizing at least one of the first and second transmitter units and at least one of the first, second, third, and fourth receiver units at the second frequency.

7. The apparatus of claim 1 wherein the downhole tool further comprises means for attenuating and/or slowing propagation speed of the first and/or second acoustic signals propagating along structure of the downhole tool at the first and second frequencies.

8. The apparatus of claim 7 wherein the means comprise a slotted sleeve and/or a bellows.

9. The apparatus of claim 1 wherein the transmitters of the second transmitter unit and the receivers of the third and fourth receiver units are each mechanically isolated from structure of the downhole tool by elastomeric material.

10. The apparatus of claim 1 wherein the downhole tool further comprises:
    a plurality of first elastomeric members each having a cavity containing at least a portion of a corresponding one of the transmitters of the second transmitter unit;
    a plurality of second elastomeric members each having a cavity containing at least a portion of a corresponding one of the receivers of the third receiver unit; and
    a plurality of third elastomeric members each having a cavity containing at least a portion of a corresponding one of the receivers of the fourth receiver unit.

11. The apparatus of claim 10 wherein:
    the first, second, and third elastomeric members each mechanically isolate the corresponding transmitter or receiver from structure of the downhole tool; and
    the structure positionally fixes axial and radial positions of the first transmitter unit, the first and second receiver units, the transmitters of the second transmitter unit, and the receivers of the third and fourth receiver units within the downhole tool.

12. The apparatus of claim 1 where each transmitter of the second transmitter unit, each receiver of the third receiver unit, and/or each receiver of the fourth receiver unit comprises a piezoelectric member having polarized surfaces that are substantially perpendicular to a radial direction that extends from the longitudinal axis to the corresponding transmitter/receiver.

13. The apparatus of claim 12 wherein each polarized surface comprises a rectangular geometry.

14. A system comprising:
a downhole tool for operation within a wellbore, wherein the downhole tool comprises:
  a sonde section comprising:
    a first transmitter unit located at a first axial location of the downhole tool and operable to transmit a first acoustic signal at a first frequency that is less than 30 kilohertz;
    a first receiver unit located at a second axial location axially offset from the first axial location and operable to measure amplitude of the first acoustic signal;
    a second receiver unit located at a third axial location axially offset from the first and second axial locations and operable to measure amplitude of the first acoustic signal;
    a second transmitter unit comprising a plurality of transmitters azimuthally distributed around a longitudinal axis of the downhole tool at a fourth axial location axially offset from the first, second, and third axial locations, wherein each transmitter of the second transmitter unit is operable to transmit a second acoustic signal at a second frequency that is greater than 50 kilohertz;
    a third receiver unit comprising a plurality of receivers azimuthally distributed around the longitudinal axis and located at a fifth axial location axially offset from the first, second, third, and fourth axial locations, wherein each receiver of the third receiver unit is operable to measure amplitude of the second acoustic signal; and
    a fourth receiver unit comprising a plurality of receivers azimuthally distributed around the longitudinal axis and located at a sixth axial location axially offset from the first, second, third, fourth, and fifth axial locations, wherein each receiver of the fourth receiver unit is operable to measure amplitude of the second acoustic signal;
  first and second cantilevered masses connected with corresponding first and second opposing ends of the sonde section and collectively operable to maintain the sonde section substantially centralized within a non-vertical portion of the wellbore; and
surface equipment disposed at a wellsite surface from which the wellbore extends, wherein one or both of the downhole tool and the surface equipment are individually and/or cooperatively operable to detect an empty space within cement behind a casing installed in the wellbore, based on the amplitude measurements obtained by one or more of the first, second, third, and fourth receiver units at two or more different azimuthal locations.

15. The system of claim 14 wherein the amplitude measurements obtained by the fourth receiver unit are used for determining attenuation of the first or second signal between the third and fourth axial locations.

16. The system of claim 14 wherein the fourth, fifth, and sixth axial locations are each between the first and third axial locations.

17. The system of claim 14 wherein wavelength of the second acoustic signal through metal casing installed in the wellbore is smaller than a defect in:
  cement behind the casing; and/or
  a variation in bonding between the casing and the cement.

18. The system of claim 14 wherein the downhole tool is operable for performing a cement bond logging (CBL) and/or variable-density logging (VDL) operation utilizing at least one of the first and second transmitter units and at least one of the first, second, third, and fourth receiver units at the first frequency.

19. The system of claim 14 wherein the downhole tool is operable for performing a cement mapping operation utilizing at least one of the first and second transmitter units and at least one of the first, second, third, and fourth receiver units at the second frequency.

* * * * *